United States Patent
Kawasaki

(10) Patent No.: US 7,028,952 B2
(45) Date of Patent: Apr. 18, 2006

(54) ROTATION STABILIZING DEVICE IN A MICROGRAVITATIONAL ROTATING APPARATUS

(75) Inventor: Shuichi Kawasaki, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 414 days.

(21) Appl. No.: 10/092,539

(22) Filed: Mar. 8, 2002

(65) Prior Publication Data
US 2002/0125373 A1 Sep. 12, 2002

(30) Foreign Application Priority Data

| Mar. 9, 2001 | (JP) | ............................... 2001-067362 |
| May 9, 2001 | (JP) | ............................... 2001-139113 |
| Sep. 5, 2001 | (JP) | ............................... 2001-269399 |

(51) Int. Cl.
*B64G 4/00* (2006.01)
(52) U.S. Cl. ................................ 244/158 R
(58) Field of Classification Search ............ 244/158 R; 248/560, 638, 576; 188/378, 267; 464/180
See application file for complete search history.

(56) References Cited

U.S. PATENT DOCUMENTS

| 3,464,657 | A | * | 9/1969 | Bullard ......................... 248/550 |
| 4,596,373 | A | * | 6/1986 | Omi et al. .................... 248/562 |
| 4,841,184 | A | | 6/1989 | Chen et al. |
| 5,126,610 | A | | 6/1992 | Fremerey |
| 5,209,326 | A | | 5/1993 | Harper |
| 5,390,892 | A | * | 2/1995 | Platus ......................... 248/619 |
| 5,458,222 | A | * | 10/1995 | Pla et al. ..................... 188/378 |
| 5,638,303 | A | * | 6/1997 | Edberg et al. .............. 700/302 |
| 5,775,472 | A | * | 7/1998 | Osterberg et al. ........... 188/378 |
| 6,021,991 | A | * | 2/2000 | Mayama et al. ............. 248/550 |
| 6,501,203 | B1 | * | 12/2002 | Tryggvason ................ 310/90.5 |
| 2002/0189360 | A1 | | 12/2002 | Kawasaki |
| 2002/0190592 | A1 | | 12/2002 | Kawasaki |

FOREIGN PATENT DOCUMENTS

| EP | 1 249 395 A1 | 10/2002 |
| EP | 1 249 396 A1 | 10/2002 |
| FR | 2257077 | 8/1975 |

(Continued)

OTHER PUBLICATIONS

Patent Abstracts of Japan, vol. 0185, No. 82. Nov. 8, 1994. JP 6217663.

*Primary Examiner*—Tien Dinh
(74) *Attorney, Agent, or Firm*—Wenderoth, Lind & Ponack, L.L.P.

(57) ABSTRACT

A rotation stabilizing device in a microgravitational rotating apparatus has vibration suppressed and rotation stabilized. Recess portions 10a, 10b are provided on a casing 10 so that bearings 14, 15 are arranged therein for supporting a rotary shaft 30. Experimental boxes 17a to 17h fixed to arms 16a to 16h rotate together with the rotary shaft 30. A fin 33 is fixed to outer circumferential surfaces of the experimental boxes 17a to 17h projecting outwardly therefrom. Pairs of electromagnetic coils 31a, 31b, in which the fin 33 is interposed with a predetermined gap maintained therebetween, and gap sensors 32 close thereto, are fitted on the casing 10 side. Displacement of the fin 33 is detected by the gap sensors 32 to be inputted into a control unit to thereby control excitation current of the electromagnetic coils 31a, 31b. The gap is brought into a position within a demand value and rotation is stabilized.

30 Claims, 35 Drawing Sheets

| | FOREIGN PATENT DOCUMENTS | | RU | 2314405 | 8/1999 |
|---|---|---|---|---|---|
| RU | 2018155 | 8/1994 | | | |
| RU | 2018784 | 8/1994 | * cited by examiner | | |

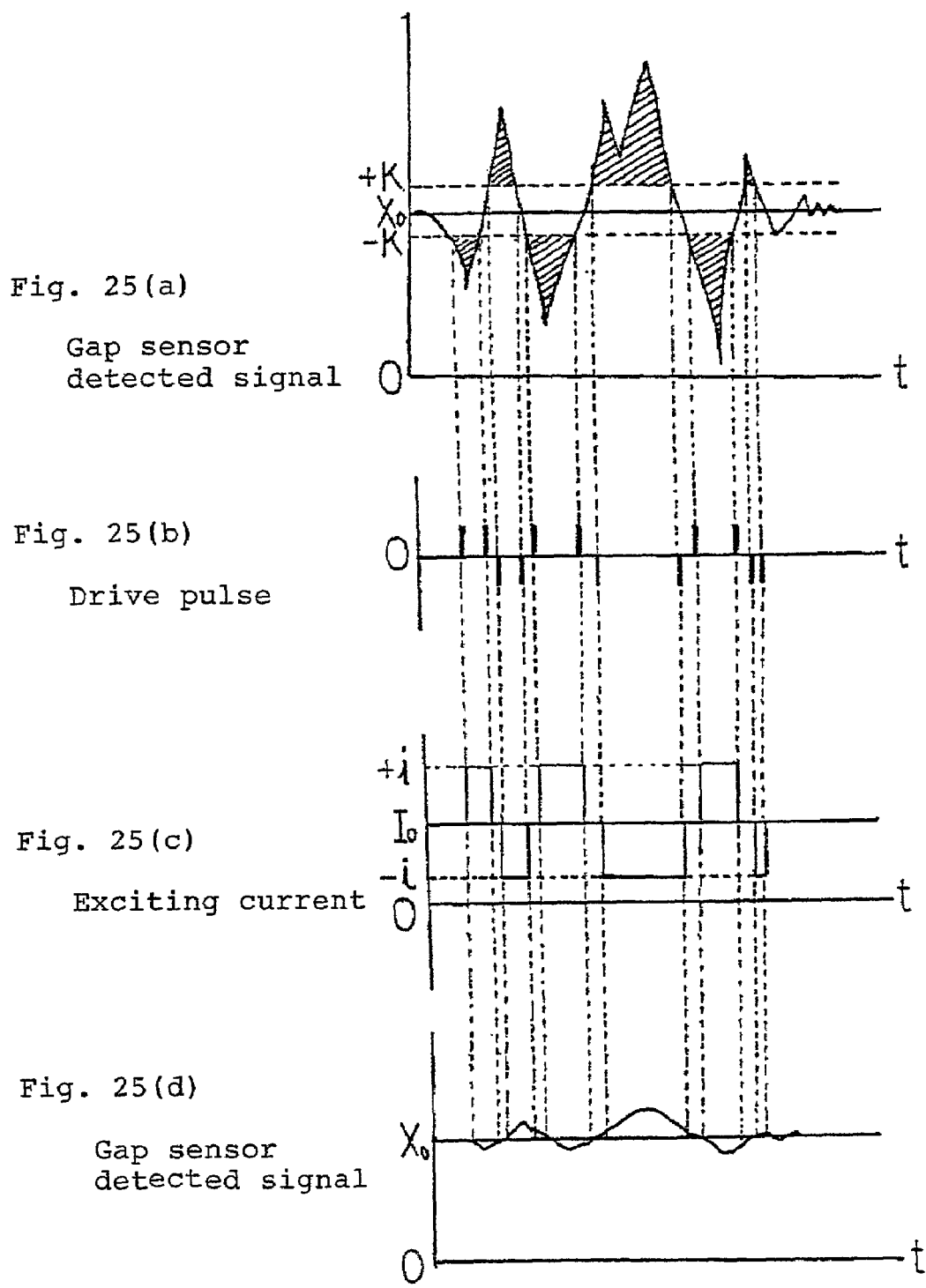
Fig. 25(a) Gap sensor detected signal
Fig. 25(b) Drive pulse
Fig. 25(c) Exciting current
Fig. 25(d) Gap sensor detected signal Gap sensor detected signal Drive pulse Exciting current Gap sensor detected signal Fig. 28(a)
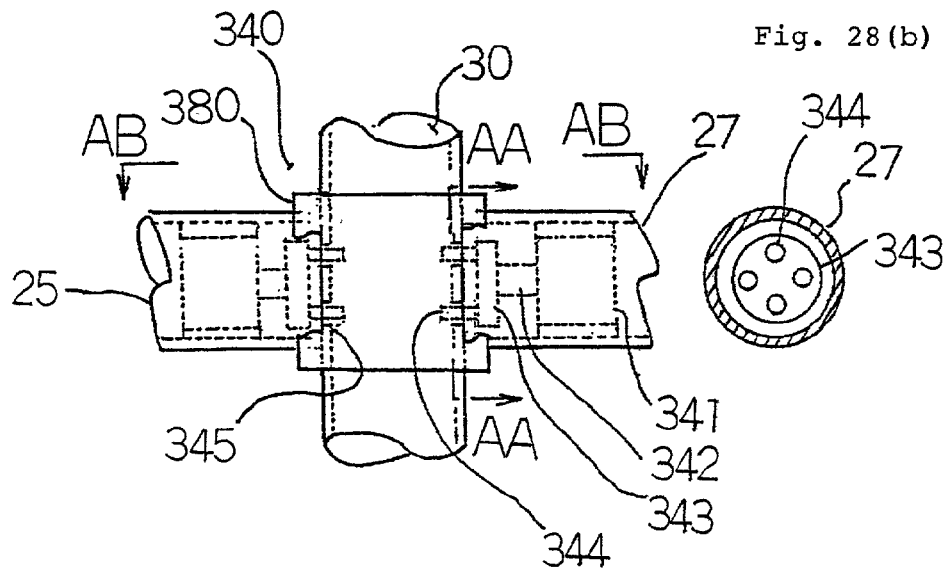
Fig. 28(b)
Fig. 29(a)
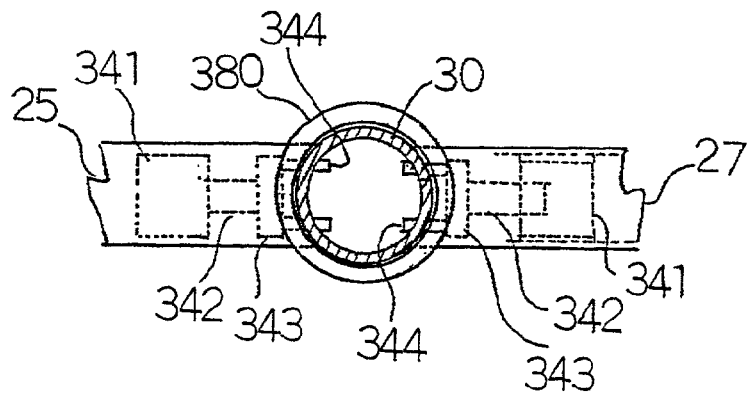
Fig. 29(b)
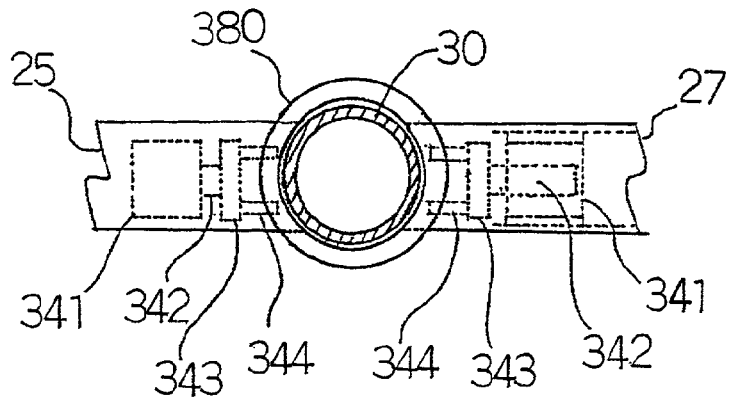

Fig. 31(a)
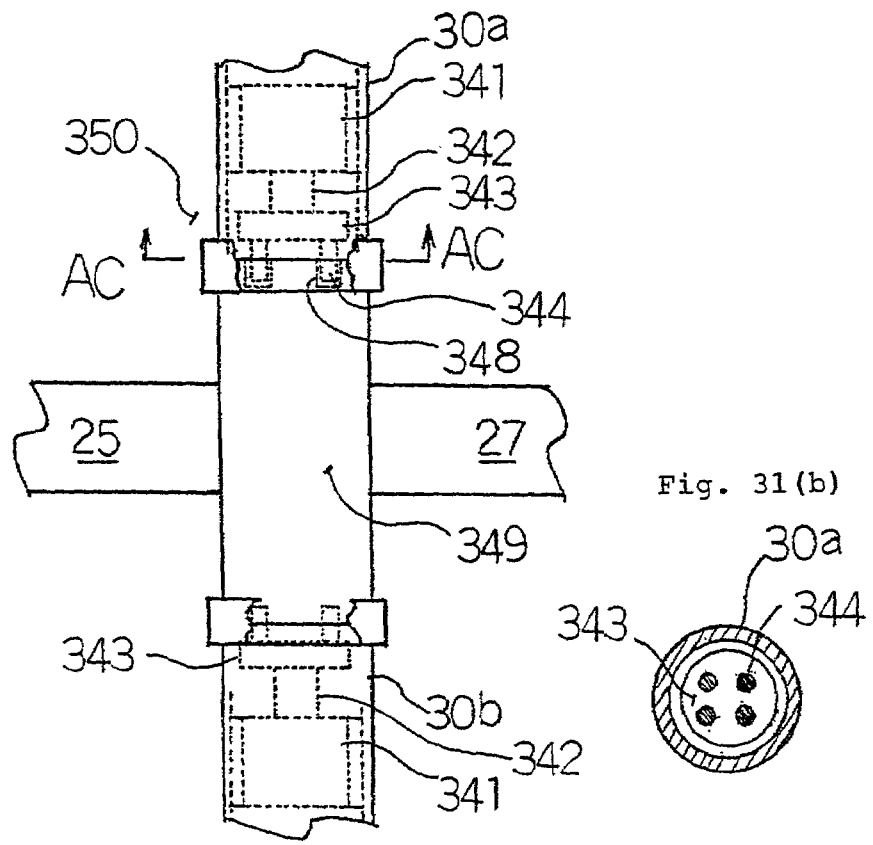
Fig. 31(b)
Fig. 32
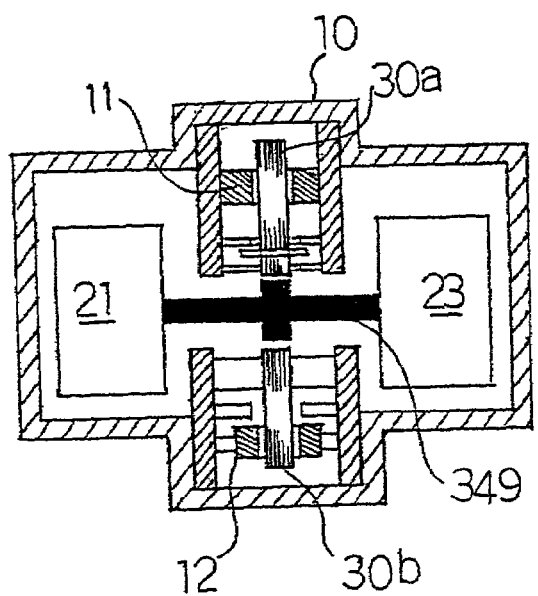

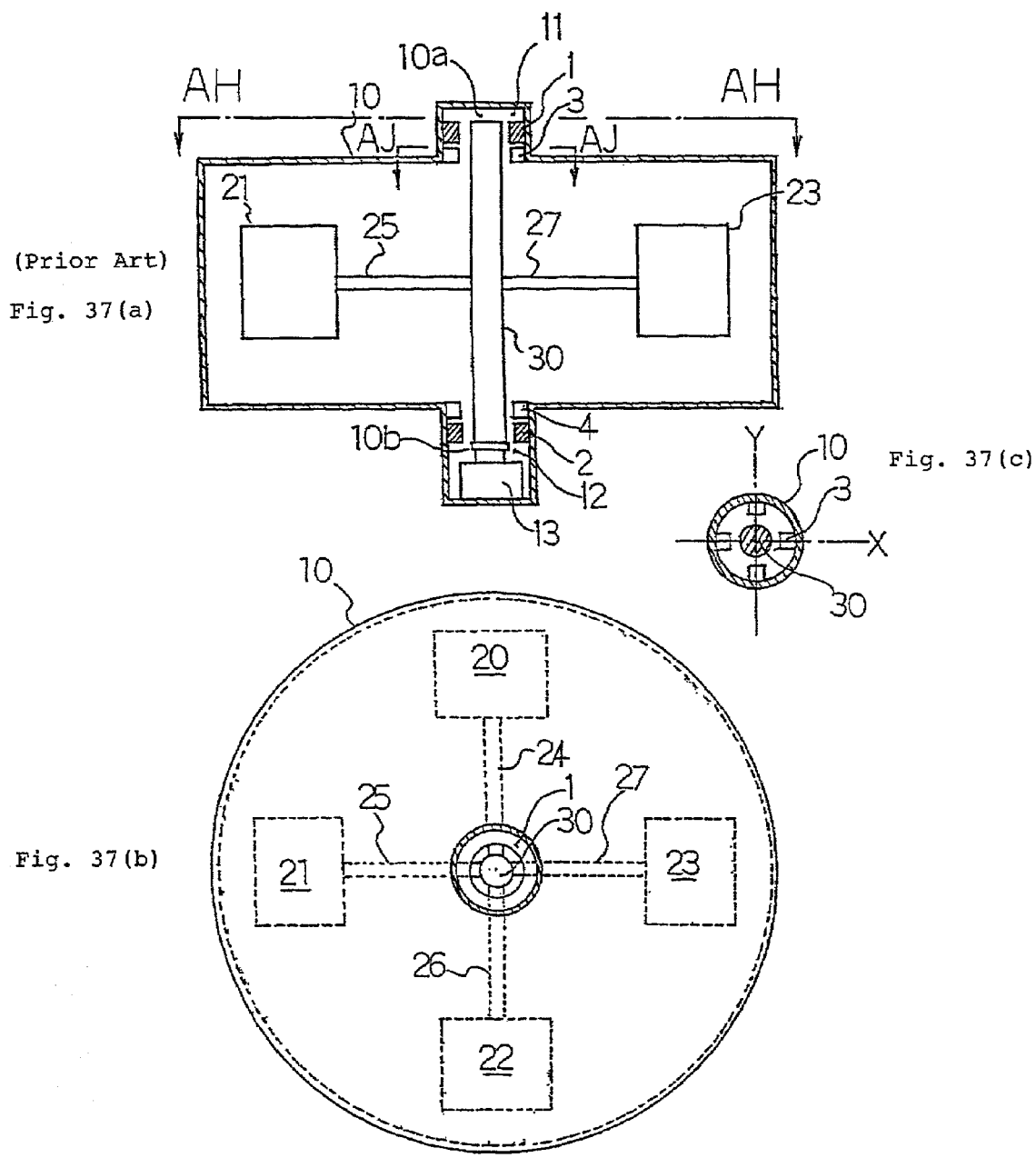

ROTATION STABILIZING DEVICE IN A MICROGRAVITATIONAL ROTATING APPARATUS

BACKGROUND OF THE INVENTION

1. Field of the Invention

The present invention relates generally to a rotation stabilizing device in a microgravitational rotating apparatus performing experiments in a microgravitational state in space and more particularly to a rotation stabilizing device provided in the rotating apparatus so that vibration occurring in a rotating part may be suppressed by a vibration controller or a rotation stabilizer, such as a fin, provided in or on the rotating apparatus.

2. Description of the Prior Art

FIG. 39 is a schematic plan view showing one example of a rotating apparatus that is currently used in space. In FIG. 39, a rotating device 560, such as a motor, has four supporting members 561, 562, 563, 564 fitted thereto extending in horizontal directions. At ends of the supporting members 561 to 564, experimental boxes 570, 571, 572, 573 are fitted and experimental objects, such as plants, are contained in the experimental boxes 570 to 573. In the microgravitational state, such rotating apparatus is driven by the rotating device 560 to rotate at a slow speed of about 1 rotation/second and experiments on the objects in the experimental boxes 570 to 573 are carried out.

In the mentioned rotating apparatus, the experimental boxes 570 to 573 are fitted to the ends of the supporting members 561 to 564 so that the end portions thereof become large in shape. Also, while the rotating apparatus itself is symmetrical around the rotating axis, the experimental objects of different kinds and different sizes are contained in the experimental boxes 570 to 573 and there are caused weight imbalances between the experimental objects so contained. Hence, by the rotation, vibration occurs in a rotary shaft as well as in the supporting members 561 to 564 and the experimental boxes 570 to 573, thereby moving the experimental objects or giving bad influences thereto.

In the microgravitational state of space, when the experimental objects are placed in the experimental boxes of the microgravitational rotating apparatus as described above, and the experimental boxes are rotated so as to perform the experiments, vibration occurs in the rotary shaft due to imbalances between each of the experimental boxes. This vibration spreads to the surrounding environment via the rotary shaft and gives influences to the surrounding space equipment and apparatus as well as on the control thereof.

On the other hand, the applicant of the present invention has heretofore proposed another patent application relating to a magnetic bearing arranged in the rotating apparatus with a technology to control this magnetic bearing and thereby an efficient absorption of the mentioned vibration has become possible. The contents of this magnetic bearing will be described below.

FIGS. 37(a) to (c) show a microgravitational rotating apparatus for which a patent has been applied by the applicant, wherein FIG. 37(a) is a cross sectional side view, FIG. 37(b) is a a cross sectional view taken on line AH—AH and seen in the arrow direction of FIG. 37(a), and FIG. 37(c) is a cross sectional view taken on line AJ—AJ of FIG. 37(a). In the figures, numeral 10 designates a casing that contains an entirety of a rotator. On central portions of upper and lower surfaces of the casing 10, there are provided recess portions 10a, 10b projecting outwardly, and magnetic bearings 11, 12 are arranged in the upper and lower recess portions 10a, 10b, respectively.

The magnetic bearings 11, 12 have coils 1, 2 for an excitation purpose arranged on inner side surfaces of the recess portions 10a, 10b so as to form respective magnetic bearings. Numerals 3, 4 designate vibration sensors that are arranged on the inner sides of the coils 1, 2 within the recess portions 10a, 10b so as to function to detect displacement due to vibration of a rotary shaft 30, thereby controlling the displacement to suppress the vibration of the rotary shaft 30, as will be described later. The vibration sensors 3, 4, as shown in FIG. 37(c), are constructed by plural pieces thereof (four pieces in the illustration) arranged symmetrically on the inner side surfaces of the recess portions 10a, 10b so that vibration or displacement of the rotary shaft 30 on the ±X axis and ±Y axis may be detected. The rotary shaft 30 has its one end inserted into the recess portion 10a and the other end into the recess portion 10b so that the respective ends may be supported by the magnetic bearings 11, 12. The rotary shaft 30 is connected to a motor 13 within the recess portion 10b and is rotated by the motor 13 while being floatably supported by the magnetic force with a predetermined gap being maintained from the coils 1, 2. As seen in FIG. 37(b), the rotary shaft 30 has four arms 24, 25, 26, 27 fitted thereto extending horizontally in the directions of the X and Y axes. At ends of the arms 24 to 27, there are fitted box-like containers (hereinafter referred to as "the experimental boxes") 20, 21, 22, 23.

In the above construction, the bearings of the rotary shaft 30 form the magnetic bearings 11, 12. The rotary shaft 30 makes no contact with the supporting portion of the casing 10 but is supported by the magnetic force. If vibration occurs in the rotary shaft 30, the vibration or displacement of the rotary shaft 30 is detected by the four vibration sensors 3, 4 arranged on the X and Y axes around both end portions of the rotary shaft 30. The vibration sensors 3, 4 detect variations caused by the vibration in the gap between the rotary shaft 30 and the sensors 3, 4 and input signals into a control unit, as described later. If the gap becomes smaller or larger, the control unit controls the electric current for the coils 1, 2 positioned correspondingly so that the gap may be returned to the original state, thereby actively controlling the vibration to be absorbed.

As to the construction of the coils 1, 2, for example, although illustration is omitted, wound wires of the four mutually independent coils are arranged so that the magnetic force may act in the four directions of the X and Y axes. When the rotary shaft 30 inclines to cause a displacement, excitation of the coil existing at the position where the displacement is largest and the variation in the gap relative to the coil is largest is controlled so that a repulsive force or attractive force acting on the rotary shaft 30 may be adjusted, thereby absorbing the displacement caused by the vibration.

FIG. 38 is a control diagram of the microgravitational rotating apparatus of FIG. 37. Vibration sensors 3a, 3b, 3c, 3d are those arranged around the upper end portion of the rotary shaft 30 and vibration sensors 4a, 4b, 4c, 4d are those arranged around the lower end portion of the rotary shaft 30. Each of the detected signals at these vibration sensors is inputted into a control unit 14. The control unit 14 drives the motor 13 to rotate the rotary shaft 30 and, at the same time, monitors the displacements, in the four directions of the X and Y axes, caused by the vibration of the rotary shaft ends and detected by the vibration sensors 3, 4. If the gap between the sensors and the rotary shaft becomes smaller or larger, the control unit 14 controls the excitation current of the wound wires of the coil existing at the corresponding position on the X and Y axes so that the repulsive force or the attractive force between that coil and the rotary shaft 30 is strengthened and the gap is returned to the original state.

In FIG. 38, numeral 15 designates a storage unit, in which pattern data of a demand value of an amplitude or an acceleration corresponding to the vibration frequency are stored in advance. The control unit 14, while monitoring the vibration of the rotary shaft 30 using the vibration sensors 3, 4, performs a comparison with the demand value. If displacement of the rotary shaft 30 occurs and the vibration becomes so large as to exceed the demand value, then the excitation current of the coil is controlled to absorb the vibration, so that the vibration of the rotary shaft 30 becomes less than the demand value. This control is carried out continuously. However, in the rotating apparatus of this kind, while the vibration occurring in the rotary shaft can be effectively controlled, such control is done only at the bearing portion and there is a limitation in the vibration control of the entire apparatus. Thus, a further improvement is being desired.

FIGS. 35(*a*) and (*b*) show another microgravitational rotating apparatus for which a patent has been applied by the applicant, wherein FIG. 35(*a*) is a cross sectional side view and FIG. 35(*b*) is a cross sectional view taken on line AF—AF and seen in the arrow direction of FIG. 35(*a*). In the figures, numeral 10 designates a casing that contains an entirety of a rotator. On central portions of upper and lower surfaces of the casing 10, there are provided recess portions 10*a*, 10*b* projecting outwardly and bearings 11, 12 are arranged in the upper and lower recess portions 10*a*, 10*b*, respectively. As the bearings 11, 12, any of magnetic bearings, spring-supported, or elastic- or plastic-material-supported bearings, air cushion bearings, spring or damper bearings and motor type or hydraulic type bearings can be employed.

Numeral 30 designates a rotary shaft that has its one end inserted into the recess portion 10*a* and the other end into the recess portion 10*b*. The rotary shaft 30 is supported at both ends or at one end thereof, according to the type of the bearings 11, 12, so that the rotary shaft 30 may make no contact with a stationary side of the casing 10. The rotary shaft 30 is connected to a motor 13 within the recess portion 10*b*. Numeral 435 designates an acceleration sensor that is fitted to an upper surface of each of experimental boxes 20, 21, 22, 23 so as to function to detect vibrations of the respective experimental boxes 20 to 23 and input signals into a control unit (not shown).

As seen in FIG. 35(*b*), the rotary shaft 30 has four arms 24, 25, 26, 27 fitted thereto extending horizontally in the directions of the X and Y axes and, at ends of the arms 24 to 27 and in front of the experimental boxes 20 to 23, there are provided upwardly and downwardly elongated box-like cases 428. In each of the cases 428, there are arranged a counterweight 481, pulleys 482, 483, a cable 484 and a motor 485. In this construction, the counterweight 481 is movable up and down and, while the experimental boxes 20 to 23 rotate, vibration caused by weight imbalances between each of the experimental boxes 20 to 23 can be absorbed, as will be described below.

In the rotator constructed as mentioned above, experimental objects of plants, animals, etc. are placed in the experimental boxes 20 to 23. In the space environment, the motor 13 is driven to rotate the experimental boxes 20 to 23 at a slow speed so that experiments to observe a growing state of the plants, a living state of the animals, etc. in space may be carried out. As various experimental objects having different shapes, sizes and weights are so contained in the experimental boxes 20 to 23, when they are rotated, there occur differences in the acceleration caused by the imbalances in the weight between each of the experimental boxes 20 to 23 and vibration occurs in the experimental boxes. This vibration is conveyed to the rotary shaft 30 via the arms 24 to 27 and further to the casing 10 via the bearing portions, thereby giving bad influences not only on the experiments but also on the surrounding environment.

Vibration caused in the rotary shaft 30 can be detected by the acceleration sensors 435. The vibration caused by the weight imbalances between each of the experimental boxes 20 to 23 is mainly of a mode to vibrate the experimental boxes 20 to 23 up and down at the ends of the arms 24 to 27 and this vibration is detected by each of the acceleration sensors 435. Signals from the acceleration sensors 435 are inputted into a control unit (not shown) and the control unit determines the experimental box in which vibration occurred. Then, in order to adjust the imbalance amount between each of the experimental boxes 20 to 23 that has caused the vibration, the control unit causes the counterweight 481 of the experimental box in which an upward acceleration is large to move downward and, reversely, causes the counterweight 481 of the experimental box in which a downward acceleration is large to move upward.

Thus, as mentioned above, if there are imbalances between each of the experimental boxes 20 to 23 and vibration is thereby caused during the rotation, imbalances in the acceleration caused by the imbalance amount during the rotation are adjusted by upward and downward movements of the counterweights 481 and, by this adjustment, the upward and downward vibration of the experimental boxes 20 to 23 caused by the imbalances can be prevented.

FIGS. 36(*a*) and (*b*) show another example of a microgravitational rotating apparatus that is related to the apparatus of FIGS. 35(*a*) and (*b*), wherein FIG. 36(*a*) is a cross section side view and FIG. 36(*b*) is a cross section view taken on line AG—AG and seen in the arrow direction of FIG. 36(*a*). This example is constructed such that a pair of counterweights are arranged on upper and lower sides of each arm and imbalances caused between each of the experimental boxes are resolved by moving the counterweights in the horizontal direction so that vibration caused by the imbalances may be suppressed. Construction of other portions of this rotating experimental apparatus is the same as that of the apparatus of FIGS. 35(*a*) and (*b*).

In FIGS. 36(*a*) and (*b*), on the upper side of each of the arms 24, 25, 26, 27 and in parallel therewith, there is arranged a threaded bar 436*a*. Each of the threaded bars 436*a* has its one end connected to the respective experimental boxes 20 to 23 and the other end connected to a motor 431*a* that is fixed to an upper surface of each of the arms 24 to 27. A counterweight 429*a* is fitted to each of the threaded bars 436*a* via a thread engagement and, when the motor 431*a* rotates to thereby rotate the threaded bar 436*a*, the counterweight 429*a* moves rightward or leftward in the figures. Likewise, on the lower side of each of the arms 24 to 27 and in parallel therewith, there is arranged a threaded bar 436*b* to rotate between a motor 431*b* and the respective experimental boxes 20 to 23 and thereby a counterweight 429*b* moves rightward or leftward in the figures. Also, an acceleration sensor 435 is fitted to an upper surface of each of the experimental boxes 20 to 23.

In the construction in which there are provided the four arms 24 to 27, as shown in FIG. 36(*b*), and the counterweights 429*a*, 429*b* are arranged on the upper and lower sides of each of the arms 24 to 27 so as to move horizontally, when weight imbalances occur between each of the experimental boxes 20 to 23 and vibration arises due to differences in acceleration during the rotation, signals from the acceleration sensors 435 are sent to a control unit (not shown). Thereby, each of the motors 431a, 431b, which amount to eight in total, is controlled to move each of the counterweights 429a, 429b rightward or leftward so that the imbalances may be resolved. Thus, the vibration caused by the imbalances in the weight can be suppressed.

In the microgravitational rotating apparatus shown in FIGS. 35 to 38 and described as above, while the vibration caused in the rotating apparatus during the rotation can be absorbed within the casing 10, a complete absorption is not always possible according to the kinds of the vibration and a more accurate vibration control has been desired.

Also, in the abovementioned microgravitational rotating apparatus, foreign matters are liable to encroach into the bearing portions during the rotation and there is considered a case where the rotary shaft may stop suddenly. Following such a sudden stop of the rotary shaft, the experimental boxes also stop, and this gives shocks not only to the experimental boxes but also to the experimental objects contained therein. Also, a sudden vibration occurs following the sudden stop and this gives bad influences to the surrounding environment.

SUMMARY OF THE INVENTION

In view of the mentioned problems of the prior art, it is an object of the present invention to provide a rotation stabilizing device in a microgravitational rotating apparatus by which arbitrary vibration caused in the rotating apparatus in the microgravitational state in space is suppressed so that the rotation of the rotating apparatus may be stabilized. For this purpose, a rotation stabilizing device of the present invention comprises a fin arranged on an outer circumferential plane of the rotating apparatus and an electromagnetic coil controlling the fin by electromagnetic force so as to suppress the vibration.

Also, in order that the vibration caused in the rotating apparatus rotating experimental objects in space may not spread to the surrounding environment, it is an object of the present invention to provide a rotation stabilizing device in a microgravitational rotating apparatus in which an entire casing supporting a rotator is elastically supported as well as electromagnetically supported to thereby absorb the vibration efficiently.

Furthermore, in order that shocks caused by a rapid action of the rotating apparatus, such as a sudden stop, may be avoided, it is an object of the present invention to provide a rotation stabilizing device in a microgravitational rotating apparatus in which a safety device is interposed at a connecting portion between a rotary shaft and experimental boxes in the rotating apparatus so that, in such a sudden case, the safety device may disconnect the rotary shaft and the rotating experimental boxes to thereby avoid the shocks.

Thus, in order to achieve the mentioned objects, the present invention provides rotation stabilizing devices having the structures (1) to (25) mentioned below.

(1) In a rotation stabilizing device in a microgravitational rotating apparatus, where the microgravitational rotating apparatus comprises a casing, a rotary shaft, provided within the casing, having its both ends supported by bearings so as to be rotationally driven by a motor and a plurality of arms, extending radially, having their one ends fitted and supported to the rotary shaft and the other ends fitted with a plurality of boxes in which objects having weight are placed, the rotation stabilizing device comprises a rotation stabilizing means provided between the casing and the plurality of boxes or between an outer side of the casing and a stationary side or between the rotary shaft and the plurality of arms.

(2) In the rotation stabilizing device as mentioned in (1) above, the rotation stabilizing means comprises a fin, having a flat plate ring shape, fixed to outer circumferential surfaces of the plurality of boxes so as to extend orthogonally to the rotary shaft. A pair of electromagnetic coils, facing each other, are fitted to a wall surface of the casing at each of a plurality of places of a circumferential periphery of the fin so that the fin may be interposed between the electromagnetic coils of the pair with a predetermined gap being maintained between the fin and the respective electromagnetic coils of the pair. A gap sensor, detecting variations in the gap, is fitted to the wall surface of the casing close to the electromagnetic coils of the pair and a control unit takes detected signals of the gap sensor and compares the signals with a set value to thereby control excitation current of the electromagnetic coils of the pair existing at the position corresponding to the gap sensor that detected the signals in excess of the set value so that the gap may fall within the set value.

(3) In the rotation stabilizing device as mentioned in (2) above, the fin, instead of having the flat plate shape, has a frustoconical shape of which a conical surface is inclined with a predetermined angle.

(4) In the rotation stabilizing device as mentioned in (1) above, the rotation stabilizing means comprises a fin, having a cylindrical shape, fixed to each of upper and lower surfaces of the plurality of boxes so as to extend in the same direction as the rotary shaft. A pair of electromagnetic coils, facing each other, are fitted to a wall surface of the casing at each of a plurality of places of a circumferential periphery of the fin so that the fin may be interposed between the electromagnetic coils of the pair with a predetermined gap being maintained between the fin and the respective electromagnetic coils of the pair. A gap sensor, detecting variations in the gap, is fitted to the wall surface of the casing close to the electromagnetic coils of the pair and a control unit takes detected signals of the gap sensor and compares the signals with a set value to thereby control excitation current of the electromagnetic coils of the pair existing at the position corresponding to the gap sensor that detected the signals in excess of the set value so that the gap may fall within the set value.

(5) In the rotation stabilizing device as mentioned in (1) above, the rotation stabilizing means comprises a fin, having a flat plate ring shape, fixed to outer circumferential surfaces of the plurality of boxes so as to extend orthogonally to the rotary shaft. A pair of electromagnetic coils, facing each other, are arranged at each of a plurality of places of a circumferential periphery of the fin so that the fin may be interposed between the electromagnetic coils of the pair with a predetermined gap being maintained between the fin and the respective electromagnetic coils of the pair. A pair of cylinders are fixed to the casing on the one hand and connected to the electromagnetic coils of the pair on the other hand so that the electromagnetic coils of the pair may be moved and the gap relative to the fin may be changed. A gap sensor, detecting variations in the gap, are fitted to a wall surface of the casing close to the electromagnetic coils of the pair and a control unit takes detected signals of the gap sensor and compares the signals with a set value to thereby control drive of the cylinders of the pair existing at the position corresponding to the gap sensor that detected the signals in excess of the set value so that the electromagnetic coils of the pair connected to the cylinders may be moved and the gap may fall within the set value.

(6) In the rotation stabilizing device as mentioned in (5) above, the fin, instead of having the flat plate shape, has a frustoconical shape of which a conical surface is inclined with a predetermined angle. (7) In the rotation stabilizing device as mentioned in (1) above, the rotation stabilizing means comprises a fin, having a cylindrical shape, fixed to each of upper and lower surfaces of the plurality of boxes so as to extend in the same direction as the rotary shaft. A pair of electromagnetic coils, facing each other, are arranged at each of a plurality of places of a circumferential periphery of the fin so that the fin may be interposed between the electromagnetic coils of the pair with a predetermined gap being maintained between the fin and the respective electromagnetic coils of the pair. A pair of cylinders are fixed to the casing on the one hand and connected to the electromagnetic coils of the pair on the other hand so that the electromagnetic coils of the pair may be moved and the gap relative to the fin may be changed. A gap sensor, detecting variations in the gap, is fitted to a wall surface of the casing close to the electromagnetic coils of the pair and a control unit takes detected signals of the gap sensor and compares the signals with a set value to thereby control drive of the cylinders of the pair existing at the position corresponding to the gap sensor that detected the signals in excess of the set value so that the electromagnetic coils of the pair connected to the cylinders may be moved and the gap may fall within the set value.

(8) In the rotation stabilizing device as mentioned in (1) above, the rotation stabilizing means comprises a fin, having a flat plate ring shape, fixed to an inner circumferential wall surface of the casing so as to extend orthogonally to the rotary shaft. A pair of electromagnetic coils, facing each other, are fitted to an outer circumferential surface of each of the plurality of boxes so that the fin may be interposed between the electromagnetic coils of the pair with a predetermined gap being maintained between the fin and the respective electromagnetic coils of the pair. A gap sensor, detecting variations in the gap, is fitted to the outer circumferential surface of each of the plurality of boxes close to the electromagnetic coils of the pair and a control unit takes detected signals of the gap sensor and compares the signals with a set value to thereby control excitation current of the electromagnetic coils of the pair existing at the position corresponding to the gap sensor that detected the signals in excess of the set value so that the gap may fall within the set value.

(9) In the rotation stabilizing device as mentioned in (8) above, the fin, instead of having the flat plate shape, has a frustaconical shape of which a conical surface is inclined with a predetermined angle.

(10) In the rotation stabilizing device as mentioned in (1) above, the rotation stabilizing means comprises a fin, having a cylindrical shape, fixed to each of upper and lower inner wall surfaces of the casing so as to extend in the same direction as the rotary shaft. A pair of electromagnetic coils, facing each other, are fitted to each of upper and lower surfaces of the plurality of boxes so that the fin may be interposed between the electromagnetic coils of the pair with a predetermined gap being maintained between the fin and the respective electromagnetic coils of the pair. A gap sensor, detecting variations in the gap, is fitted to each of the upper and lower surfaces of the plurality of boxes close to the electromagnetic coils of the pair and a control unit takes taking detected signals of the gap sensor and compares the signals with a set value to thereby control excitation current of the electromagnetic coils of the pair existing at the position corresponding to the gap sensor that detected the signals in excess of the set value so that the gap may fall within the set value.

(11) In the rotation stabilizing device as mentioned in (1) above, the rotation stabilizing means comprises a fin, having a flat plate ring shape, fixed to an inner circumferential wall surface of the casing so as to extend orthogonally to the rotary shaft. A pair of cylinders, facing each other, are fitted to each of outer circumferential surfaces of the plurality of boxes. A pair of electromagnetic coils, facing each other, are connected to the cylinders of the pair so that the fin may be interposed between the electromagnetic coils of the pair with a predetermined gap being maintained between the fin and the respective electromagnetic coils of the pair as well as so that the gap may be made adjustable. A gap sensor, detecting variations in the gap, is fitted to each of the outer circumferential surfaces of the plurality of boxes close to the electromagnetic coils of the pair and a control unit takes detected signals of the gap sensor and compares the signals with a set value to thereby control the cylinders of the pair existing at the position corresponding to the gap sensor that detected the signals in excess of the set value so that the gap may fall within the set value.

(12) In the rotation stabilizing device as mentioned in (11) above, the fin, instead of having the flat plate shape, has a frustaconical shape of which a conical surface is inclined with a predetermined angle.

(13) In the rotation stabilizing device as mentioned in (1) above, the rotation stabilizing means comprises a fin, having a cylindrical shape, fixed to each of upper and lower surfaces of the casing so as to extend in the same direction as the rotary shaft. A pair of cylinders, facing each other, are fitted to each of upper and lower surfaces of the plurality of boxes. A pair of electromagnetic coils, facing each other, are connected to the cylinders of the pair so that the fin may be interposed between the electromagnetic coils of the pair with a predetermined gap being maintained between the fin and the respective electromagnetic coils of the pair as well as so that the gap may be made adjustable. A gap sensor, detecting variations in the gap, is fitted to each of the upper and lower surfaces of the plurality of boxes close to the electromagnetic coils of the pair and a control unit takes detected signals of the gap sensor and compares the signals with a set value to thereby control the cylinders of the pair existing at the position corresponding to the gap sensor that detected the signals in excess of the set value so that the gap may fall within the set value.

(14) In the rotation stabilizing device as mentioned in (1) above, the rotation stabilizing means is a vibration isolating device supporting the casing at each of a plurality of places of an outer peripheral portion of the casing and the vibration isolating device comprises a spring mechanism elastically supporting the casing to a stationary side member and an electromagnetically supporting mechanism comprising an exciting coil connected to the spring mechanism to electromagnetically support the spring mechanism to the stationary side member by exciting the excitation coil.

(15) In the rotation stabilizing device as mentioned in (14) above, the vibration isolating device further comprises a gap sensor detecting a gap between the casing and the stationary side member and a control unit taking detected signals of the gap sensor and, in case of detection of the gap in excess of a predetermined range, controlling exciting current of the exciting coil so as to reduce vibration.

(16) In the rotation stabilizing device as mentioned in (14) above, the vibration isolating device further comprises a gap sensor detecting a gap between the casing and the stationary side member and a control unit taking detected signals of the gap sensor to detect signal variations and putting out such drive signals as to cancel the signal variations so that excitation current of the excitation coil may be controlled by the drive signals to thereby control to reduce vibration.

(17) In the rotation stabilizing device as mentioned in any of (14) to (16) above, the spring mechanism comprises a casing side frame member fitted to the casing, a stationary side frame member fitted to the stationary side member and a spring connecting the casing side frame member and the stationary side frame member. The electromagnetically supporting mechanism has the exciting coil fitted to the casing side frame member and comprises a conductor fitted to the stationary side frame member so as to be inserted into the casing side frame member with a predetermined gap being maintained between the conductor and the casing side frame member.

(18) In the rotation stabilizing device as mentioned in any of (14) to (17) above, the spring mechanism uses one or more bar-like rod springs.

(19) In the rotation stabilizing device as mentioned in any of (14) to (17) above, the spring mechanism uses one or more bar-like coil springs.

(20) In the rotation stabilizing device as mentioned in any of (14) to (17) above, the spring mechanism uses one or more members made of rubber, plastics, etc. having a predetermined elasticity.

(21) In the rotation stabilizing device as mentioned in (21) above, the rotation stabilizing means is a safety device interposed between the rotary shaft and the plurality of arms and, if the rotary shaft stops suddenly, the safety device disconnects the rotary shaft and the plurality of arms from each other so that the plurality of arms may rotate freely from the rotary shaft.

(22) In the rotation stabilizing device as mentioned in (21) above, the safety device comprises an actuator fitted within each of the plurality of arms, a pin fitted to an end of a rod of the actuator and a sensor detecting a rotation of the rotary shaft. When the rod of the actuator elongates to thereby cause the pin of the rod end to engage with a pin hole provided in the rotary shaft, the plurality of arms become rotatable together with the rotary shaft and, if the rotary shaft stops suddenly, the rod is retracted, based on a signal from the sensor, to thereby disengage the pin from the pin hole.

(23) In the rotation stabilizing device as mentioned in (21) above, the plurality of arms are radially fixed to a connecting shaft. The rotary shaft is separated in to an upper rotary shaft and a lower rotary shaft so that the connecting shaft is interposed therebetween. There are provided an actuator fitted within each of the upper and lower rotary shafts, a pin fitted to an end of a rod of the actuator and a sensor detecting a rotation of the rotary shaft. When the rod of the actuator elongates to thereby cause the pin of the rod end to engage with a pinhole provided in the connecting shaft, the connecting shaft becomes rotatable together with the rotary shaft and, if the rotary shaft stops suddenly, the rod is retracted, based on a signal from the sensor, to thereby disengage the pin from the pin hole.

(24) In the rotation stabilizing device as mentioned in (21) above, the safety device comprises an actuator, having a rod in which its end is formed in a round shape, fitted within each of the plurality of arms, a sensor detecting a rotation of the rotary shaft and an abutting portion, having a recessed round shape that is complementary to the round shape of the rod end of the actuator, provided in the rotary shaft so that the rod end of the actuator may be moved to abut on the abutting portion. When the rod of the actuator elongates to thereby cause the rod end to abut on the abutting portion of the rotary shaft, the plurality of arms become rotatable together with the rotary shaft and, if the rotary shaft stops suddenly, the rod is retracted, based on a signal from the sensor, to thereby disengage the rod end from the abutting portion.

(25) In the rotation stabilizing device as mentioned in (21) above, the safety device comprises a hole provided in each of the plurality of arms so as to open at an end face thereof, a spring provided at a bottom of the hole, a claw member having one end activated by the spring and an other end projecting outside the hole and an abutting portion, having a recessed shape that is complementary to a shape of the projecting end of the claw member, provided in the rotary shaft so that the projecting end of the claw member activated by the spring may abut on the abutting portion of the rotary shaft. The plurality of arms are thereby rotatable together with the rotary shaft and, if the rotary shaft stops suddenly, the plurality of arms together with the claw member continue to rotate by inertia force so as to make the claw member disengageable from the abutting portion of the rotary shaft and thereby the plurality of arms are made rotatable freely from the rotary shaft.

In the invention of (1) above, as the experimental boxes are loaded with experimental objects or experimental apparatus having different sizes and weights, there are caused imbalances in the acceleration during the rotation and thereby vibration occurs in the rotating apparatus. While this vibration is suppressed by controlling the bearings of the rotary shaft so as to correct displacement of the rotating axis caused by the vibration, in addition thereto, the rotation stabilizing means is provided between the casing and the experimental boxes or between the outer side of the casing and the stationary side supporting the casing, so that the vibration there is controlled and the rotation of the rotating apparatus is stabilized. Also, if the vibration becomes in excess of a set value, the rotation stabilizing means works between the rotary shaft and the arms supporting the experimental boxes so that the vibration spreading to the rotary shaft from the arms may be suppressed.

In the invention of (2) above, when the vibration occurs in the rotating apparatus by the acceleration imbalances during the rotation due to different sizes and weights of the experimental objects, the fin moves variedly and the gap between the fin and the electromagnetic coils also varies. The variations are detected by the gap sensor to be inputted into the control unit. The control unit monitors the variations and compares them with a predetermined allowable value of the gap, that is, a set value and, if there is found a signal of the gap in excess of the set value, it controls the exciting current of the electromagnetic coil existing at the place corresponding to that signal. Thereby, the attractive force or repulsive force is controlled so that the gap between the fin and the electromagnetic coils may fall within the set value. Furthermore, the plurality of the boxes are structured to be integrally formed by the fin so that movement between each of the boxes may be reduced and thereby the vibration caused by the weight imbalances is further reduced and a stable rotation can be realized.

In the invention of (3) above, the fin is of a frustoconical shape, instead of the flat plate shape and, as in the invention of (2) above, the gap between the fin and the electromagnetic coils is controlled to a position within the set value so as to ensure a stable rotation. Also, the rigidity of the fin is enhanced as well as the plurality of the experimental boxes are integrally formed to be strengthened structurally. Thus, an effect to further reduce the vibration can be obtained.

In the invention of (4) above, the fin is of a cylindrical shape and is fitted to each of the upper and lower surfaces of the experimental boxes. Thus, as in the invention of (2) above, the gap between the fin and the electromagnetic coils is controlled to fall within the set value. Also, the fin is fixed both to the upper and lower surfaces so that the rotator is further strongly integrated. Thereby, spreading of the vibration is suppressed and a further stable rotation can be realized.

In the invention of (5) above, when the vibration occurs in the rotating apparatus by the acceleration imbalances during the rotation due to different sizes and weights of the experimental objects, the fin moves variedly and the gap between the fin and the electromagnetic coils also varies. The variations are detected by the gap sensor to be inputted into the control unit. The control unit monitors the variations and compares them with a predetermined allowable value of the gap, that is, a set value. If there is found a signal of the gap in excess of the set value, the control unit controls the cylinders existing at the place corresponding to that signal. Thereby, the electromagnetic coils connected to the cylinders are moved so as to control the attractive force or repulsive force acting on the fin so that the gap between the fin and the electromagnetic coils is controlled to fall within the set value. Thereby, movement of the fin and the experimental boxes is reduced and a stable rotation can be realized. Also, the plurality of boxes are integrally formed and the vibration imbalances also can be reduced.

In the invention of (6) above, the fin is of a frustoconical shape, instead of the flat plate shape and, as in the invention of (2) above, the gap between the fin and the electromagnetic coils is controlled to a position within the set value so as to ensure a stable rotation. Also, the rigidity of the fin is enhanced and the plurality of the experimental boxes are integrally formed to be strengthened structurally. Thus, an effect to further reduce the vibration can be obtained.

In the invention of (7) above, the fin is of a cylindrical shape and is fitted to each of the upper and lower surfaces of the experimental boxes. Thus, as in the invention of (5) above, the control unit controls to drive the cylinders so that the gap between the fin and the electromagnetic coils may fall within the set value. Also, the fin is fixed both to the upper and lower surfaces so that the rotator is further strongly integrated. Thereby, spreading of the vibration is suppressed and a further stable rotation can be realized.

In the invention of (8) above, when the vibration occurs in the rotating apparatus by the acceleration imbalances during the rotation due to different sizes and weights of the experimental objects, the electromagnetic coils having the fin interposed therebetween move in the gap and the gap between the fin and the electromagnetic coils also varies. The variations are detected by the gap sensor to be inputted into the control unit. The control unit monitors the variations and compares them with a predetermined allowable value of the gap, that is, a set value. If there is found a signal of the gap in excess of the set value, the control unit controls the excitation current of the electromagnetic coils existing at the place corresponding to that signal. Thereby, the attractive force or repulsive force is controlled so that the gap between the fin and the electromagnetic coils may fall within the set value. Thereby, movement of the fin and the experimental boxes is reduced and a stable rotation can be realized.

In the invention of (9) above, the fin is of a frustoconical shape, instead of the flat plate shape and, as in the invention of (2) above, the gap between the fin and the electromagnetic coils is controlled to a position within the set value so as to ensure a stable rotation.

In the invention of (10) above, the fin is of a cylindrical shape and is fitted to each of the upper and lower surfaces of the experimental boxes. Thus, as in the invention of (2) above, the gap between the fin and the electromagnetic coils is controlled to fall within the set value and a stable rotation can be realized more efficiently.

In the invention of (11) above, when the vibration occurs in the rotating apparatus by the acceleration imbalances during the rotation due to different sizes and weights of the experimental objects, the electromagnetic coils having the fin interposed therebetween move in the gap and the gap between the fin and the electromagnetic coils also varies. The variations are detected by the gap sensor to be inputted into the control unit. The control unit monitors the variations and compares them with a predetermined allowable value of the gap, that is, a set value. If there is found a signal of the gap in excess of the set value, the control unit controls the cylinders existing at the place corresponding to that signal. Thereby, the electromagnetic coils connected to the cylinders are moved so as to control the attractive force or repulsive force acting on the fin so that the gap between the fin and the electromagnetic coils is controlled to fall within the set value. Thereby, movement of the fin and the experimental boxes is reduced and a stable rotation can be realized.

In the invention of (12) above, the fin is of a frustoconical shape, instead of the flat plate shape and, as in the invention of (11) above, the gap between the fin and the electromagnetic coils is controlled to a position within the set value so as to ensure a stable rotation.

In the invention of (13) above, the fin is of a cylindrical shape and is fitted to each of the upper and lower surfaces of the experimental boxes. Thus, as in the invention of (11) above, the gap between the fin and the electromagnetic coils is controlled to fall within the set value and a stable rotation can be realized more efficiently.

In the invention of (14) above, the vibration isolating device comprises the spring mechanism and the electromagnetically supporting mechanism and, when vibration occurs in the casing, the vibration can be absorbed mechanically by the elastic force of the spring of the stationary side member. Further, by supplying the excitation coil, connected to the spring mechanism, with excitation current, the casing is supported to the stationary side member by the electromagnetic force, so that the vibration is also absorbed electromagnetically. Thus, in addition to the mechanical elastic force of the spring, the vibration is effectively absorbed by the electromagnetic force and spreading of the vibration to the microgravitational environment in the space from the casing can be securely avoided.

In the invention of (15) above, the vibration isolating device further comprises the gap sensor so that the detected signals of the gap sensor are taken by the control unit and, in case of detection of a gap in excess of a predetermined range, the exciting current is controlled to be increased or decreased to thereby reduce the vibration. Thus, in addition to the vibration absorbing effect by the elastic support of the spring mechanism, if the vibration is large, the vibration absorbing function is controlled to be strengthened by the electromagnetic force of the electromagnetically supporting mechanism and a further effective vibration absorption can be realized.

In the invention of (16) above, the vibration isolating device further comprises the gap sensor and the detected signals of the gap sensor are taken by the control unit. The control unit continuously monitors the detected signals of the gap and computes, and puts out, such a drive signal as to cancel the vibration. By this drive signal, the exciting current of the exciting coil is controlled so that the vibration caused in the casing is actively canceled by the current flowing in the excitation coil. Thus, in addition to the vibration absorption by the elastic support of the spring mechanism, the vibration is further effectively absorbed by the electromagnetic force.

In the invention of (17) above, the vibration isolating device is constructed by the spring mechanism comprising the casing side frame member, the stationary side frame member and the spring connecting both of these frame members and by the electromagnetically supporting mechanism having the excitation coil fitted to the casing side frame member and comprising a conductor fitted to the stationary side frame member so as to be inserted into the casing side frame member. Thus, by such a simple construction, a vibration isolating device having a large vibration control effect can be obtained.

In the inventions of (18) to (20) above, the spring mechanism is constructed by a rod spring, or a coil spring, or a material of rubber or plastics and an appropriate spring mechanism of the vibration isolating device can be selected corresponding to the size or usage.

In the invention of (21) above, the rotary shaft and the plurality of arms are connected via the safety device. Thus, if foreign matters encroach between the rotary shaft and the bearings and the rotation stops suddenly, for example, the safety device immediately disconnects the rotary shaft and the arms from each other so that the arms may rotate freely from the rotary shaft. Thereby, the arms can continue to rotate by the inertia force and occurrence of sudden shocks or vibration can be avoided with no accompanying sudden stop of the experimental boxes.

In the invention of (22) above, the sudden stop of the rotary shaft is detected by the sensor and, based on the signal from the sensor, the rod of the actuator is retracted so that the pin of the rod end disengages from the pin hole of the rotary shaft and the arms become rotatable freely from the rotary shaft. Thus, the arms continue to rotate by the inertia force and occurrence of sudden shocks or vibration can be avoided with no accompanying sudden stop of the experimental boxes.

In the invention of (23) above, the plurality of arms are integrally fixed to the connecting shaft and the connecting shaft, interposed between the upper and lower rotary shafts, is driven rotationally by being connected via the actuator and the pin of the rod end provided in the upper and lower rotary shafts. A sudden stop of the rotary shaft is detected by the sensor and, based on the signal from the sensor, the rod of the actuator is retracted so that the pin of the rod end disengages from the pin hole of the connecting shaft and the connecting shaft becomes rotatable freely from the rotary shaft. Thus, the arms continue to rotate by the inertia force and occurrence of sudden shocks or vibration can be avoided with no accompanying sudden stop of the experimental boxes.

In the invention of (24) above, the rod end, having a round shape, of the actuator abuts on the abutting portion of the rotary shaft and the arms rotate together with the rotary shaft by restraining each other by friction force. A sudden stop of the rotary shaft is detected by the sensor and, based on the signal from the sensor, the rod of the actuator is retracted so that the rod end of the round shape disengages from the abutting portion of the rotary shaft and the arms become rotatable freely from the rotary shaft. Thus, the arms continue to rotate by the inertia force and occurrence of sudden shocks or vibration can be avoided with no accompanying sudden stop of the experimental boxes.

In the invention of (25) above, the claw member, inserted into the hole of each of the arms and activated by the spring, abuts on the abutting portion of the rotary shaft so that the arms and the rotary shaft are rotatable together. If the rotary shaft stops suddenly, each of the arms together with the claw member continues to rotate by the inertia force, wherein the claw member is pushed back in the hole of the arm, resisting the spring force, by the sliding force caused by the tapered end surface of the claw member so that the claw member positions on the outer side of the rotary shaft. Thus, the arms can continue to rotate freely from the rotary shaft and occurrence of sudden shocks or vibration can be avoided with no accompanying sudden stop of the experimental boxes.

BRIEF DESCRIPTION OF THE DRAWINGS

FIGS. 1(a) and (b) show a rotation stabilizing device in a rotating apparatus of a first embodiment according to the present invention, wherein FIG. 1(a) is a cross sectional side view and FIG. 1(b) is a cross sectional view taken on line A—A and seen in the arrow direction of FIG. 1(a).

FIGS. 5(a) to (c) show a rotation stabilizing device in a rotating apparatus of a second embodiment according to the present invention, wherein FIG. 5(a) is a cross sectional side view, FIG. 5(b) is a cross sectional view taken on line C—C and seen in the arrow direction of FIG. 5(a) and FIG. 5(c) is a view seen in the direction of arrows D—D of FIG. 5(b).

FIGS. 6(a) and (b) show a rotation stabilizing device in a rotating apparatus of a third embodiment according to the present invention, wherein FIG. 6(a) is across-sectional side view and FIG. 6(b) is a cross-sectional view taken on line E—E and seen in the arrow direction of FIG. 6(a).

FIGS. 7(a) and (b) show a rotation stabilizing device in a rotating apparatus of a fourth embodiment according to the present invention, wherein FIG. 7(a) is across sectional side view and FIG. 7(b) is across sectional view taken on line G—G and seen in the arrow direction of FIG. 7(a).

FIGS. 10(a) and (b) show portions of the device of FIG. 9, wherein FIG. 10(a) is a cross sectional view taken on line J—J and seen in the arrow direction of FIG. 9

FIGS. 11(a) and (b) show a rotation stabilizing device in a rotating apparatus of a sixth embodiment according to the present invention, wherein FIG. 11(a) is a cross sectional side view and FIG. 11(b) is a cross sectional view taken on line L—L and seen in the arrow direction of FIG. 11(a).

FIGS. 12(a) and (b) show a rotation stabilizing device in a rotating apparatus of a seventh embodiment according to the present invention, wherein FIG. 12(a) is a cross sectional side view and FIG. 12(b) is a cross sectional view taken on line M—M and seen in the arrow direction of FIG. 12(a).

FIGS. 14(a) to (c) show a rotation stabilizing device in a rotating apparatus of an eighth embodiment according to the present invention, wherein FIG. 14(a) is a cross sectional side view, FIG. 14(b) is a cross sectional view taken on line P—P and seen in the arrow direction of FIG. 14(a) and FIG. 14(c) is a view seen in the direction Q—Q of FIG. 14(b).

FIGS. 15(a) and (b) show a rotation stabilizing device in a rotating apparatus of a ninth embodiment according to the present invention, wherein FIG. 15(a) is a cross sectional side view and FIG. 15(b) is a cross sectional view taken on line R—R and seen in the arrow direction of FIG. 15(a).

FIGS. 16(a) and (b) show a rotation stabilizing device in a rotating apparatus of a tenth embodiment according to the present invention, wherein FIG. 16(a) is a cross sectional side view and FIG. 16(b) is a cross sectional view taken on line S—S and seen in the arrow direction of FIG. 16(a).

FIGS. 19(a) and (b) show portions of the device of FIG. 18, wherein FIG. 19(a) is a view seen in the direction of arrows U—U of FIG. 18

FIGS. 20(a) and (b) show a rotation stabilizing device in a rotating apparatus of a twelfth embodiment according to the present invention, wherein FIG. 20(a) is a cross sectional side view and FIG. 20(b) is a cross sectional view taken on line W—W and seen in the arrow direction of FIG. 20(a).

FIGS. 21(a) and (b) show a rotation stabilizing device in a rotating apparatus of a thirteenth embodiment according to the present invention, wherein FIG. 21(a) is a cross sectional side view and FIG. 21(b) is a cross sectional view taken on line X—X and seen in the arrow direction of FIG. 21(a).

FIGS. 22(a) and (b) show a vibration isolating device of the rotation stabilizing device of the thirteenth embodiment of FIG. 21, wherein FIG. 22(a) is a plan view and FIG. 22(b) is a cross sectional view taken on line Y—Y of FIG. 22(a).

FIGS. 25(a) to (d) explain controls of excitation current in the fourteenth embodiment of FIG. 24, wherein FIG. 25(a) shows wave shapes of vibration at a gap sensor, FIG. 25(b) shows timing of drive pulses of a control unit, FIG. 25(c) shows wave shapes of excitation current and FIG. 25(d) shows wave shapes of the vibration after being isolated.

FIGS. 26(a) to (d) explain controls of excitation current in a fifteenth embodiment according to the present invention, wherein FIG. 26(a) shows wave shapes of vibration at a gap sensor, FIG. 26(b) shows timing of drive pulses of a control unit, FIG. 26(c) shows wave shapes of excitation current and FIG. 26(d) shows wave shapes of the vibration after being isolated.

FIGS. 28(a) and (b) show details of a safety device of the sixteenth embodiment of FIG. 27, wherein FIG. 28(a) is a side view and FIG. 28(b) is a cross sectional view taken on line AA—AA and seen in the arrow direction of FIG. 28(a).

FIGS. 29(a) and (b) are cross sectional views taken on line AB—AB of FIG. 28(a), wherein FIG. 29(a) shows an engaging state of pins and pin holes and FIG. 29(b) shows a disengaging state.

FIGS. 31(a) and (b) show a rotation stabilizing device in a rotating apparatus of a seventeenth embodiment according to the present invention, wherein FIG. 31(a) is a side view and FIG. 31(b) is a cross sectional view taken on line AC—AC and seen in the arrow direction of FIG. 31(a).

FIG. 32 is a cross sectional side view of the rotation stabilizing device in the rotating apparatus of the seventeenth embodiment of FIG. 31, wherein a safety device works to thereby disengage from a rotary shaft.

FIGS. 33(a) to (c) show a rotation stabilizing device in a rotating apparatus of an eighteenth embodiment according to the present invention, wherein FIG. 33(a) is a cross sectional view showing an engaging state of a safety device, FIG. 33(b) is a cross sectional view taken on line AD—AD of FIG. 33(a) and FIG. 33(c) is a cross sectional view showing a disengaging state of the safety device.

FIGS. 34(a) to (c) show a rotation stabilizing device in a rotating apparatus of a nineteenth embodiment according to the present invention, wherein FIG. 34(a) is a cross sectional view showing an engaging state of a safety device, FIG. 34(b) is a cross sectional view showing a disengaging state of the safety device and FIG. 34(c) is a cross sectional view on line AE—AE of FIG. 34(a).

FIGS. 35(a) and (b) show a rotation stabilizing device in a microgravitational rotating apparatus in the prior art, wherein FIG. 35(a) is a cross sectional side view and FIG. 35(b) is a cross sectional view taken on line AF—AF and seen in the arrow direction of FIG. 35(a).

FIGS. 36(a) and (b) show another rotation stabilizing device in a microgravitational rotating apparatus in the prior art, wherein FIG. 36(a) is a cross sectional side view and FIG. 36(b) is a cross sectional view taken on line AG—AG and seen in the arrow direction of FIG. 36(a).

FIGS. 37(a) to (c) show still another rotation stabilizing device in a microgravitational rotating apparatus in the prior art, wherein FIG. 37(a) is a cross sectional side view, FIG. 37(b) is a cross sectional view taken on line AH—AH and seen in the arrow direction of FIG. 37(a) and FIG. 37(c) is a cross sectional view taken on line AJ—AJ of FIG. 37(a).

DESCRIPTION OF THE PREFERRED EMBODIMENTS

Herebelow, embodiments according to the present invention will be described with reference to the drawings.

Figure 1A:
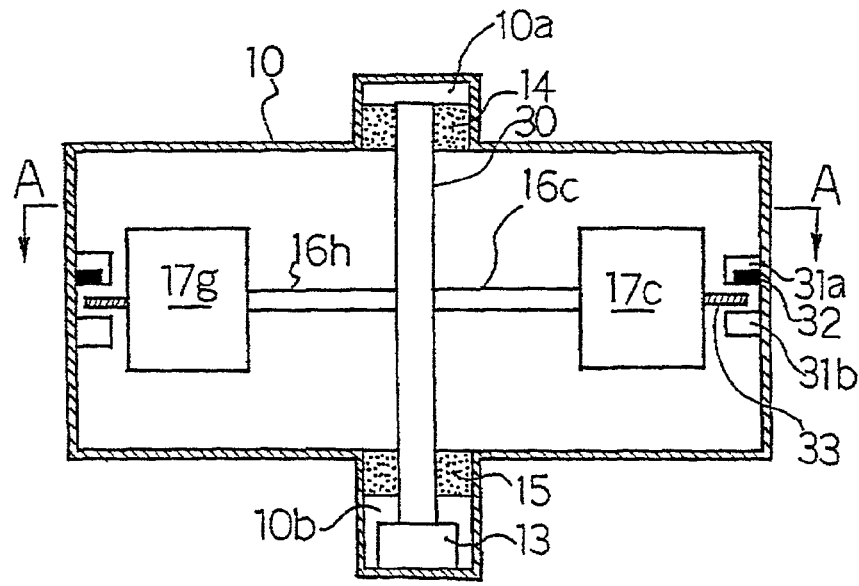
Figure 1B:
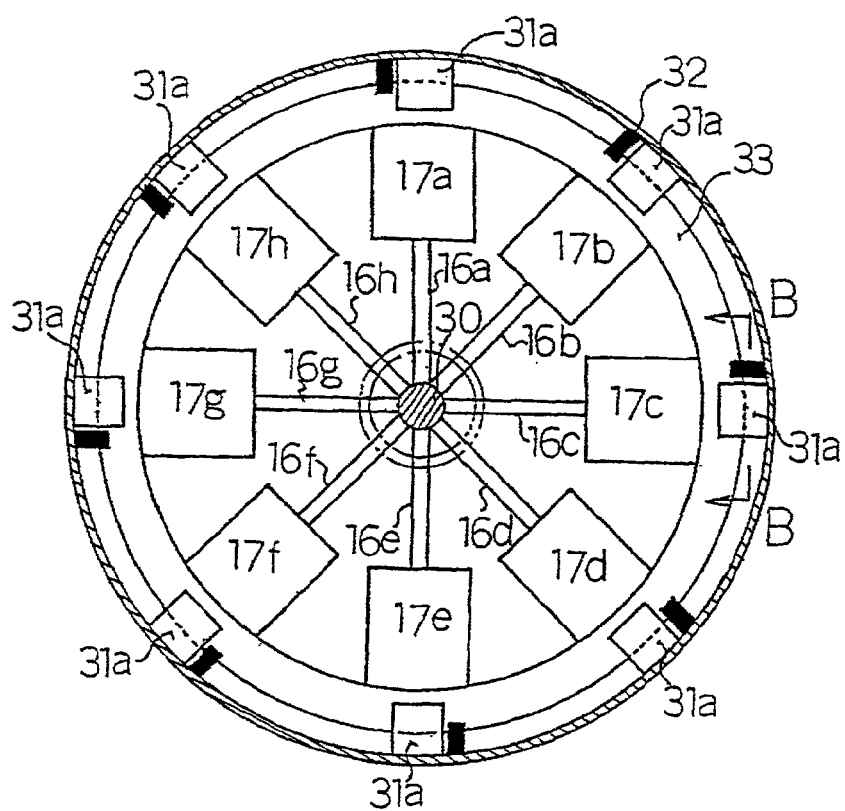

FIGS. 1(a) and (b) show a rotation stabilizing device in a rotating apparatus of a first embodiment according to the present invention, wherein FIG. 1(a) is a cross sectional side view and FIG. 1(b) is a cross sectional view taken on line A—A and seen in the arrow direction of FIG. 1(a).

As shown in FIGS. 1(a) and (b), within a casing 10, there are provided recess portions 10a, 10b projecting outwardly from upper and lower outer walls of the casing 10 and bearings 14, 15 are arranged in the recess portions 10a, 10b, respectively. The bearings 14, 15 may be any of magnetic bearings, rolling bearings, bearings that absorb vibration of a shaft by an elastic material, other usual bearings including air or fluid bearings, etc., as described with respect to the prior art.

A rotary shaft 30 is supported by the bearings 14, 15 rotatably by a motor 13 that is connected to a lower end of the rotary shaft 30. Arms of an appropriate number of pieces, eight arms 16a, 16b, 16c, 16d, 16e, 16f, 16g and 16h in the example of the illustration, are fitted to the rotary shaft 30 extending orthogonally thereto. At ends of the arms, boxes or containers of an arbitrary shape (hereinafter referred to as "the experimental boxes") 17a, 17b, 17c, 17d, 17e, 17f, 17g and 17h are fitted. Experimental objects, such as plants or animals, or devices, such as experimental devices of materials or manufacturing devices of materials, are placed in the experimental boxes and are driven by the motor 13 to rotate at a slow speed, so that experiments to observe a growing state of the plants or a living state of the animals in space or experiments or manufacturing of materials are carried out. It is to be noted that while the above experimental boxes are shown with an example of eight pieces, they are not limited thereto, but may be less or more than that, and also their shape is not limited to the hexahedron having six square faces, as illustrated, but may be an arbitrary one.

A fin 33 of a flat plate ring shape is fitted to outer circumferential surfaces of the experimental boxes 17a to 17h, so that the experimental boxes 17a to 17h are integrally connected to one another by the fin 33. Pairs of upper and lower electromagnetic coils 31a, 31b are fitted to an inner circumferential wall surface of the casing 10 so as to correspond to the arrangement of each of the experimental boxes 17a to 17h, that are arranged with equal intervals in the circumferential direction. Thus, the electromagnetic coils 31a, 31b are provided in eight pairs with equal intervals on the inner circumferential wall surface of the casing 10, wherein the electromagnetic coils 31a, 31b of each pair face each other with a predetermined gap being maintained therebetween and the fin 33 is interposed so as to be positioned centrally in the gap.

Close to the electromagnetic coils 31a, 31b, gap sensors 32 are fitted to the inner circumferential wall surface of the casing 10 for measuring gaps between an upper surface of the fin 33 and lower surfaces of the electromagnetic coils 31a. It is to be noted that the gap sensors 32 may be provided both on the upper and lower sides of the fin 33 as pairs but, even if they are provided only on one side thereof, movement of the fin 33, or displacement of each of the experimental boxes 17a to 17h due to vibration, can be measured and the mentioned single side arrangement of the gap sensors is employed in the present example.

Figure 2:
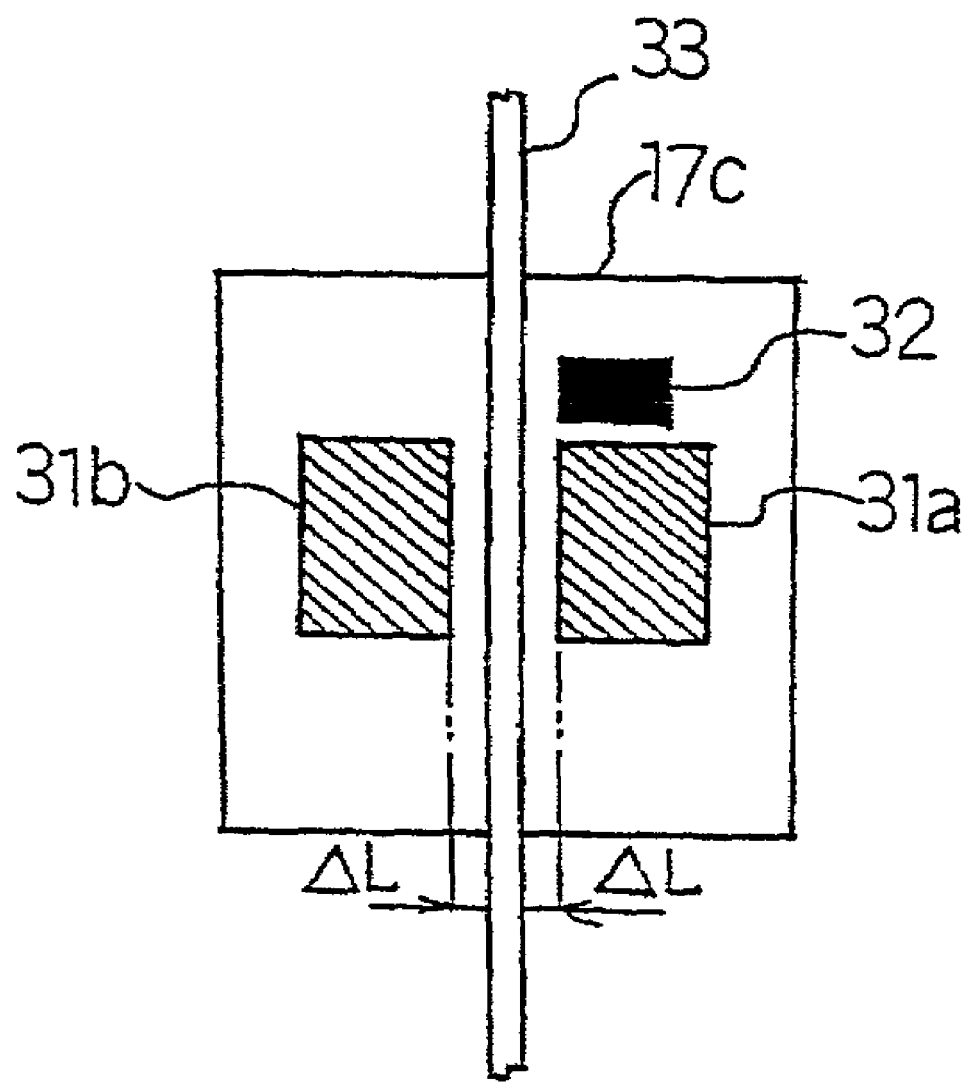
FIG. 2 is a cross sectional view taken on line B—B of FIG. 1(b).

FIG. 2 is a cross sectional view taken on line B—B of FIG. 1(b). The fin 33 fitted to the outer circumferential surface of the experimental box 17c is interposed in the gap between the electromagnetic coils 31a, 31b with gaps ΔL being maintained between the fin 33 and the respective electromagnetic coils 31a, 31b. Also, the gap sensor 32 is arranged close to the electromagnetic coil 31a so that variation in the gap ΔL between the electromagnetic coil 31a and the fin 33 may be detected.

Figure 3:
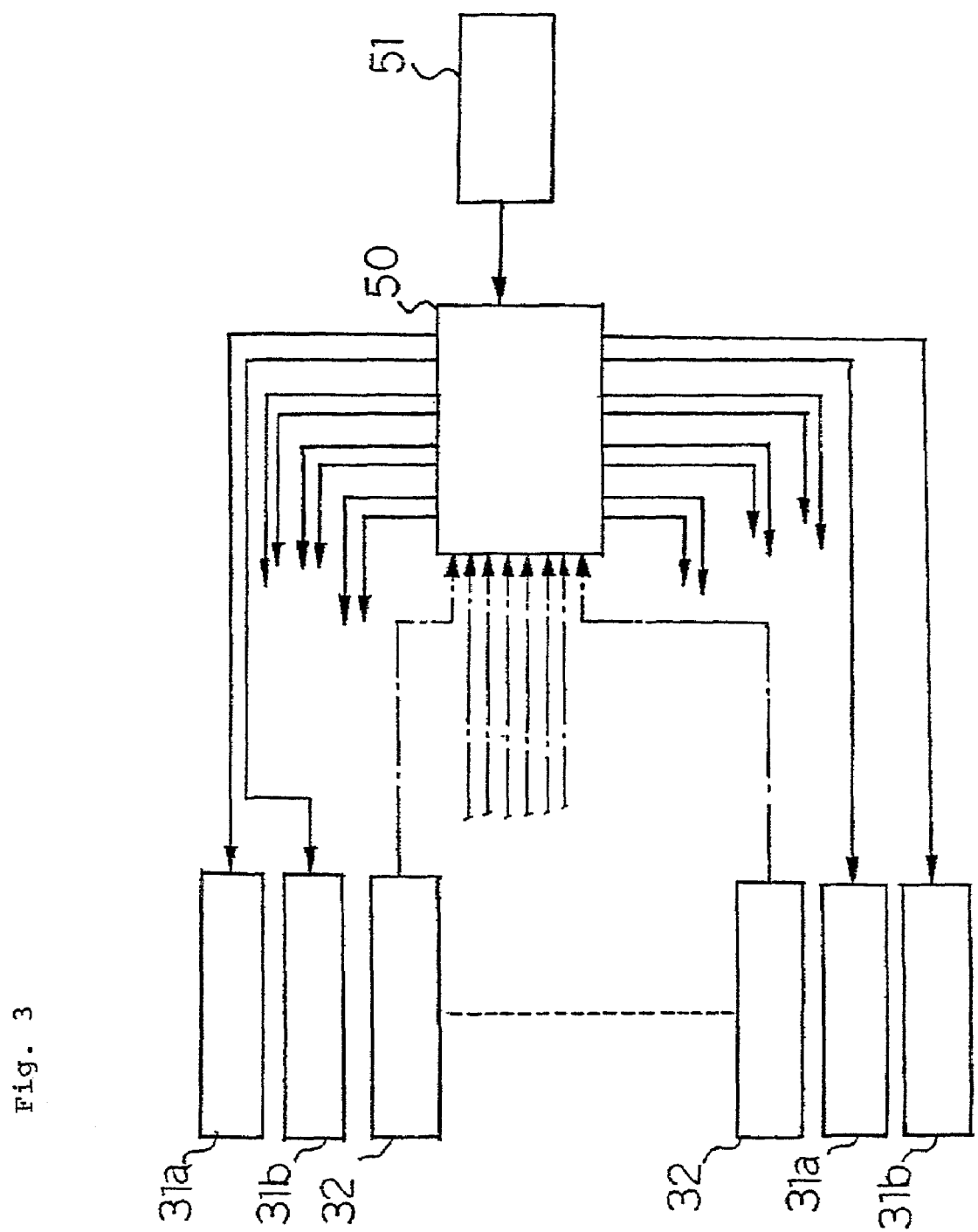
FIG. 3 is a control diagram with respect to the rotation stabilizing device of the first embodiment of FIG. 1.

FIG. 3 is a control diagram of the first embodiment of FIGS. 1(a) and (b). Where the pair of the electromagnetic coils 31a, 31b and the gap sensor 32 arranged close to the electromagnetic coils 31a, 31b are defined as a set of the coils and the gap sensor, eight sets thereof are provided and signals detected by the eight gap sensors 32 are inputted into a control unit 50. An input device 51 is connected to the control unit 50 and a demand value of the vibration control is inputted from the input device 51 to be set in the control unit 50. As the demand value, an upper limit value of the gap between the fin 33 and the electromagnetic coil 31a, for example, is inputted.

Figure 4:
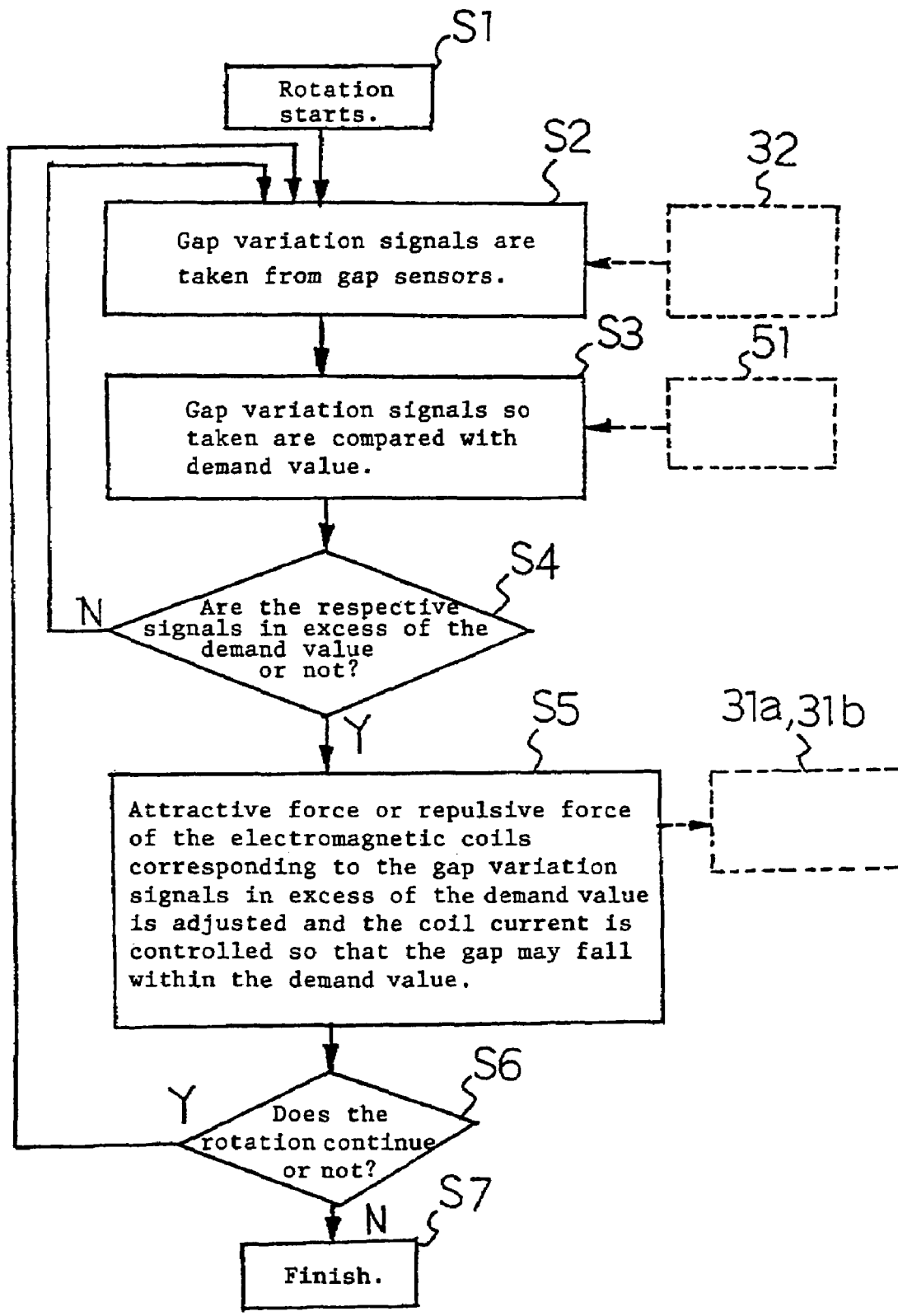
FIG. 4 is a control flow chart with respect to a control unit used for the control of FIG. 3.

At the control unit 50, when it receives signals from the eight gap sensors 32 and detects that the gaps between the fin 33 and the respective gap sensors 32 exceed the demand value at the respective positions of the gap sensors 32, the control unit 50 controls excitation current of the electromagnetic coils 31a, 31b of the respective positions to thereby adjust the attractive force or repulsive force of the coils so that the fin 33 may return to the ordinary position within the demand value. By such control, the fin 33 may maintain the respective equivalent positions at the eight gap sensors 32 and displacement due to vibration of the eight experimental boxes 17a to 17h, that are connected together by the fin 33, can be suppressed. FIG. 4 is a control flow chart with respect to the control unit 50 described above. Steps of the control operation are shown by designations S1 to S7. When the rotating apparatus starts to rotate (S1), the control unit takes signals of the gap variations from the eight gap sensors 32(S2). The respective signals detected by the gap sensors 32 are compared with the demand value inputted from the input device 51 (S3) and ascertained whether they are in excess of the demand value or not (S4). If the case is in excess of the demand value, it proceeds to S5, and if the case is not in excess thereof, it returns to S2 and signals from the gap sensors 32 are taken again.

If, at any of the eight gap sensors 32, the gap variation signal is in excess of the demand value, excitation current of the electromagnetic coils 31a, 31b corresponding to that gap variation signal is controlled so as to adjust attractive force or repulsive force of the fin 33 and thereby the gap is controlled to fall within the demand value (S5). Then, whether the rotation continues or not is ascertained (S6) and, if yes, the step returns to S2 and signals from the gap sensors 32 are taken again. If the rotation is to finish, the steps finish (S7).

According to the first embodiment as mentioned above, the construction is made such that the eight rotatable experimental boxes 17a to 17h have their outer circumferential surfaces fixedly connected together by the ring-shaped fin 33, the eight pairs of mutually facing electromagnetic coils 31a, 31b are fitted to the inner circumferential wall surface of the casing 10 so that the fin 33 may be arranged with predetermined gaps being maintained between the fin 33 and the respective electromagnetic coils 31a, 31b and the gap sensors 32 are arranged close to the electromagnetic coils 31a, 31b. By such construction, the control unit 50 controls excitation current of the electromagnetic coils 31a, 31b so that the gaps between the fin 33 and the respective electromagnetic coils 31a, 31b may fall within the demand value. Hence, displacement due to vibration of each of the experimental boxes 17a to 17h is suppressed and a stable rotation of the rotating apparatus can be realized.

Also, as the experimental boxes 17a to 17h are integrally fixed together by the ring-shaped fin 33, strength as a rotating apparatus is enhanced and also the effect to reduce imbalances in the vibration can be obtained.

Figure 5A:
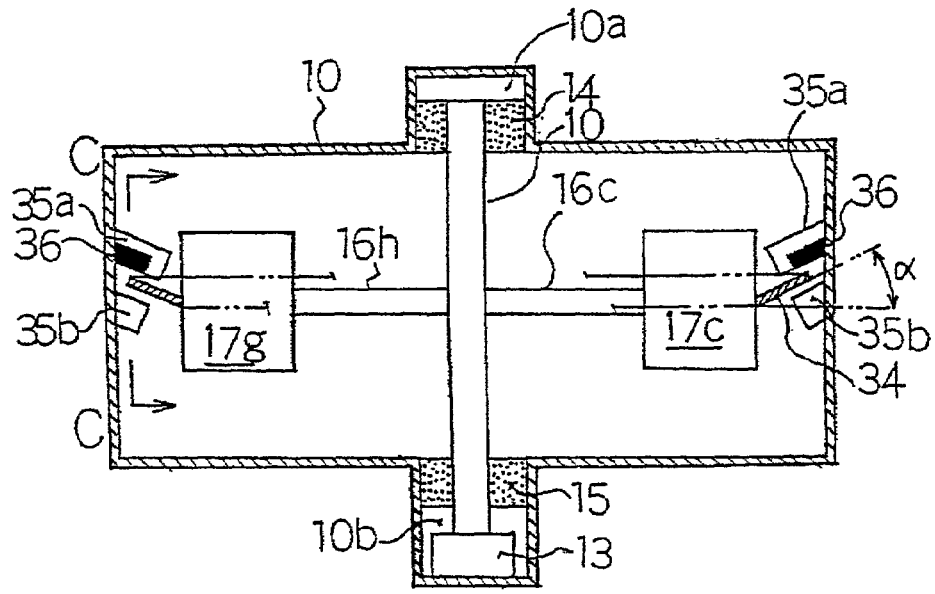
Figure 5B:
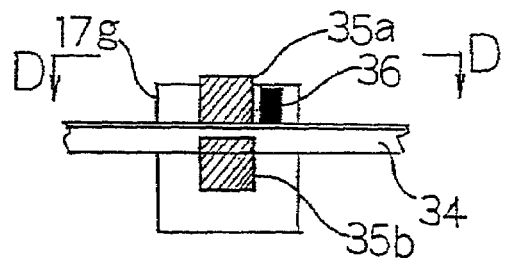
Figure 5C:
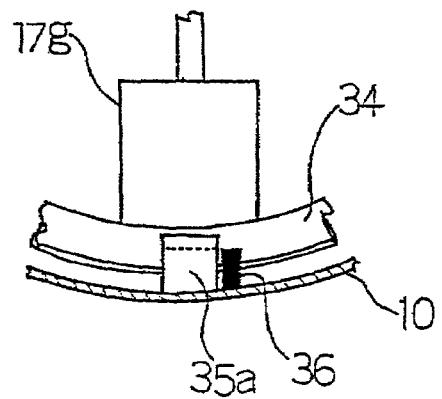

FIGS. 5(a) to (c) show a rotation stabilizing device in a rotating apparatus of a second embodiment according to the present invention, wherein FIG. 5(a) is a cross sectional side view, FIG. 5(b) is a cross sectional view taken on line C—C and seen in the arrow direction of FIG. 5(a) and FIG. (c) is a view seen in the direction of arrows D—D of FIG. 5(b). In the present second embodiment, differently from the fin and coil structure of the first embodiment in which the fin 33 of the flat plate ring shape is fitted orthogonally to the outer circumferential surfaces of the experimental boxes 17a to 17h, the structure is made such that a fin 34 formed in a frustoconical shape has its inner diameter end portion fitted to the outer circumferential surfaces of the experimental boxes 17a to 17h so as to make an inclined angle thereto and pairs of electromagnetic coils 35a, 35b and gap sensors 36 are also arranged with the inclined angle corresponding to the fin 34. Construction of other portions is the same as that of the first embodiment shown in FIG. 1.

That is, as shown in FIG. 5(a), the fin 34 is arranged inclinedly with an angle α to the direction orthogonal to the outer circumferential surfaces of the experimental boxes 17c and 17g and the electromagnetic coils 35a, 35b, facing each other with predetermined gaps being maintained from the fin 34, are also fitted inclinedly with the angle α to the inner circumferential wall surface of the casing 10. Likewise, the gap sensors 36 are fitted inclinedly with the angle α.

In FIGS. 5(b) and (c), the fin 34 is fitted inclinedly to the experimental box 17g and the electromagnetic coils 35a, 35b are arranged on the casing 10 side with the fin 34 being interposed therebetween and with the predetermined gaps being maintained from the fin 34. Also, the gap sensor 36 is arranged close to the electromagnetic coil 35a.

In the present second embodiment as described above, as in the first embodiment, the construction is made such that the fin 34 is fitted to be interposed between the pairs of mutually facing electromagnetic coils 35a, 35b with the predetermined gap being maintained therebetween and the gap sensors 36 are arranged close to the electromagnetic coils 35a, 35b. By such construction, as in the first embodiment, excitation current of the electromagnetic coils 35a, 35b is controlled so that the gaps between the fin 34 and the respective elecromagnetic coils 35a, 35b may fall within the demand value. Thereby, vibration of each of the eight experimental boxes 17a to 17h is suppressed and a stable rotation thereof can be ensured. Moreover, the fin 34 is formed in the frustoconical shape so that the integral structure of the experimental boxes 17a to 17h may be further strengthened and thereby the vibration imbalances can be lessened as a whole.

Figure 6A:
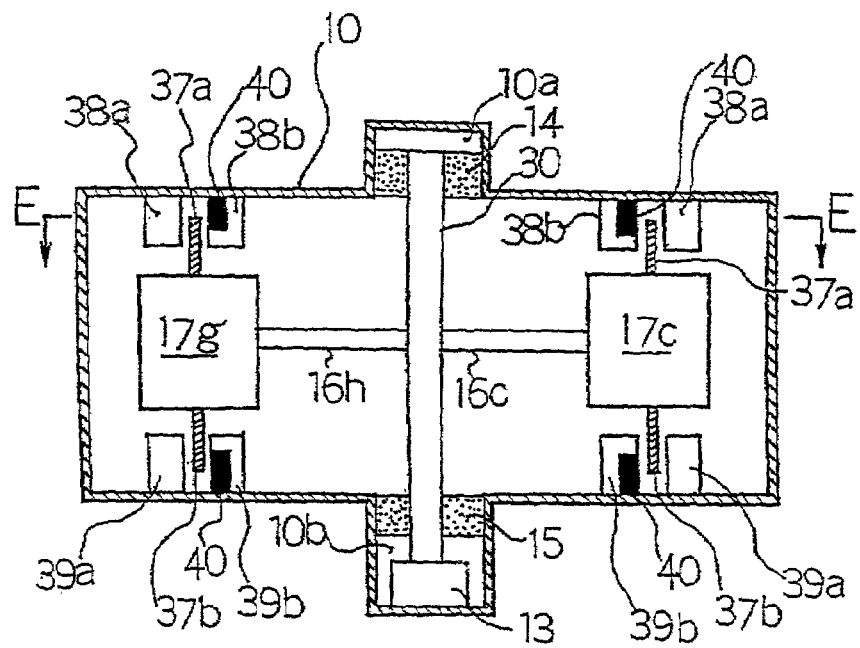
Figure 6B:
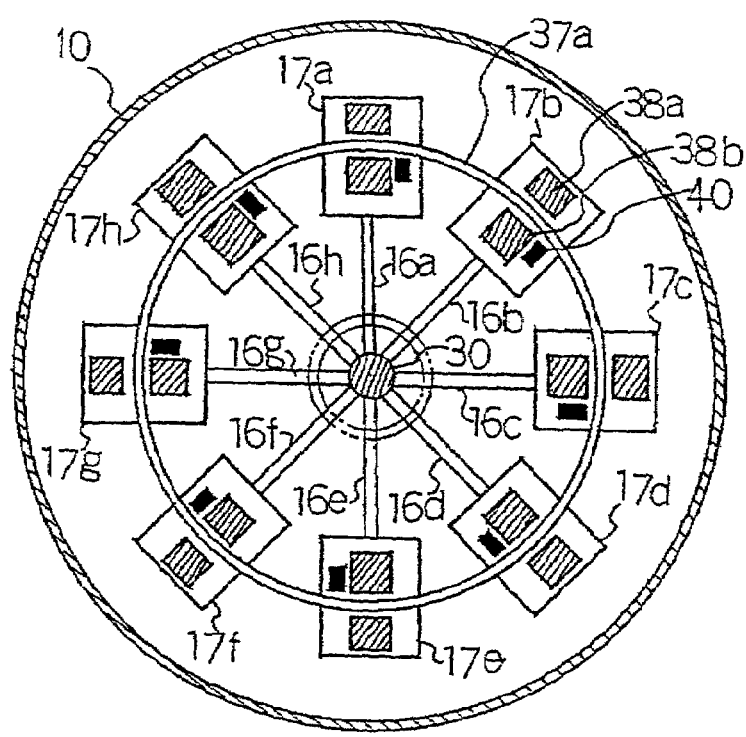

FIGS. 6(a) and (b) show a rotation stabilizing device in a rotating apparatus of a third embodiment according to the present invention, wherein FIG. 6(a) is a cross sectional side view and FIG. 6(b) is a cross sectional view taken on line E—E and seen in the arrow direction of FIG. 6(a). In the present third embodiment, the construction is made such that the fin is not fitted to the outer circumferential surfaces of the experimental boxes, but two cylindrical fins 37a, 37b are fitted to upper and lower surfaces of the experimental boxes 17a to 17h, projecting therefrom, and the electromagnetic coils and the gap sensors are fitted to upper and lower inner wall surfaces of the casing. Construction of other portions is the same as that of the first embodiment shown in FIG. 1.

In FIGS. 6(a) and (b), the fins 37a, 37b are fitted to the upper and lower surfaces of the experimental boxes 17a to 17h projecting orthogonally thereto. Electromagnetic coils 38a, 38b, facing each other, are fitted to the upper inner wall surface of the casing 10 so as to be positioned on the outer and inner circumferential sides, respectively, of the fin 37a with predetermined gaps being maintained between the fin 37a and the respective electromagnetic coils 38a, 38b. Also, gap sensors 40 are fitted to the upper inner wall surface of the casing 10 close to the electromagnetic coils 38a, 38b on the inner circumferential side of the fin 37a. Likewise, electromagnetic coils 39a, 39b and gap sensors 40 are arranged with respect to the fin 37b of the lower side of the experimental boxes 17a to 17h.

In the present third embodiment constructed as mentioned above, the cylindrical fins 37a, 37b are arranged on the upper and lower surfaces of the experimental boxes 17a to 17h and the electromagnetic coils 38a, 38b, facing each other, on the upper inner wall surface of the casing 10 and the electromagnetic coils 39a, 39b, facing each other, on the lower inner wall surface of the casing 10 are arranged so as to be positioned on the outer and inner circumferential sides, respectively, of the fins 37a, 37b with the predetermined gaps being maintained from the fins 37a, 37b. As in the first embodiment, a control unit controls excitation current of the coils so that the gaps may fall within the demand value and displacement of the fins 37a, 37b is suppressed. Thereby, vibration of the experimental boxes 17a to 17h is suppressed and a stable rotation of the experimental boxes 17a to 17h can be realized.

Moreover, the fins 37a, 37b fix the upper and lower surfaces of the experimental boxes 17a to 17h so as to more strongly integrate the experimental boxes 17a to 17h and thereby vibration imbalances can be further lessened.

Figure 7A:
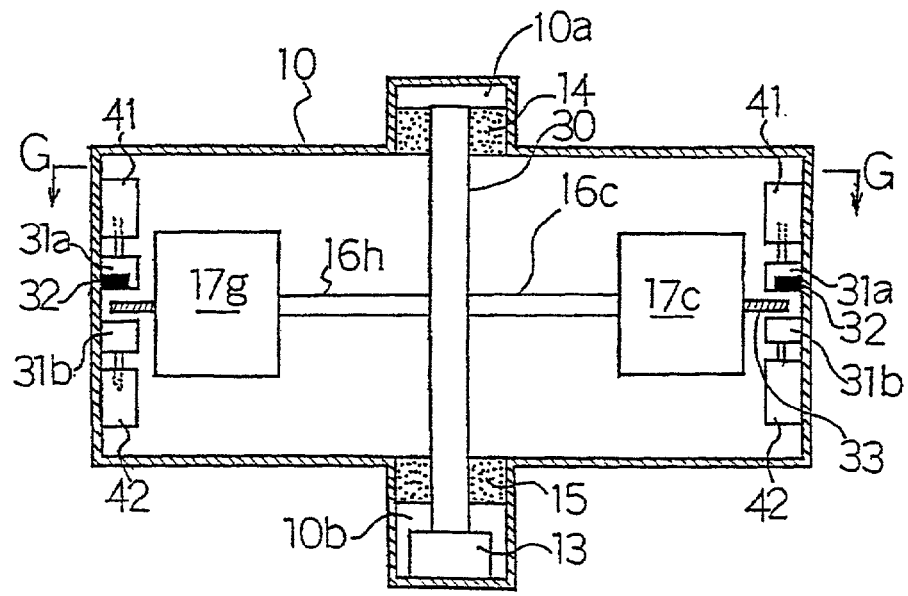
Figure 7B:
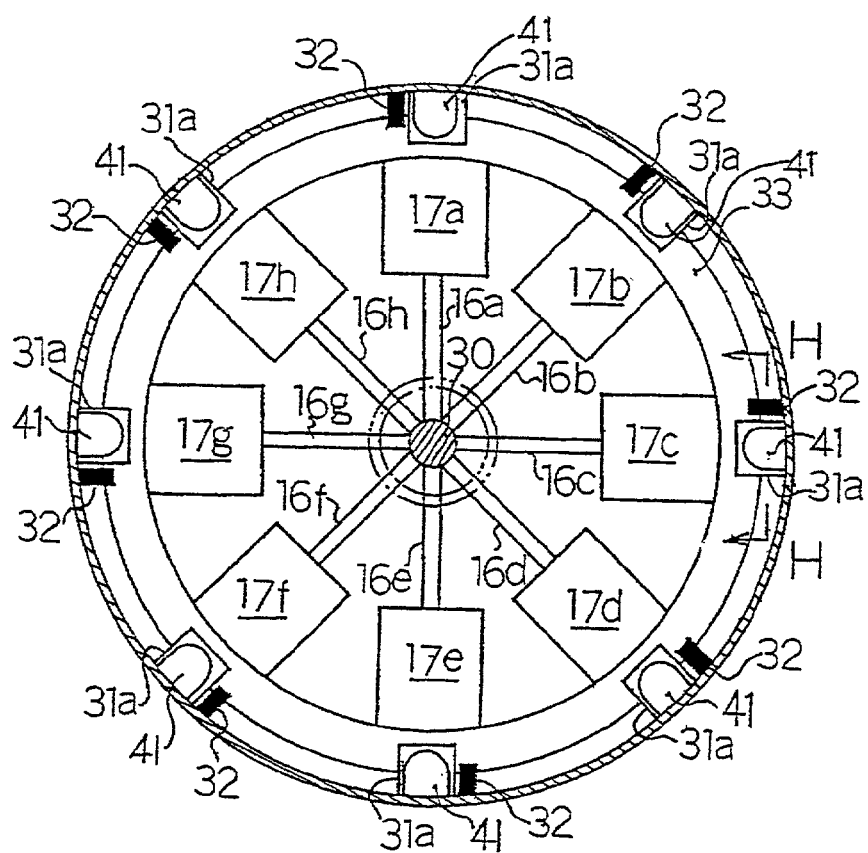

FIGS. 7(a) and (b) show a rotation stabilizing device in a rotating apparatus of a fourth embodiment according to the present invention, wherein FIG. 7(a) is a cross sectional side view and FIG. 7(b) is a cross sectional view taken on line G—G and seen in the arrow direction of FIG. 7(a). In the present fourth embodiment, the construction is made such that while the fin 33 is the same as that of the first embodiment shown in FIG. 1, the electromagnetic coils 31a, 31b on the casing 10 side are movable by cylinders 41, 42. Construction of other portions is the same as that of the first embodiment of FIG. 1.

The ring-shaped fin 33 is fitted to the outer circumferential surfaces of the experimental boxes 17a to 17h, so that the experimental boxes 17a to 17h are integrally connected to one another by the fin 33. The cylinders 41, 42, formed in pairs of upper and lower cylinders, are fitted to the inner circumferential wall surface of the casing 10 at positions corresponding to each of the experimental boxes 17a to 17h, that are arranged with equal intervals in the circumferential direction. The electromagnetic coils 31a, 31b are fitted to rod ends of each pair of the cylinders 41, 42. Thus, the electromagnetic coils 31a, 31b are provided in eight pairs with equal intervals on the inner circumferential wall surface of the casing 10 and, being connected to rods of the cylinders 41, 42, are movable in the direction orthogonal to the fin 33. Between the electromagnetic coils 31a, 31b, arranged facing each other, the fin 33 is interposed with predetermined gaps being maintained between the fin 33 and the respective electromagnetic coils 31a, 31b. Each of the electromagnetic coils 31a, 31b is supplied with excitation current from a control unit (not shown), so that the fin 33 is supported non-contact-wise by attractive force or repulsive force of the electromagnetic coils 31a, 31b.

Close to the electromagnetic coils 31a, 31b, gap sensors 32 are fitted to the inner circumferential wall surface of the casing 10 for measuring the gaps between the fin 33 and the electromagnetic coils 31a at the respective positions of the electromagnetic coils 31a. It is to be noted that the gap sensors 32 may be provided both on the upper and lower sides of the fin 33 as pairs but, even if they are provided only on one side thereof, movement of the fin 33, or displacement of each of the experimental boxes 17a to 17h due to vibration, can be measured; the mentioned single side arrangement of the gap sensors is employed in the present example. Also, permanent magnets may be used in place of the electromagnetic coils.

Figure 8:
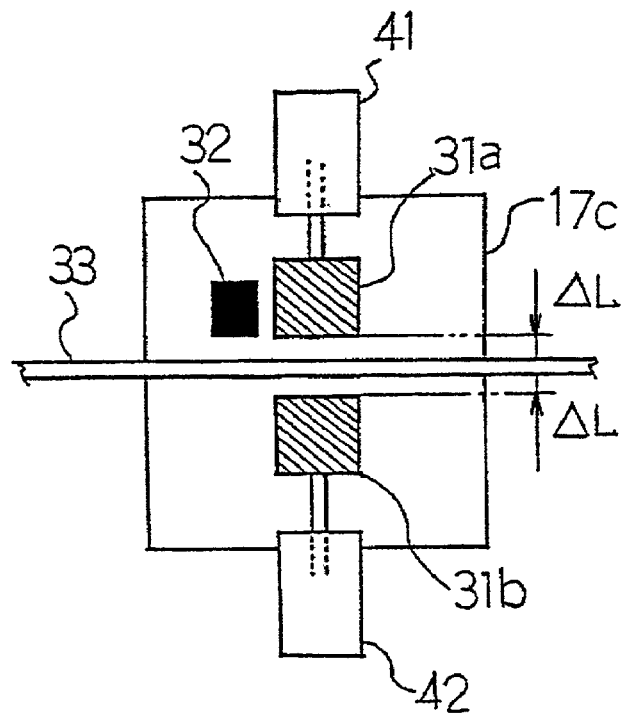
FIG. 8 is a cross sectional view taken on line H—H of FIG. 7(b).

FIG. 8 is a cross sectional view taken on line H—H of FIG. 7(b). The pair of the electromagnetic coils 31a, 31b, facing each other, are fitted to the rod ends of the pair of the cylinders 41, 42. The fin 33 fitted to the outer circumferential surface of the experimental box 17c is interposed in the gap between the electromagnetic coils 31a, 31b, wherein gaps ΔL are maintained between the fin 33 and the respective electromagnetic coils 31a, 31b. Close to the electromagnetic coil 31a, the gap sensor 32 is fitted to the inner circumferential wall surface of the casing 10 so that variation in the gap ΔL between the fin 33 and the electromagnetic coil 31a may be detected. It is to be noted that the cylinders 41, 42 may be either of a fluid type or of an electric type.

In the present fourth embodiment also, the control diagram of FIG. 3 and the control flow chart of FIG. 4 are applicable as they are and the same controls to take signals from the gap sensors 32 for driving the cylinders 41, 42 are possible. With the mode of the controls being the same as that described in the first embodiment, description thereon will be omitted.

According to the fourth embodiment as mentioned above, the construction is made such that the eight rotatable experimental boxes 17a to 17h have their outer circumferential surfaces fixedly connected together by the ring-shaped fin 33 and the eight pairs of mutually facing electromagnetic coils 31a, 31b are fitted to the inner circumferential wall surface of the casing 10 so that the fin 33 may be interposed with predetermined gaps being maintained between the fin 33 and the respective electromagnetic coils 31a, 31b. The electromagnetic coils 31a, 31b are connected to the rod ends of the cylinders 41, 42 so as to adjust the gap between the coils 31a, 31b and the gap sensors 32 are arranged close to the electromagnetic coils 31a, 31b. By such construction, the control unit 50 controls to drive the cylinders 41, 42 so that the gaps between the fin 33 and the respective electromagnetic coils 31a, 31b may fall within the demand value. Hence, displacement due to vibration of the respective experimental boxes 17a to 17h is suppressed and a stable rotation of the rotating apparatus can be realized.

Also, as the experimental boxes 17a to 17h are integrally fixed together by the ring-shaped fin 33, the strength thereof as a rotating apparatus is enhanced and also the effect to reduce imbalances in the vibration can be obtained.

Figure 9:
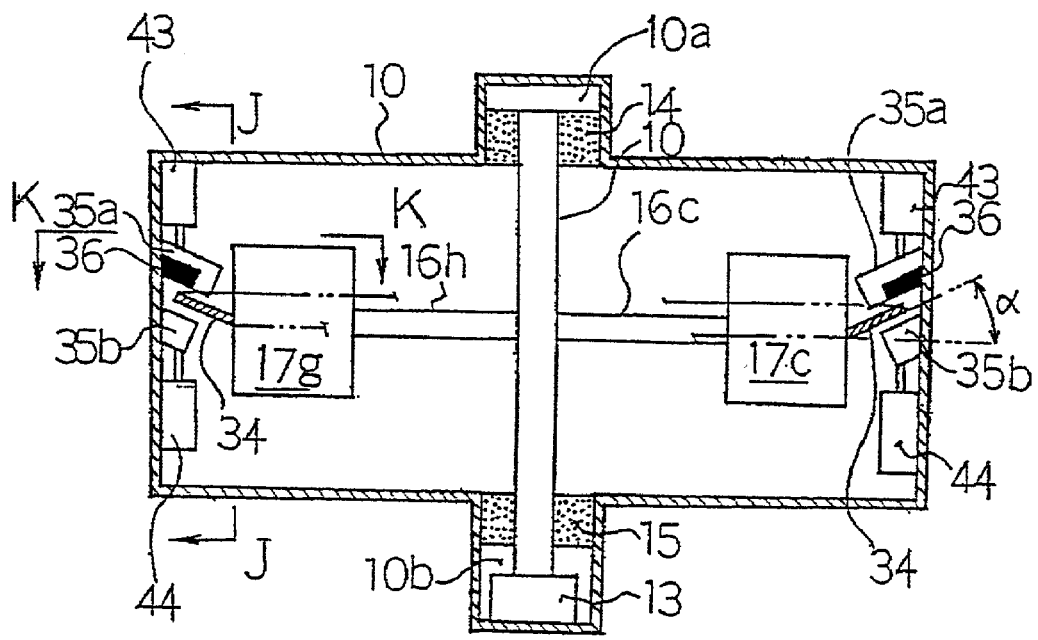
FIG. 9 is a cross sectional side view of a rotation stabilizing device in a rotating apparatus of a fifth embodiment according to the present invention.

FIG. 9 is a cross sectional side view of a rotation stabilizing device in a rotating apparatus of a fifth embodiment according to the present invention. In the present fifth embodiment, unlike the structure of the ring-shaped flat plate fin 33 of the fourth embodiment that is fitted orthogonally to the outer circumferential surfaces of the experimental boxes 17a to 17h, a frustoconical fin 34 has its smaller inner diameter end portion fitted to the outer circumferential surfaces of the experimental boxes 17a to 17h so as to make an inclined angle thereto. Pairs pairs of the electromagnetic coils 35a, 35b and the gap sensors 36 are also arranged with the inclined angle corresponding to the fin 34. Cylinders 43, 44 are fitted to the inner circumferential wall surface of the casing 10 and the electromagnetic coils 35a, 35b are fitted to rod ends of the cylinders 43, 44. Construction of other portions is the same as that of the fourth embodiment shown in FIG. 7.

That is, if the description is made representatively on the experimental box 17c, the fin 34 is arranged inclinedly with an angle α to the direction orthogonal to the outer circumferential surface of the experimental box 17c and the electromagnetic coils 35a, 35b, facing each other with predetermined gaps being maintained from the fin 34, are also fitted inclinedly with the angle α to the inner circumferential wall surface of the casing 10. Likewise, the gap sensor 36 is fitted inclinedly with the angle α. The electromagnetic coils 35a, 35b are connected to the rod ends of the cylinders 43, 44 and, by movement of the cylinders 43, 44, the gaps between the fin 34 and the respective electromagnetic coils 35a, 35b are adjustable, as in the first embodiment.

Figure 10A:
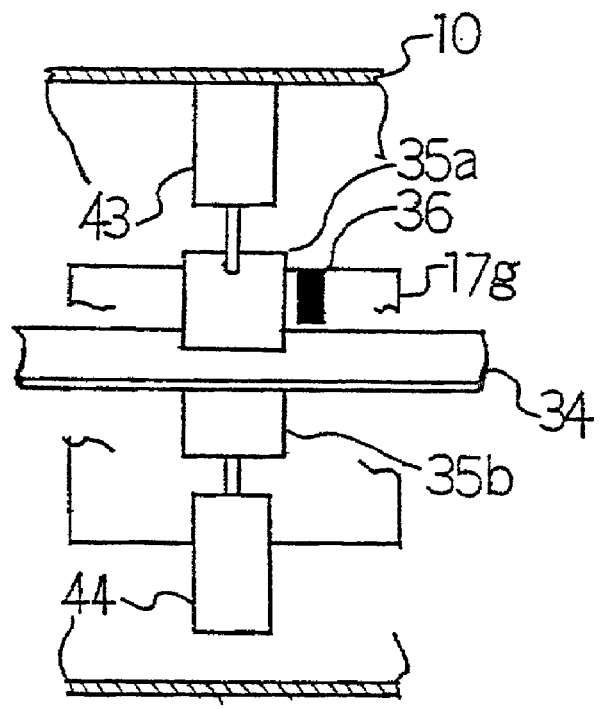
Figure 10B:
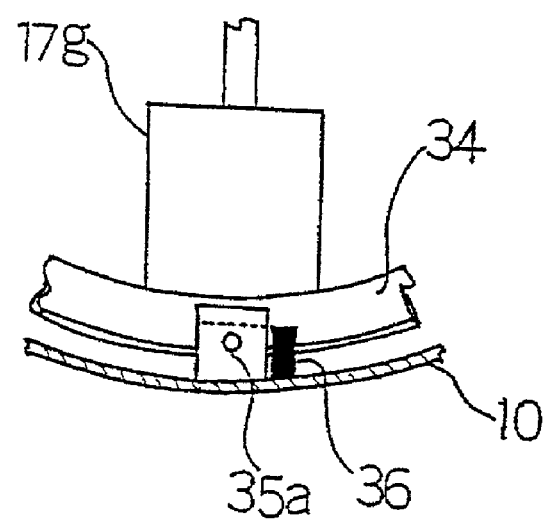
FIG. 10(b) is a cross sectional view taken on line K—K and seen in the arrow direction of FIG. 9.

FIGS. 10(a) and (b) show portions of the device of FIG. 9, wherein FIG. 10(a) is a cross sectional view taken on line J—J and seen in the arrow direction of FIG. 9 and FIG. 10(b) is a cross sectional view taken on line K—K and seen in the arrow direction of FIG. 9. There, the fin 34 is fitted inclinedly to the experimental box 17g and is interposed with the predetermined gaps being maintained between the fin 34 and the respective electromagnetic coils 35a, 35b. Also, the gap sensor 36 is arranged close to the electromagnetic coil 35a.

According to the fifth embodiment as mentioned above, the inclined fin 34, as in the second embodiment of FIG. 5, is interposed between the pairs of the electromagnetic coils 35a, 35b with the predetermined gaps being maintained therebetween and the electromagnetic coils 35a, 35b are connected to the cylinders 43, 44, as in the fourth embodiment of FIG. 7, so that the gaps may be adjusted. Also, the gap sensors 36 are arranged close to the electromagnetic coils 35a, 35b. By such construction, as in the first embodiment, positions of the electromagnetic coils 35a, 35b are adjusted by the cylinders 43, 44 so that the gaps between the fin 34 and the respective electromagnetic coils 35a, 35b may fall within the demand value and thereby vibration of each of the experimental boxes 17a to 17h is suppressed and a stable rotation can be realized. Moreover, as the fin 34 is formed in the frustoconical shape, the integral structure of the experimental boxes 17a to 17h is further strengthened and imbalances in the vibration can be lessened as a whole.

Figure 11A:
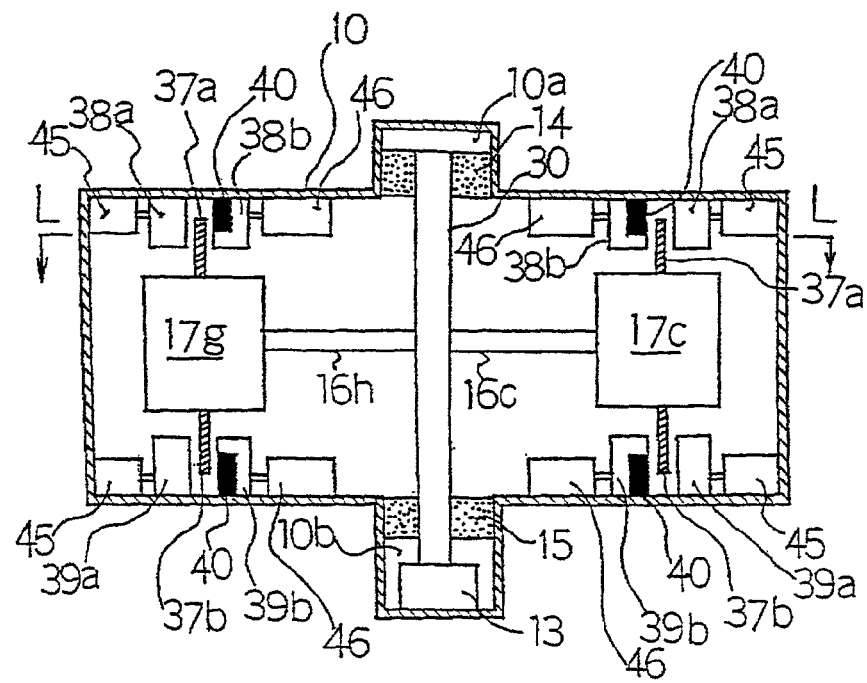
Figure 11B:
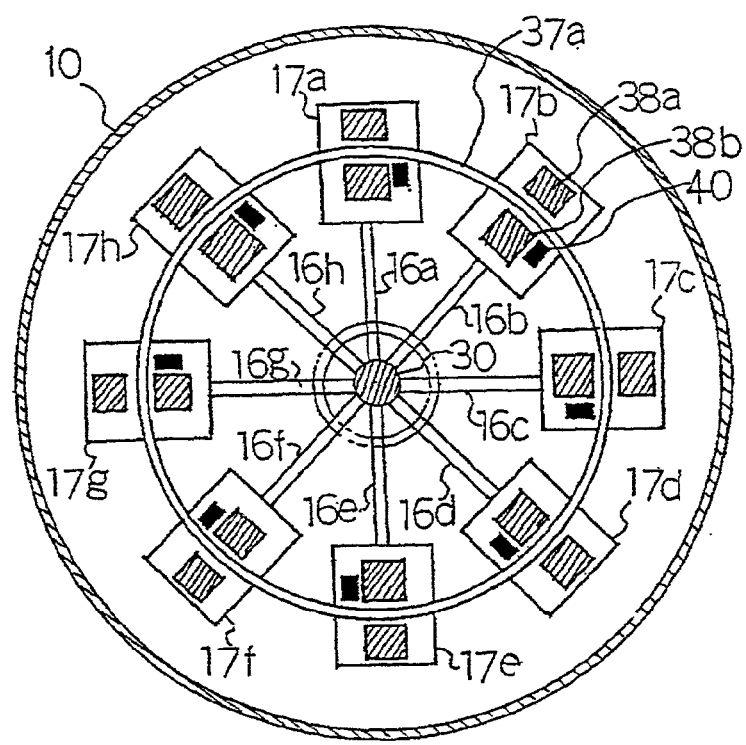

FIGS. 11(a) and (b) show a rotation stabilizing device in a rotating apparatus of a sixth embodiment according to the present invention, wherein FIG. 11(a) is a cross sectional side view and FIG. 11(b) is a cross sectional view taken on line L—L and seen in the arrow direction of FIG. 11(a). In the present sixth embodiment, the fin is not fitted to the outer circumferential surfaces of the experimental boxes but two fins are fitted to the upper and lower surfaces of the experimental boxes projecting orthogonally thereto. The electromagnetic coils and the gap sensors are fitted to the upper and lower inner wall surfaces of the casing and the electromagnetic coils are moved by the cylinders so as to adjust the gaps between the fin and the electromagnetic coils. Construction of other portions is the same as that of the fourth embodiment shown in FIG. 7.

In FIGS. 11(a) and (b), fins 37a, 37b formed in cylindrical shapes are fitted to the upper and lower surfaces of the experimental boxes 17a to 17h projecting orthogonally thereto. Electromagnetic coils 38a, 38b, facing each other, are fitted to the upper inner wall surface of the casing 10 so as to be positioned on the outer and inner circumferential sides, respectively, of the fin 37a with predetermined gaps being maintained between the fin 37a and the respective coils 38a, 38b. Cylinders 45, 46 are fitted to the upper inner wall surface of the casing 10 and the electromagnetic coils 38a, 38b are connected to rod ends of the cylinders 45, 46, respectively. Close to the electromagnetic coils 38b, 39b on the inner circumferential side of the fin 37a, gap sensors 40 are fitted to the upper inner wall surface of the casing 10. Likewise, electromagnetic coils 39a, 39b, cylinders 45, 46 and gap sensors 40 are arranged with respect to the fin 37b on the lower side of the experimental boxes 17a to 17h.

In the present sixth embodiment constructed as mentioned above, the cylindrical fins 37a, 37b are arranged on the upper and lower surfaces of the experimental boxes 17a to 17h. The electromagnetic coils 38a, 38b, facing each other, on the upper side of the experimental boxes 17a to 17h and the electromagnetic coils 39a, 39b, facing each other, on the lower side of the experimental boxes 17a to 17h are arranged so as to be positioned on the outer and inner circumferential sides, respectively, of the fins 37a, 37b with predetermined gaps being maintained there. The gaps are adjustable by the cylinders 45, 46. As in the first embodiment, the control unit controls to drive the cylinders 45, 46 so that the gaps between the fins 37a, 37b and the electromagnetic coils 38a, 38b and 39a, 39b may fall within the demand value. Thereby, displacement of the fins 37a, 37b is suppressed, vibration of the experimental boxes 17a to 17h is suppressed and a stable rotation can be realized.

Moreover, as the cylindrical fins 37a, 37b fix the upper and lower surfaces of the experimental boxes 17a to 17h, the integral structure of the experimental boxes 17a to 17h is further strengthened and imbalances in the vibration can be lessened.

Figure 12:
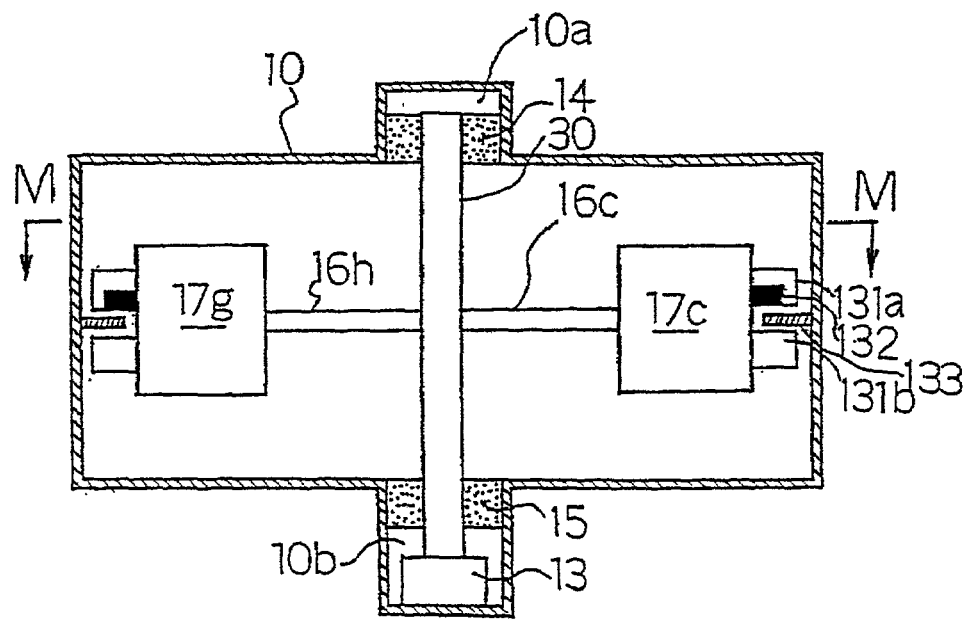
Figure 12B:
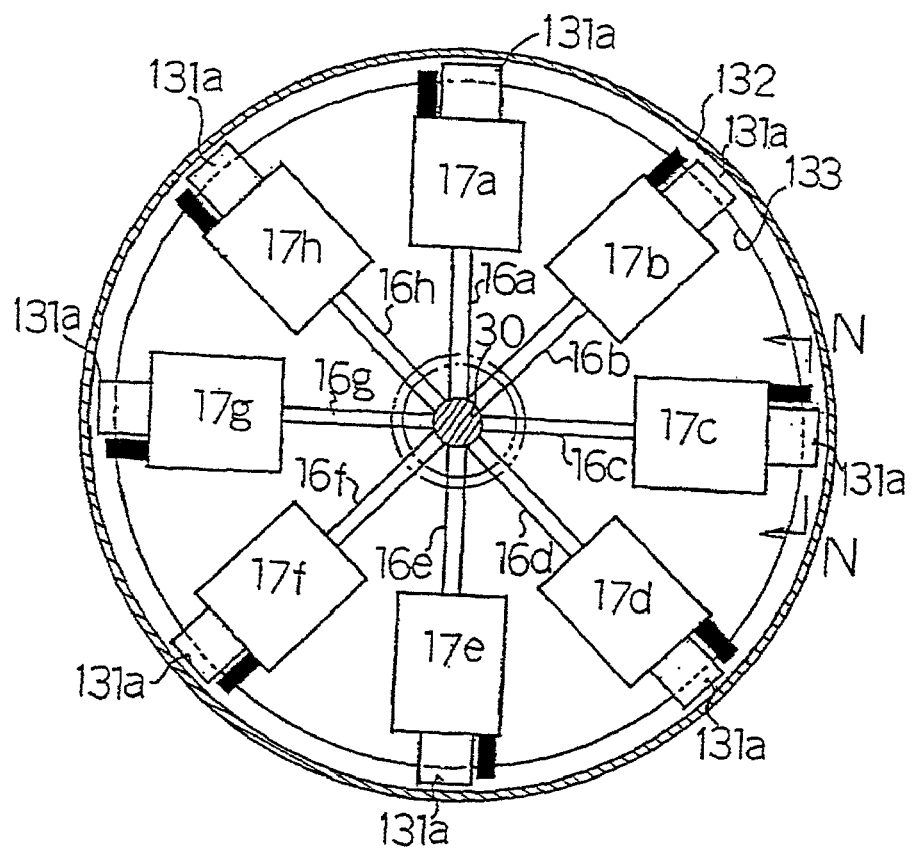

FIGS. 12(a) and (b) show a rotation stabilizing device in a rotating apparatus of a seventh embodiment according to the present invention, wherein FIG. 12(a) is a cross sectional side view and FIG. 12(b) is a cross sectional view taken on line M—M and seen in the arrow direction of FIG. 12(a). In the present seventh embodiment, a fin 133 is fitted to the casing 10 side and electromagnetic coils 131a, 131b are fitted to the experimental boxes 17a to 17h side. This is a reverse arrangement of the stationary side and the rotationary side of the first embodiment shown in FIG. 1.

That is, the fin 133 is fitted to the inner circumferential surface of the casing 10. The electromagnetic coils 131a, 131b are fitted to the outer circumferential surfaces of the experimental boxes 17a to 17h so that the fin 133 is interposed with predetermined gaps being maintained between the fin 133 and the respective electromagnetic coils 131a, 131b. Also, gap sensors 132 are arranged close to the electromagnetic coils 131a so that the gaps between the fin 133 and the respective electromagnetic coils 131a may be detected. It is to be noted that the gap sensors 132 may be provided both on the upper and lower sides of the fin 133 as pairs but, even if they are provided only on one side thereof, movement of the fin 133, or displacement of each of the experimental boxes 17a to 17h due to vibration, can be measured. The mentioned single side arrangement of the gap sensors is employed in the present example.

The fin 133 is formed in a flat plate ring shape and is fitted to the inner circumferential wall surface of the casing 10 projecting orthogonally thereto. The electromagnetic coils 131a, 131b, facing each other, are fitted to the outer circumferential surfaces of the experimental boxes 17a to 17h and the fin 133 is interposed in the gap between the electromagnetic coils 131a, 131b.

Figure 13:
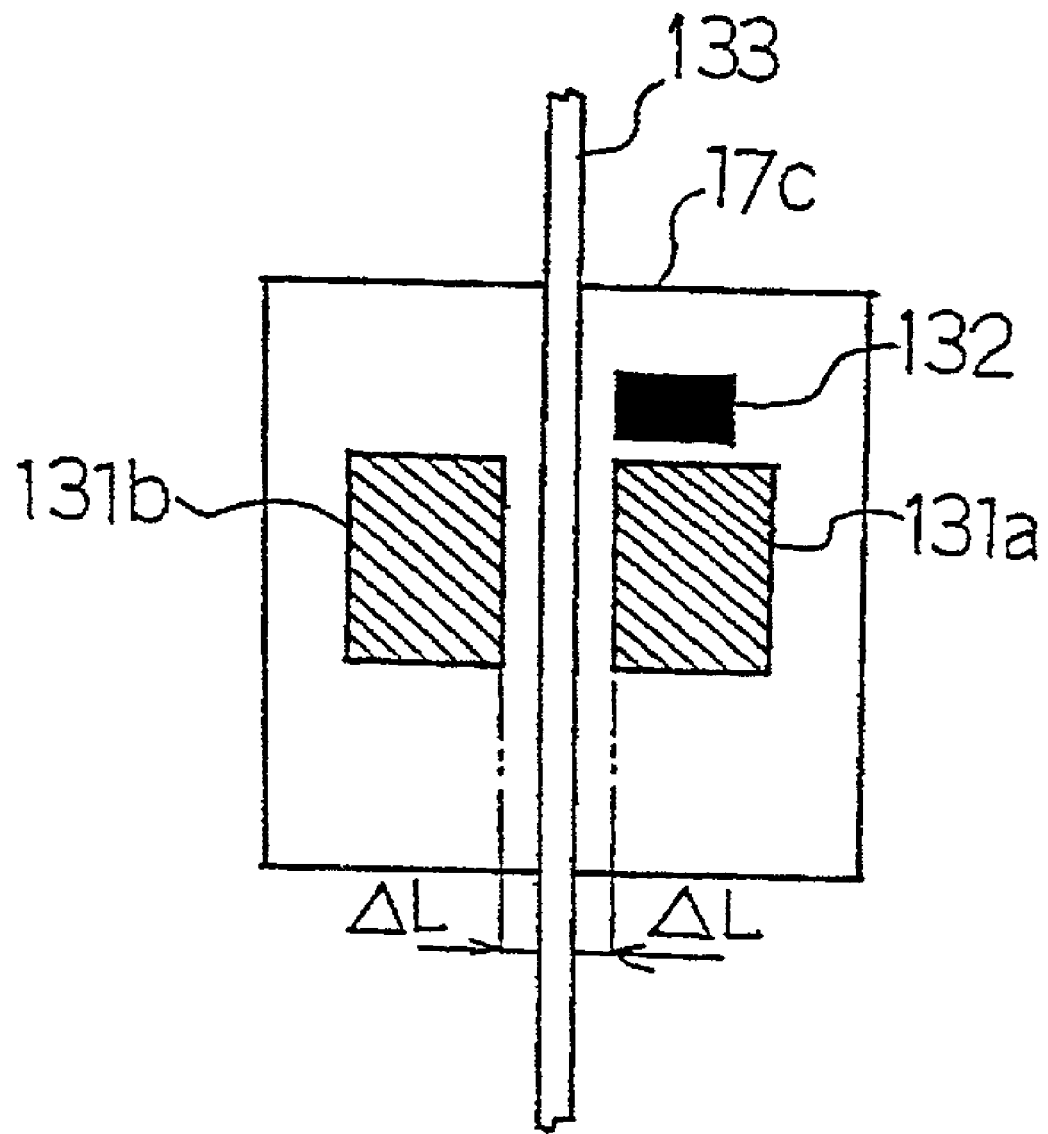
FIG. 13 is a cross sectional view taken on line N—N and seen in the arrow direction of FIG. 12(b).

FIG. 13 is a cross sectional view taken on line N—N and seen in the arrow direction of FIG. 12(b). The fin 133 is interposed between the electromagnetic coils 131a, 131b with gaps ΔL being maintained between the fin 133 and the respective electromagnetic coils 131a, 131b. The gap sensor 132 is arranged close to the electromagnetic coil 131a so that variation in the gap ΔL between the fin 133 and the electromagnetic coil 131a may be detected.

According to the seventh embodiment as mentioned above, the construction is made such that the pairs of the electromagnetic coils 131a, 131b, facing each other, are fitted to the outer circumferential surfaces of the eight experimental boxes 17a to 17h and the fin 133, fitted to the inner circumferential wall surface of the casing 10, is interposed with the predetermined gaps being maintained between the fin 133 and the respective electromagnetic coils 131a, 131b and also the gap sensors 132 are arranged close to the electromagnetic coils 131a, 131b. By such construction, the control unit 50 controls excitation current of the electromagnetic coils 131a, 131b so that the gaps between the fin 133 and the respective electromagnetic coils 131a, 131b may fall within the demand value and thereby displacement of each of the experimental boxes 17a to 17h due to vibration is suppressed and a stable rotation can be realized.

It is to be noted that, as the electromagnetic coils 131a, 131b and the gap sensors 132 are fitted to the experimental boxes 17a to 17h as a rotator, wiring thereof is done through each of the experimental boxes 17a to 17h and each of arms 16a to 16h to be taken out from a rotary shaft 30 via a slip ring, etc. to be connected to the control unit 50. The control unit 50 is installed within the casing 10 if there is space therefor. If the control unit 50 is installed outside of the casing 10, the wiring is taken outside of the casing 10 via a connector to which a vibration isolating structure is applied.

Figure 14A:
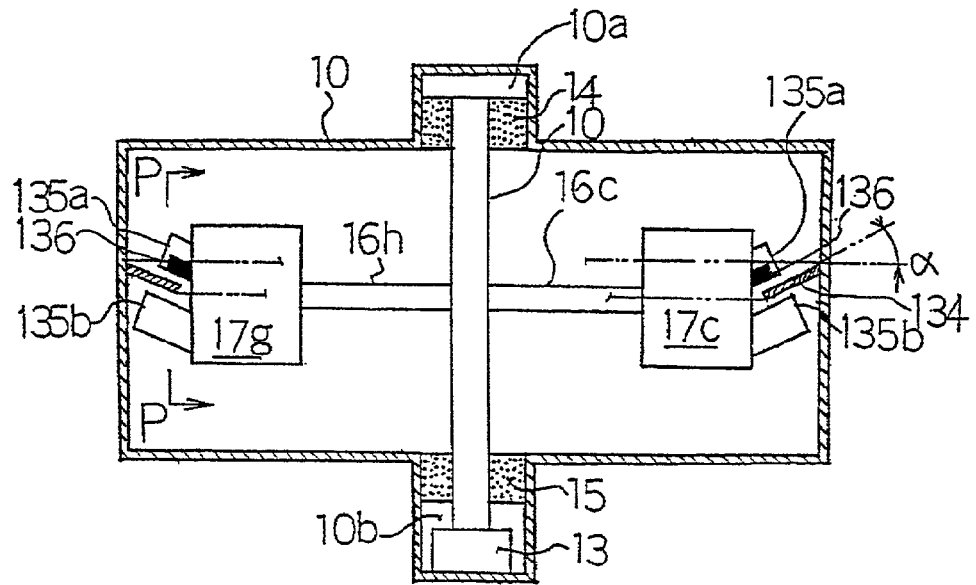
Figure 14B:
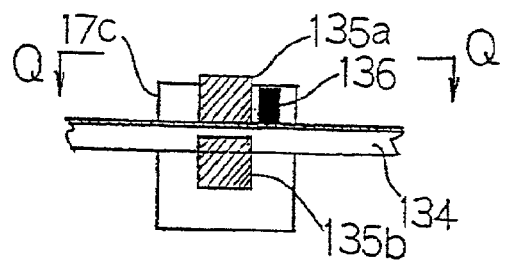
Figure 14C:
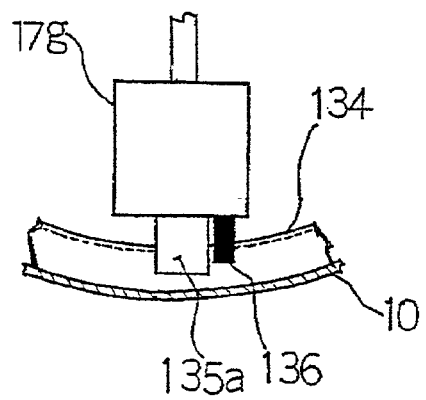

FIGS. 14(a) to (c) show a rotation stabilizing device in a rotating apparatus of an eighth embodiment according to the present invention, wherein FIG. 14(a) is a cross sectional side view, FIG. 14(b) is a cross sectional view taken on line P—P and seen in the arrow direction of FIG. 14(a) and FIG. 14(c) is a view seen in the direction of arrows Q—Q of FIG. 14(b). In the present eighth embodiment, unlike the fin 133, formed in the flat plate ring shape, of the seventh embodiment shown in FIG. 12 that is fitted to the inner circumferential wall surface of the casing 10 projecting orthogonally thereto, a fin 134 formed in a frustoconical shape has its outer diameter end portion fitted to the inner circumferential wall surface of the casing 10 so as to make an inclined angle thereto. Pairs of electromagnetic coils 135a, 135b and gap sensors 136 are fitted to the outer circumferential surfaces of the experimental boxes 17a to 17h also with the inclined angle corresponding to the fin 134. Construction of other portions is the same as that of the seventh embodiment shown in FIG. 12.

That is, as shown in FIG. 14(a), the fin 134 is arranged inclinedly with an angle α to the direction orthogonal to a rotary shaft 30 or the inner circumferential wall of the casing 10. The electromagnetic coils 135a, 135b, facing each other with predetermined gaps being maintained from the fin 134, are fitted also inclinedly with the angle α to the outer circumferential surfaces of the experimental boxes 17a to 17h. Likewise, the gap sensors 136 are fitted inclinedly with the angle α.

In FIGS. 14(b) and (c), the fin 134 is fitted inclinedly to the casing 10 and the electromagnetic coils 135a, 135b are arranged on the experimental box 17g side with the fin 134 being interposed therebetween and with the predetermined gaps being maintained from the fin 134. Also, the gap sensor 136 is arranged close to the electromagnetic coil 135a.

According to the eighth embodiment as mentioned above, as in the second embodiment shown in FIG. 5, the construction is made such that the inclined fin 134 is fitted so as to be interposed between the pairs of electromagnetic coils 135a, 135b, facing each other, with predetermined gaps being maintained between the fin 134 and the coils 135a, 135b as well as the gap sensors 136 being arranged close to the electromagnetic coils 135a, 135b. By such construction also, as in the seventh embodiment of FIG. 12, the excitation current of the electromagnetic coils 135a, 135b is controlled so that the gaps between the fin 134 and the respective electromagnetic coils 135a, 135b may fall within the demand value and thereby displacement of each of the eight experimental boxes 17a to 17h due to vibration is suppressed and a stable rotation can be realized.

Figure 15A:
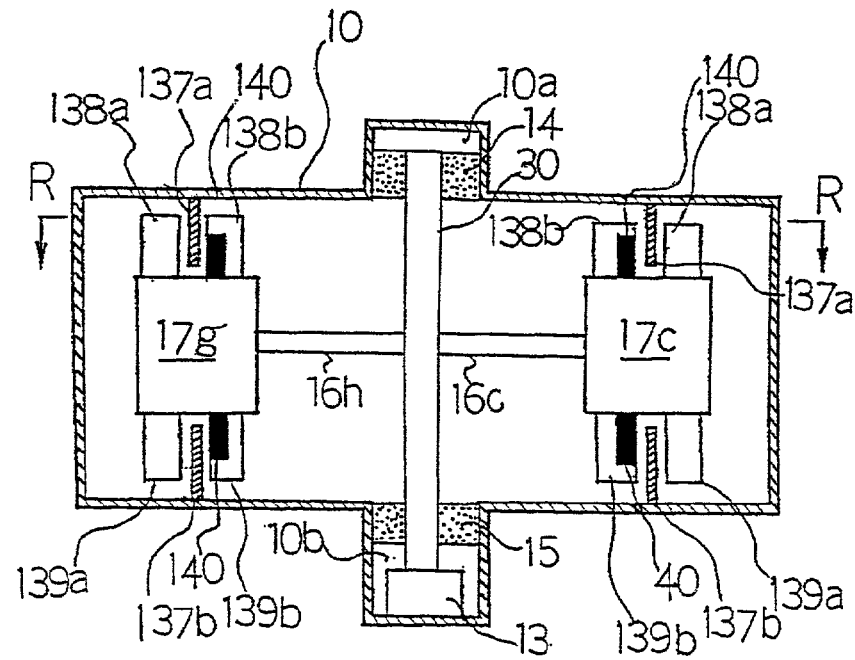
Figure 15B:
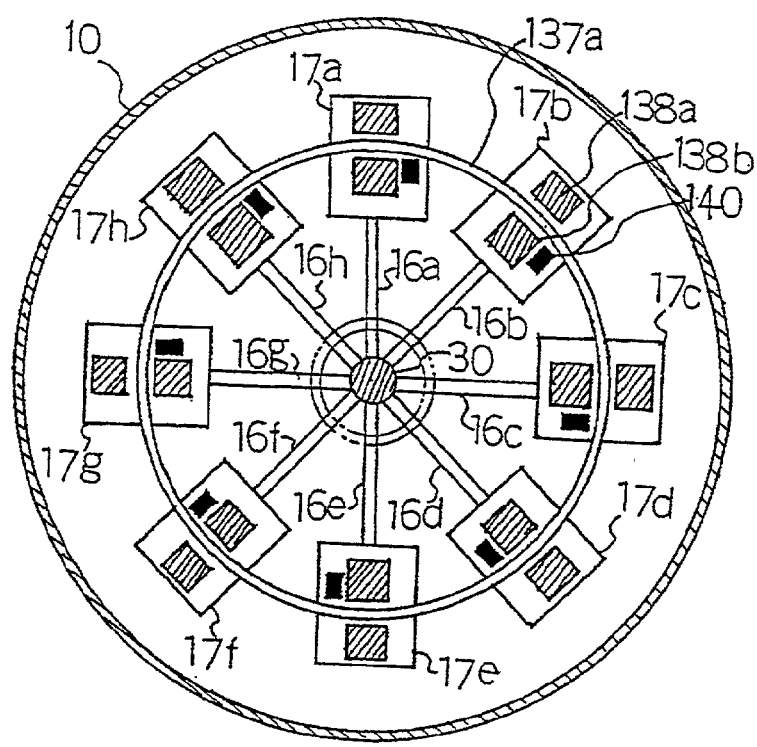

FIGS. 15(a) and (b) show a rotation stabilizing device in a rotating apparatus of a ninth embodiment according to the present invention, wherein FIG. 15(a) is a cross sectional side view and FIG. 15(b) is a cross sectional view taken on line R—R and seen in the arrow direction of FIG. 15(a). In the present ninth embodiment, the fin is not fitted to the inner circumferential surface of the casing 10 but two cylindrical fins are fitted to the upper and lower inner surfaces of the casing 10 projecting orthogonally thereto and the electromagnetic coils and the gap sensors are fitted to the upper and lower surfaces of the experimental boxes 17a to 17h. Construction of other portions is the same as that of the seventh embodiment shown in FIG. 12.

In FIGS. 15(a) and (b), the cylindrical fins 137a, 137b are fitted to the upper and lower inner surfaces, respectively, of the casing 10 projecting orthogonally thereto. The electromagnetic coils 138a, 138b, facing each other, are fitted to the upper surfaces of the experimental boxes 17a to 17h with the fin 137a being interposed therebetween and with predetermined gaps being maintained between the fin 137a and the coils 138a, 138b. Likewise, the electromagnetic coils 139a, 139b, facing each other, are fitted to the lower surfaces of the experimental boxes 17a to 17h with the fin 137b being interposed therebetween and with predetermined gaps being maintained between the fin 137b and the coils 139a, 139b. Also, the gap sensors 140 are fitted to the experimental boxes 17a to 17h being arranged close to the electromagnetic coils 138b on the upper inner side and the electromagnetic coils 139b on the lower inner side.

According to the ninth embodiment as mentioned above also, the construction is made such that the cylindrical fins 137a, 137b are arranged on the upper and lower inner surfaces of the casing 10 and the electromagnetic coils 138a, 138b on the upper inner side and 139a, 139b on the lower inner side are arranged on the experimental boxes 17a to 17h, wherein the fins 137a, 137b are interposed between the coils 138a, 138b as well as 139a, 139b with the predetermined gaps being maintained therebetween. As in the seventh embodiment, the control unit controls the excitation current of the coils so that the gaps between the fins and the electromagnetic coils may fall within the demand value and thereby displacement of the experimental boxes 17a to 17h due to vibration is suppressed and a stable rotation can be realized.

Figure 16A:
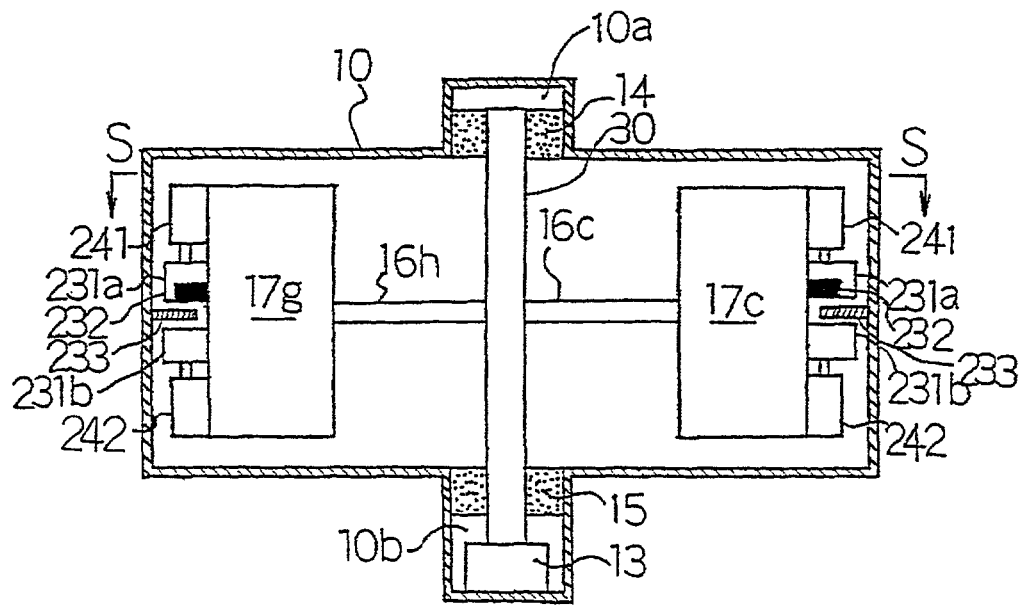
Figure 16B:
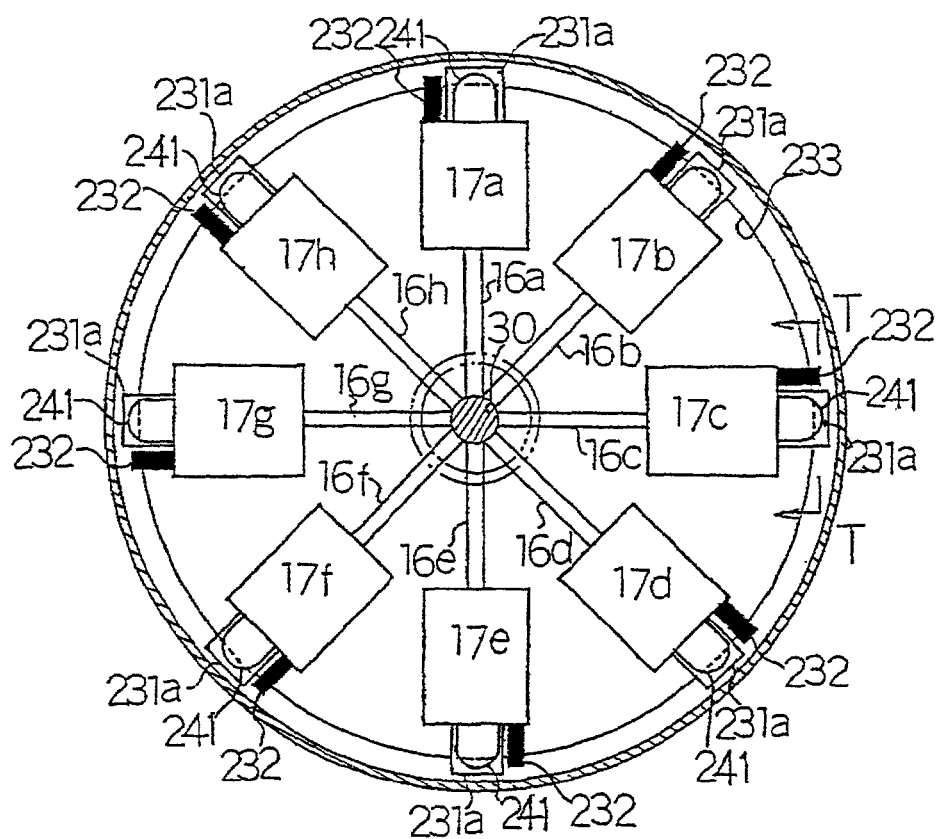

FIGS. 16(a) and (b) show a rotation stabilizing device in a rotating apparatus of a tenth embodiment according to the present invention, wherein FIG. 16(a) is a cross sectional side view and FIG. 16(b) is a cross sectional view taken on line S—S and seen in the arrow direction of FIG. 16(a). In the present tenth embodiment, the construction is made such that a ring-shaped flat plate fin 233 is fitted to the casing 10 side, and electromagnetic coils 231a, 231b and cylinders 241, 242 are arranged on the experimental boxes 17a to 17h side. Construction of other portions is the same as that of the seventh embodiment shown in FIG. 12.

The cylinders 241, 242 are fitted to the outer circumferential surfaces of the experimental boxes 17a to 17h and the electromagnetic coils 231a, 231b are fitted to rod ends of the cylinders 241, 242, respectively, so that the electromagnetic coils 231a, 231b face each other with the fin 233 being interposed therebetween. Predetermined gaps are maintained between the fin 233 and the respective electromagnetic coils 231a, 231b and these gaps are arranged adjustably by the cylinders 241, 242. The cylinders 241, 242 are preferably electric type cylinders but fluid type cylinders are also usable. The electromagnetic coils 231a, 231b are supplied with excitation current via a control unit (not shown) so that their predetermined positions relative to the fin 233 may be maintained by magnetic force. Also, gap sensors 232, for measuring the gap between the fin 233 and the electromagnetic coils 231a, are fitted to the outer circumferential surfaces of the experimental boxes 17a to 17h close to the electromagnetic coils 231a, 231b so as to face to the fin 233. It is to be noted that the gap sensors 232 may be provided both on the upper and lower sides of the fin 233 as pairs, but even if they are provided on one side thereof, movement of the fin 233, or displacement of each of the experimental boxes 17a to 17h due to vibration, can be measured. The mentioned single side arrangement of the gap sensors is employed in the present example.

Being interposed in the gaps between the pairs of the electromagnetic coils 231a, 231b fitted to the experimental boxes 17a to 17h, the ring-shaped flat plate fin 233 is fitted to the inner circumferential wall surface of the casing 10 projecting therefrom.

Figure 17:
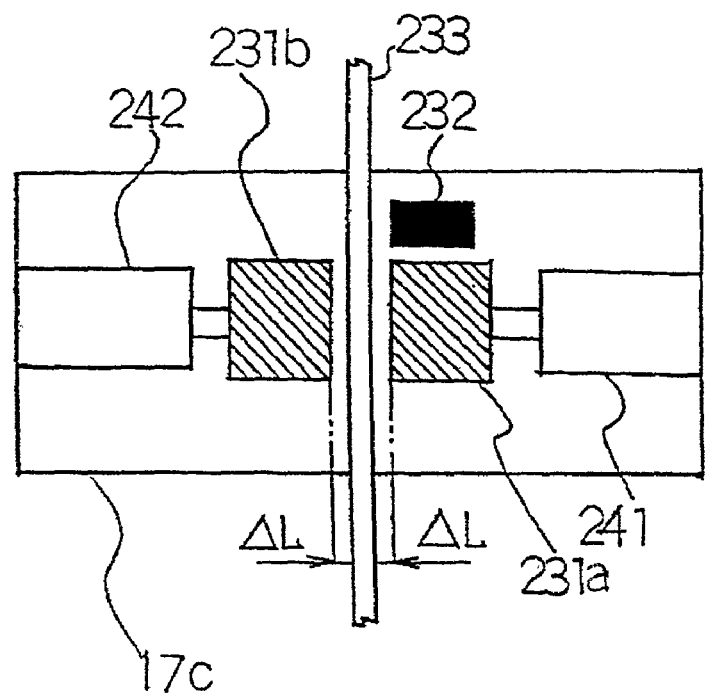
FIG. 17 is a cross sectional view taken on line T—T and seen in the arrow direction of FIG. 16(b).

FIG. 17 is a cross sectional view taken on line T—T and seen in the arrow direction of FIG. 16(b). The fin 233 fitted to the inner circumferential wall surface of the casing 10 is interposed between the electromagnetic coils 231a, 231b fitted to the experimental box 17c with predetermined gaps ΔL being maintained between the fin 233 and the respective electromagnetic coils 231a, 231b. The electromagnetic coil 231a is connected to the cylinder 241 and the electromagnetic coil 231b to the cylinder 242. Close to the electromagnetic coil 231a, the gap sensor 232 is arranged for detecting variations in the gap ΔL between the electromagnetic coil 231a and the fin 233. The gaps ΔL between the fin 233 and the respective coils 231a, 231b are changeable by movement of the electromagnetic coils 231a, 231b.

According to the tenth embodiment as mentioned above, the pairs of the electromagnetic coils 231a, 231b are fitted to the outer circumferential surfaces of the eight experimental boxes 17a to 17h and also the cylinders 241, 242 for moving the electromagnetic coils 231a, 231b and the gap sensors 232 close to the electromagnetic coils 231a, 231b are arranged. Moreover, the fin 233 is fitted to the casing 10 side so as to be interposed between the electromagnetic coils 231a, 231b with predetermined gaps being maintained between the fin 233 and the respective electromagnetic coils 231a, 231b. By such construction, in the same way as shown in FIG. 3, the control unit 50 controls to drive the cylinders 241, 242 for adjustment of the gaps so that the gaps between the fin 233 and the electromagnetic coils 231a, 231b may fall within the demand value and thereby displacement of each of the eight experimental boxes 17a to 17h due to vibration is suppressed and a stable rotation can be realized.

It is to be noted that, as the electromagnetic coils 231a, 231b, the cylinders 241, 242 and the gap sensors 232 are fitted to the experimental boxes 17a to 17h as a rotator, wiring thereof is done through each of the experimental boxes 17a to 17h and each of arms 16a to 16h to be taken out from a rotary shaft 30 via a slip ring, etc. to be connected to the control unit 50. The control unit 50 is installed within the casing 10 if there is space therefor. If the control unit 50 is installed outside of the casing 10, the wiring is taken outside of the casing 10 via a connector to which a vibration isolating structure is applied.

Figure 18:
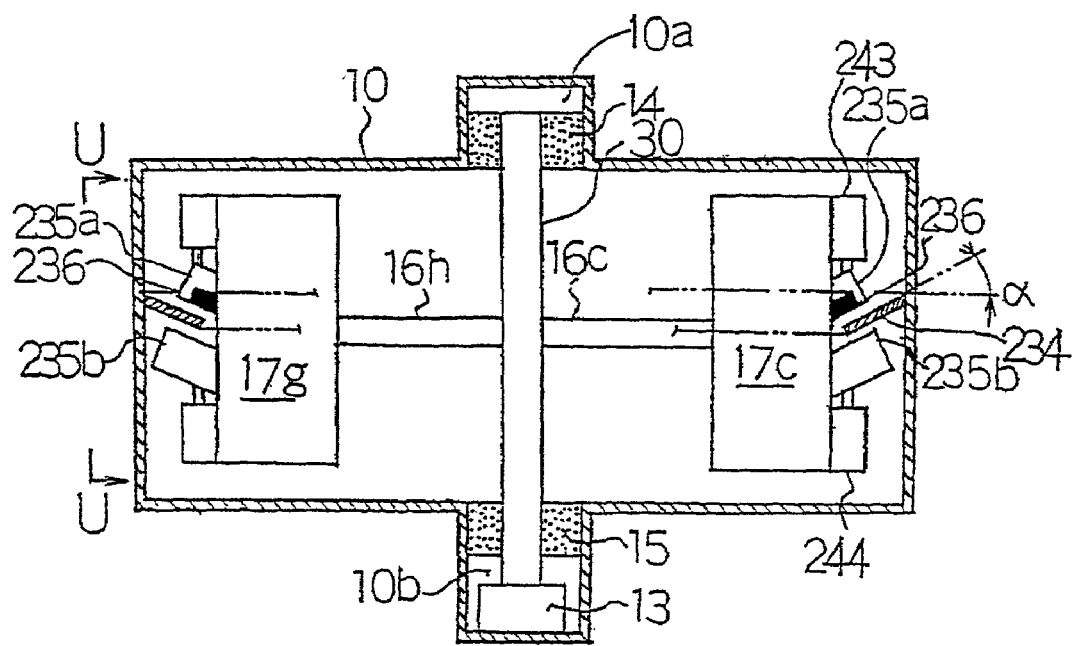
FIG. 18 is a cross sectional side view of a rotation stabilizing device in a rotating apparatus of an eleventh embodiment according to the present invention.

FIG. 18 is a cross sectional side view of a rotation stabilizing device in a rotating apparatus of an eleventh embodiment according to the present invention. In the present eleventh embodiment, unlike the construction of the tenth embodiment of FIG. 16 in which the fin 233 is fitted to the inner circumferential wall surface of the casing 10 projecting orthogonally thereto, a fin 234 formed in a frustoconical shape is inclinedly fitted to the inner circumferential wall surface of the casing 10 and, corresponding thereto, electromagnetic coils 235a, 235b and gap sensors 236 are fitted also inclinedly on the experimental boxes 17a to 17h side so that the electromagnetic coils 235a, 235b may be moved by cylinders 243, 244. Construction of other portions is the same as that of the tenth embodiment shown in FIG. 16.

That is, the fin 234 is arranged inclinedly with an angle α to the direction orthogonal to the rotary shaft 30 or to the inner circumferential wall surface of the casing 10. Pairs of electromagnetic coils 235a, 235b, facing each other, are fitted to the experimental boxes 17a to 17h likewise inclinedly with the angle α, wherein the fin 234 is interposed with predetermined gaps being maintained between the fin 234 and the respective electromagnetic coils 235a, 235b. Also, the gap sensors 236 are fitted inclinedly with the angle α.

Figure 19A:
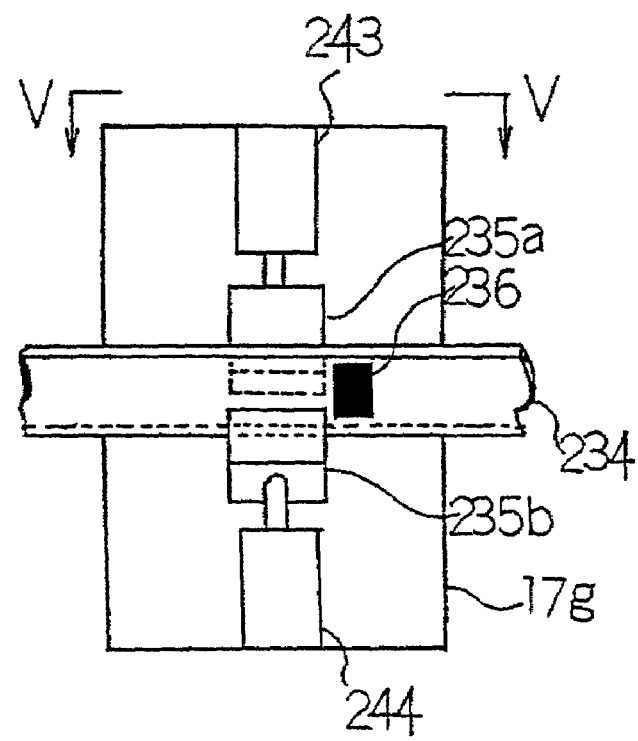
Figure 19B:
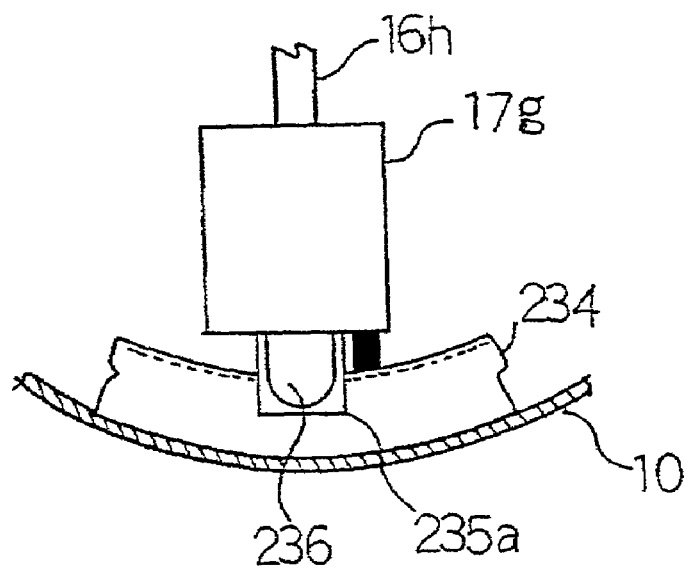
FIG. 19(b) is a view seen in the direction of arrows V—V of FIG. 19(a).

FIG. 19(a) is a view seen in the direction of arrows U—U of FIG. 18 and FIG. 19(b) is a view seen in the direction of arrows V—V of FIG. 19(a). In FIGS. 19(a) and (b), the fin 234 is inclinedly fitted to the casing 10 so as to be interposed between the electromagnetic coils 235a, 235b with the predetermined gaps being maintained from the fin 234. The electromagnetic coils 235a, 235b are connected to the cylinders 243, 244, respectively, and the cylinders 243, 244 are fitted to the experimental box 17g. The gap sensor 236 is arranged close to the electromagnetic coil 235a.

According to the eleventh embodiment as mentioned above, as in the eighth embodiment of FIG. 14, the inclined fin 234 is fitted on the casing 10 side so as to be interposed with the predetermined gaps between the pairs of the electromagnetic coils 235a, 235b arranged on the experimental boxes 17a to 17h side and the gap sensors 236 are arranged close to the electromagnetic coils 235a, 235b. By such construction, as in the tenth embodiment shown in FIG. 16, positions of the electromagnetic coils 235a, 235b are controlled by the cylinders 243, 244 so that the gaps between the fin 234 and the respective electromagnetic coils 235a, 235b may fall within the demand value and thereby vibration of each of the experimental boxes is suppressed and a stable rotation can be realized.

Figure 20A:
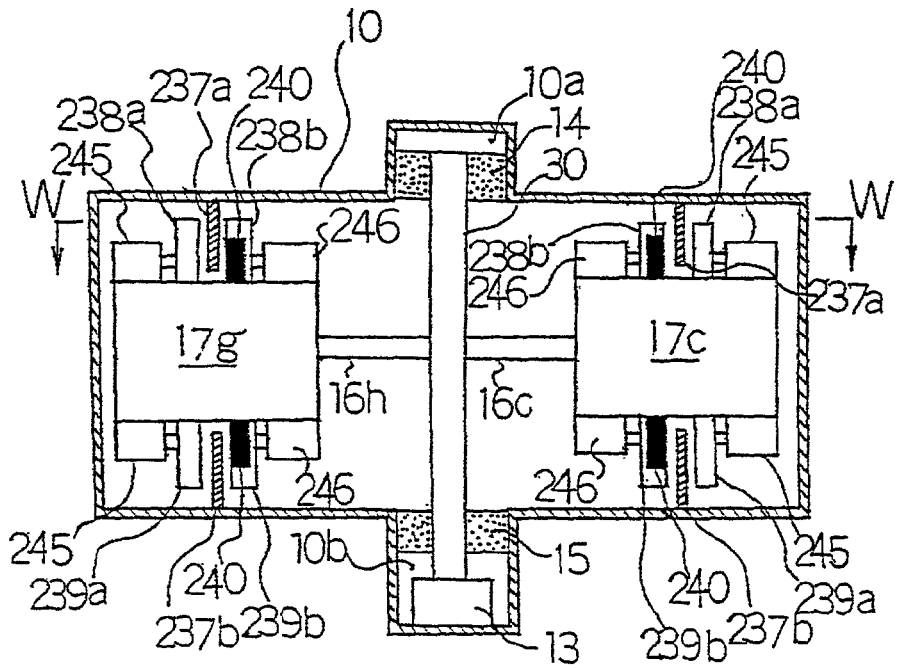
Figure 20B:
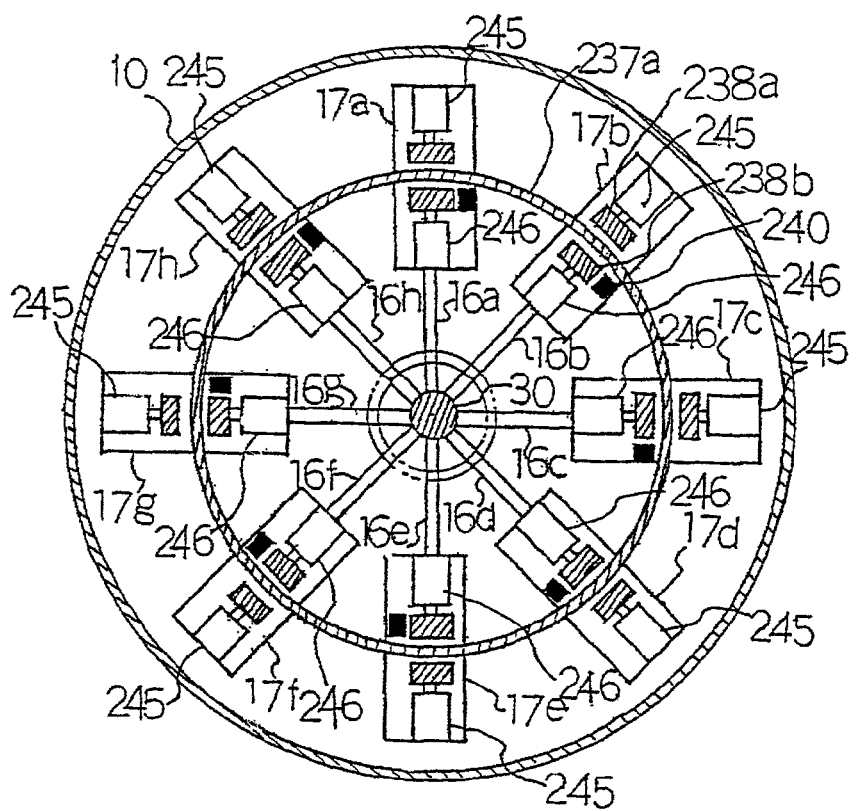

FIGS. 20(a) and (b) show a rotation stabilizing device in a rotating apparatus of a twelfth embodiment according to the present invention, wherein FIG. 20(a) is a cross sectional side view and FIG. 20(b) is a cross sectional view taken on line W—W and seen in the arrow direction of FIG. 20(a). In the present twelfth embodiment, the fin is not fitted to the inner circumferential wall surface of the casing 10 but two cylindrical fins are fitted to upper and lower inner surfaces of the casing 10 projecting orthogonally thereto and the electromagnetic coils, cylinders and the gap sensors are arranged on upper and lower outer surfaces of the experimental boxes 17a to 17h. Construction of other portions is the same as that of the tenth embodiment of FIG. 16.

In FIGS. 20(a) and (b), the cylindrical fins 237a, 237b are fitted to the upper and lower inner surfaces of the casing 10 projecting orthogonally thereto. Pairs of the electromagnetic coils 238a, 238b are arranged on the upper side of the experimental boxes 17a to 17h such that the fin 237a is interposed therebetween with predetermined gaps being maintained from the fin 237a and, likewise, pairs of the electromagnetic coils 239a, 239b are arranged on the lower side of the experimental boxes 17a to 17h such that the fin 237b is interposed therebetween with predetermined gaps being maintained from the fin 237b. The electromagnetic coils 238a, 238b and 239a, 239b are connected to the cylinders 245, 246 that are fitted to the upper and lower surfaces, respectively, of each of the experimental boxes 17a to 17h. Also, the gap sensors 240 are fitted to the experimental boxes 17a to 17h close to the electromagnetic coils 238b, 239b.

According to the twelfth embodiment constructed as mentioned above, the cylindrical fins 237a, 237b are fitted to the upper and lower inner wall surfaces of the casing 10 and the electromagnetic coils 238a, 238b on the upper side and the electromagnetic coils 239a, 239b on the lower side of the experimental boxes 17a to 17h are arranged so that the fins 237a, 237b are interposed between the respective coils with the predetermined gaps being maintained from the fins 237a, 237b. The electromagnetic coils 238a, 238b and 239a, 239b are fitted to the upper and lower surfaces of the experimental boxes 17a to 17h via the cylinders 245, 246. Also, the gap sensors 240 are arranged close to the electromagnetic coils 238b, 239b. As in the first embodiment of FIG. 1, the control unit controls the cylinders 245, 246 so that the gaps between the fins 237a, 237b and the respective electromagnetic coils may fall within the demand value and thereby displacement of the fins 237a, 237b is suppressed, vibration of the experimental boxes 17a to 17h is suppressed and a stable rotation can be realized.

Figure 21A:
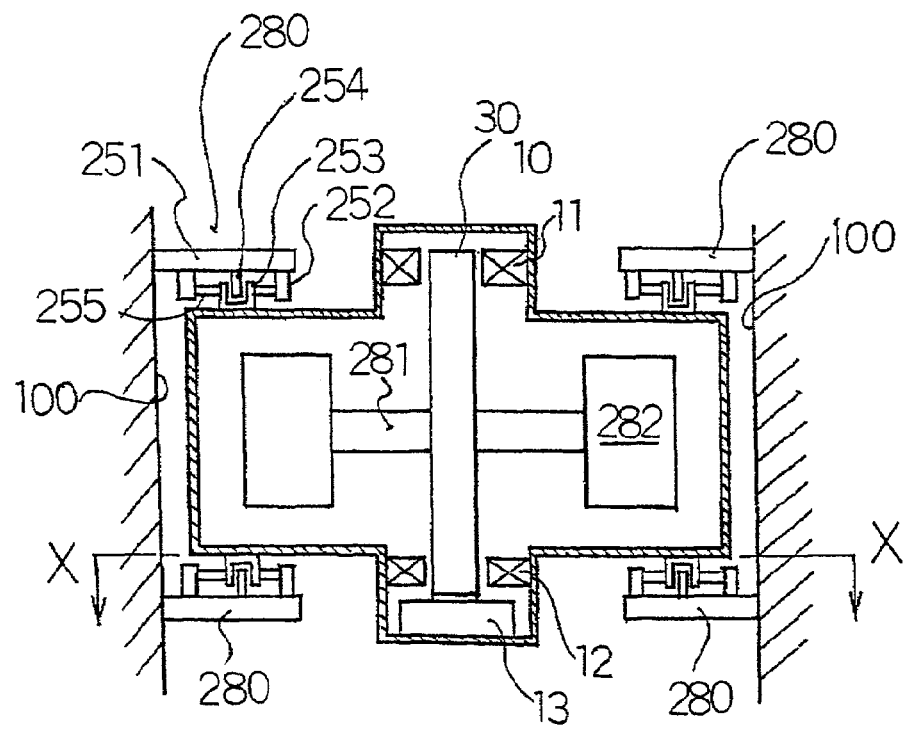
Figure 21B:
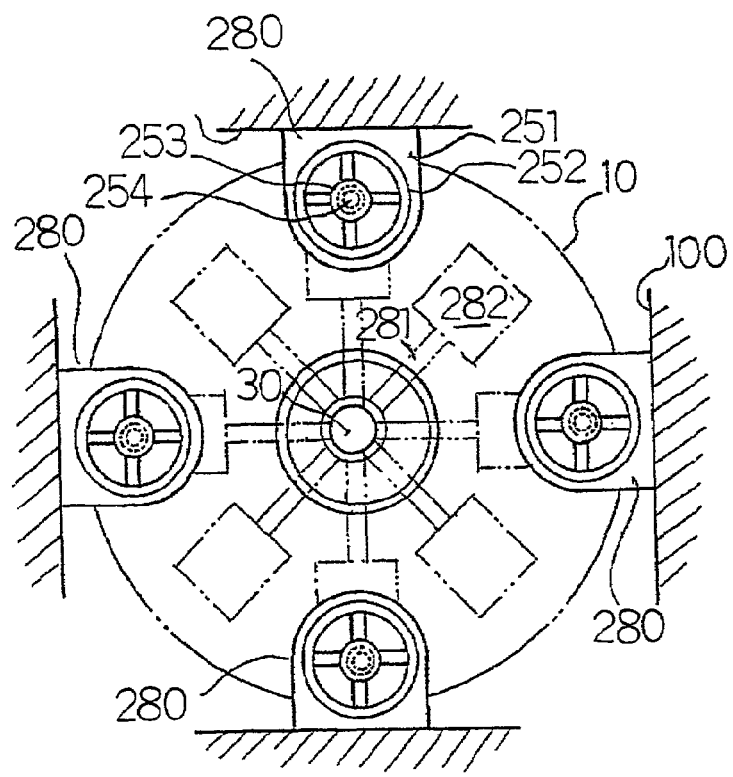

FIGS. 21(a) and (b) show a rotation stabilizing device in a rotating apparatus of a thirteenth embodiment according to the present invention, wherein FIG. 21(a) is a cross sectional side view and FIG. 21(b) is a cross sectional view taken on line X—X and seen in the arrow direction of FIG. 21(a). In FIG. 21(a), the casing 10 is supported to a stationary side 100 via vibration isolating devices 280.

Within the casing 10, a rotary shaft 30 has both its ends supported by bearings 11, 12. As the bearing 12, any of the bearings described with respect to FIGS. 35 and 36, that is, magnetic bearings, spring-supported, or elastic- or plastic-material-supported bearings, air cushion bearings, spring or damper bearings, motor type or hydraulic type bearings, etc, may be used. A plurality of arms 281 (eight arms in the example as illustrated) have their one ends fitted to the rotary shaft 30 and the other ends fitted with a plurality of experimental boxes 282. The rotary shaft 30 together with the arms 281 and the experimental boxes 282 is rotated by a motor 13.

Each of the vibration isolating devices 280 is fixed to the stationary side 100 via a supporting member 251 and this supporting member 251 has a supporting frame 252 fitted thereto. On the casing 10 side facing the vibration isolating device 280, a coil 253 is fitted and four springs 255 are arranged between the coil 253 and an inner side of the supporting frame 252 so as to connect them. A stationary side conductor 254 is fixed to the supporting member 251 so as to be inserted into a central position of the coil 253 non-contact-wise with a predetermined gap being maintained between the conductor 254 and the coil 253.

As the above-mentioned springs 255, bar-like rod springs, bar-like coil springs, springs made by elastic materials of rubber, plastics, etc. having an appropriate elasticity can be used.

Figure 35A:
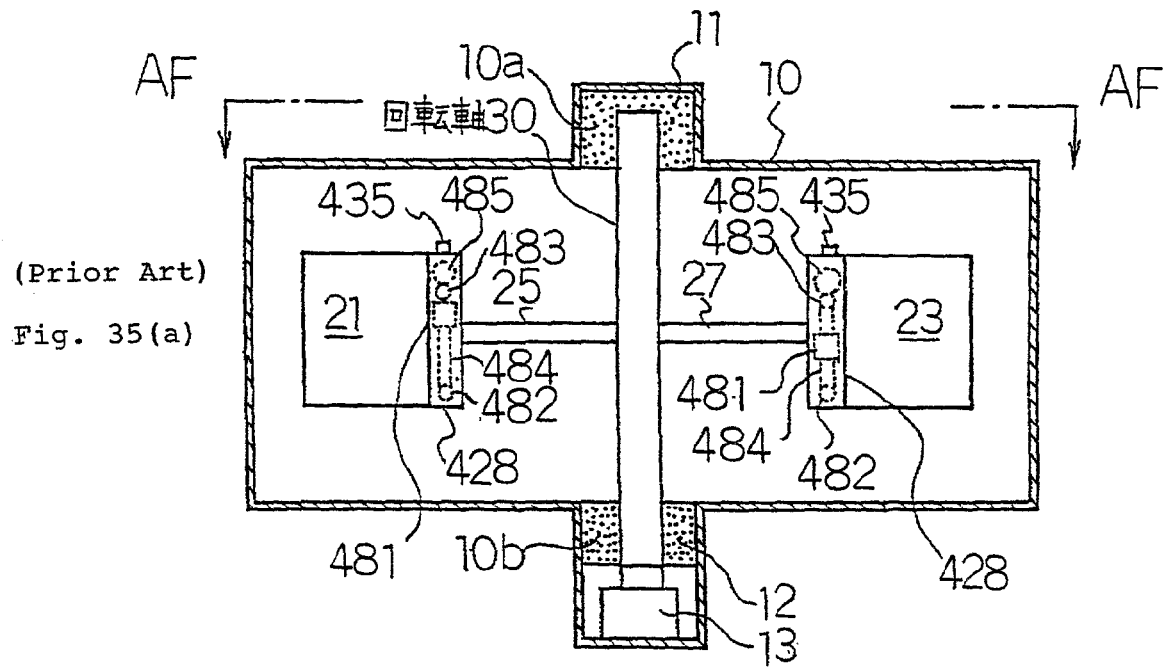
Figure 35B:
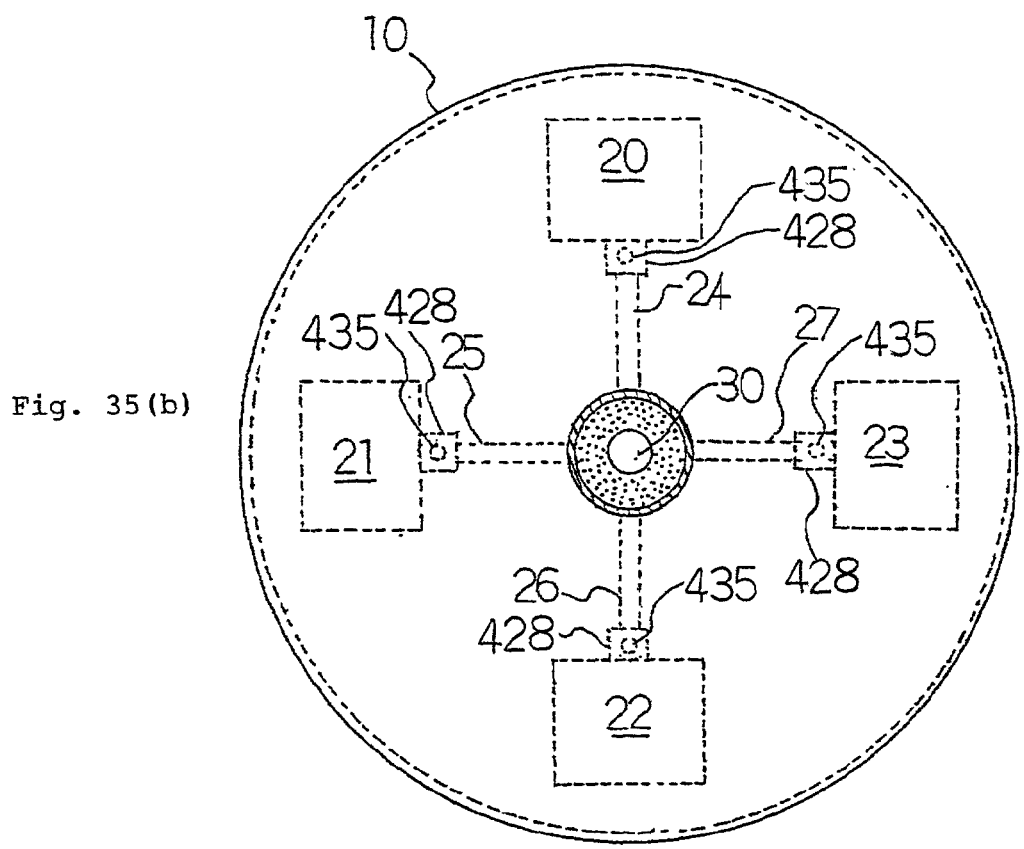
Figure 36A:
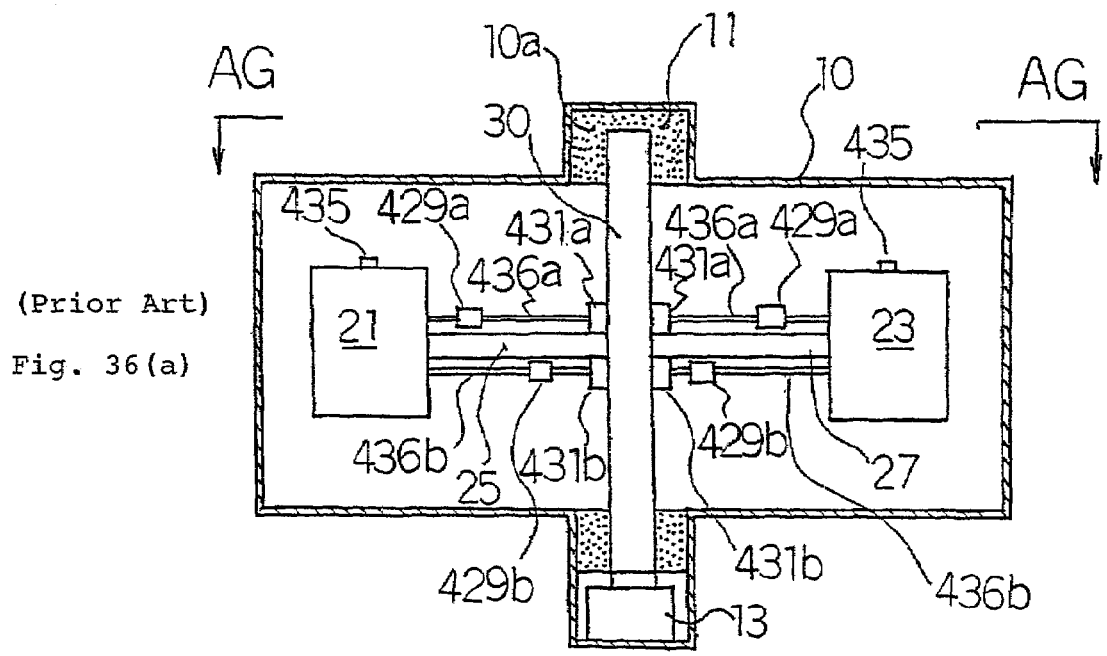
Figure 36B:
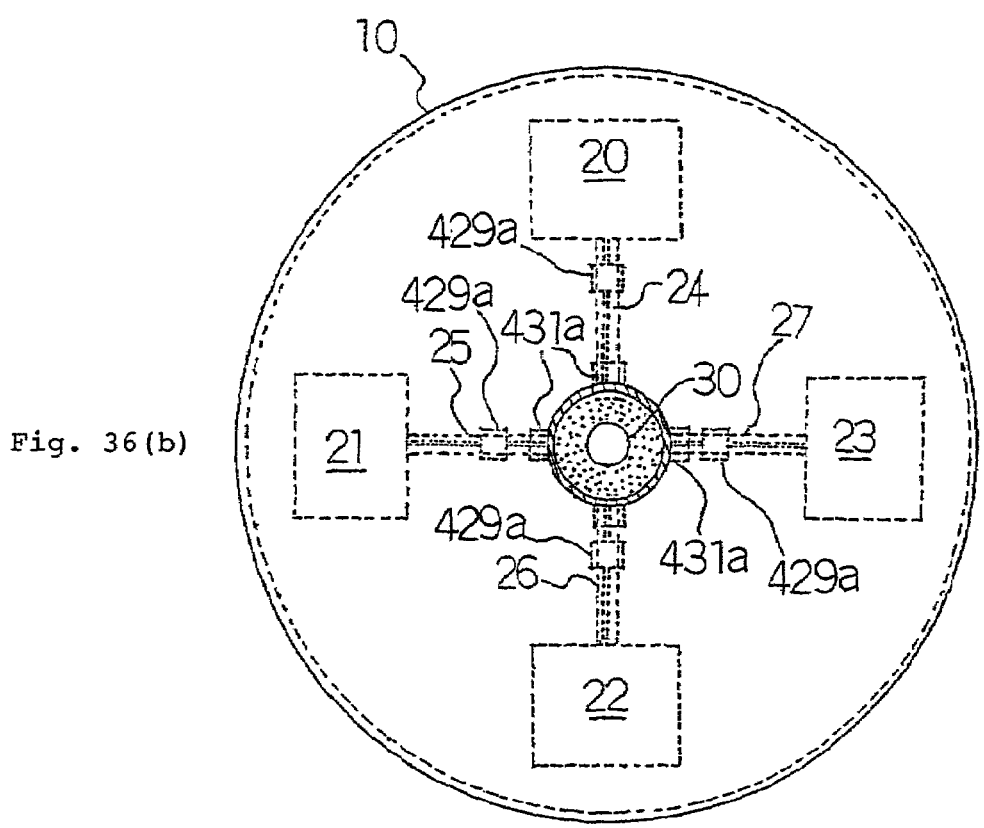
Figure 38:
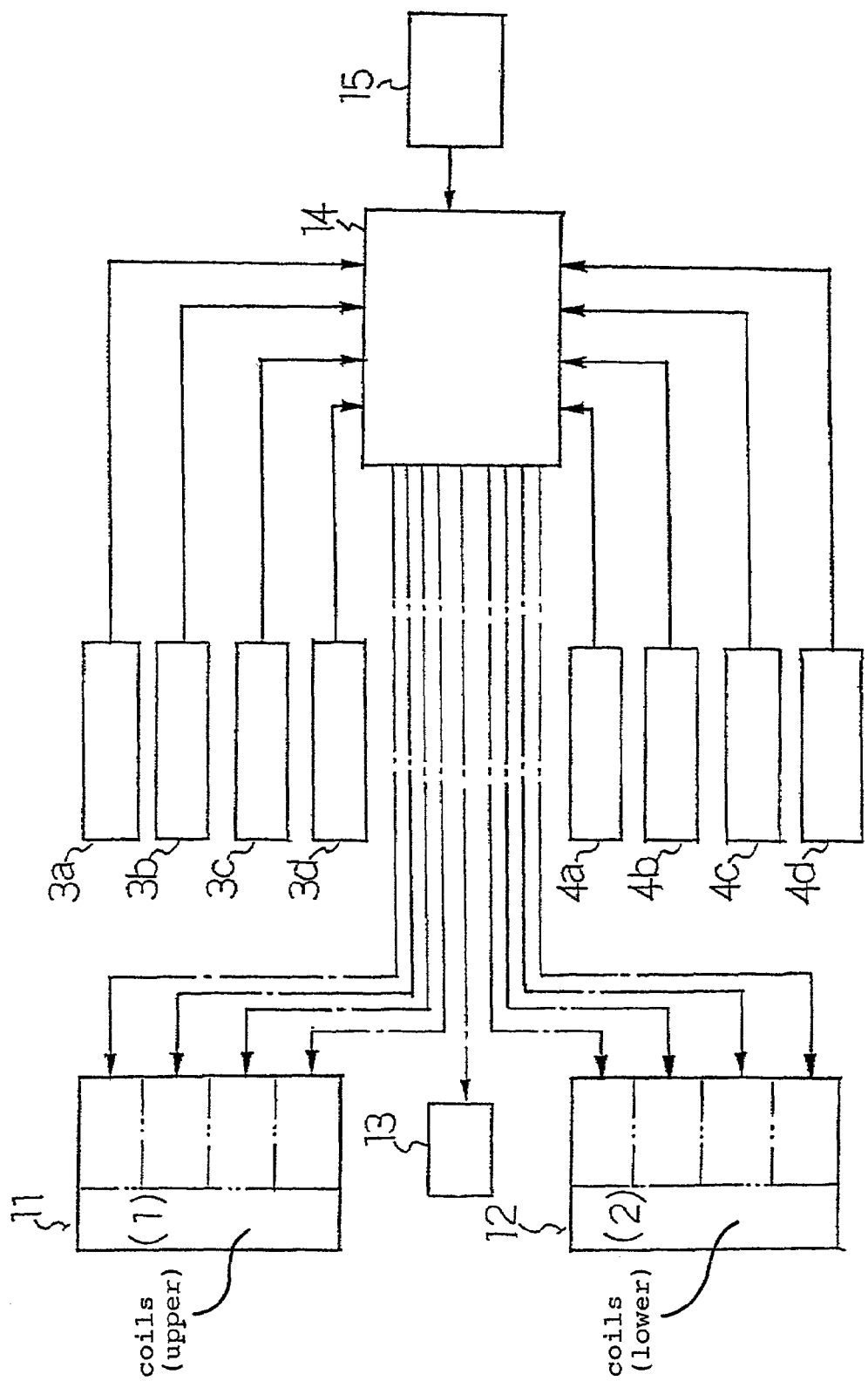
FIG. 38 is a control diagram with respect to the rotation stabilizing device of FIG. 37.
Figure 39:
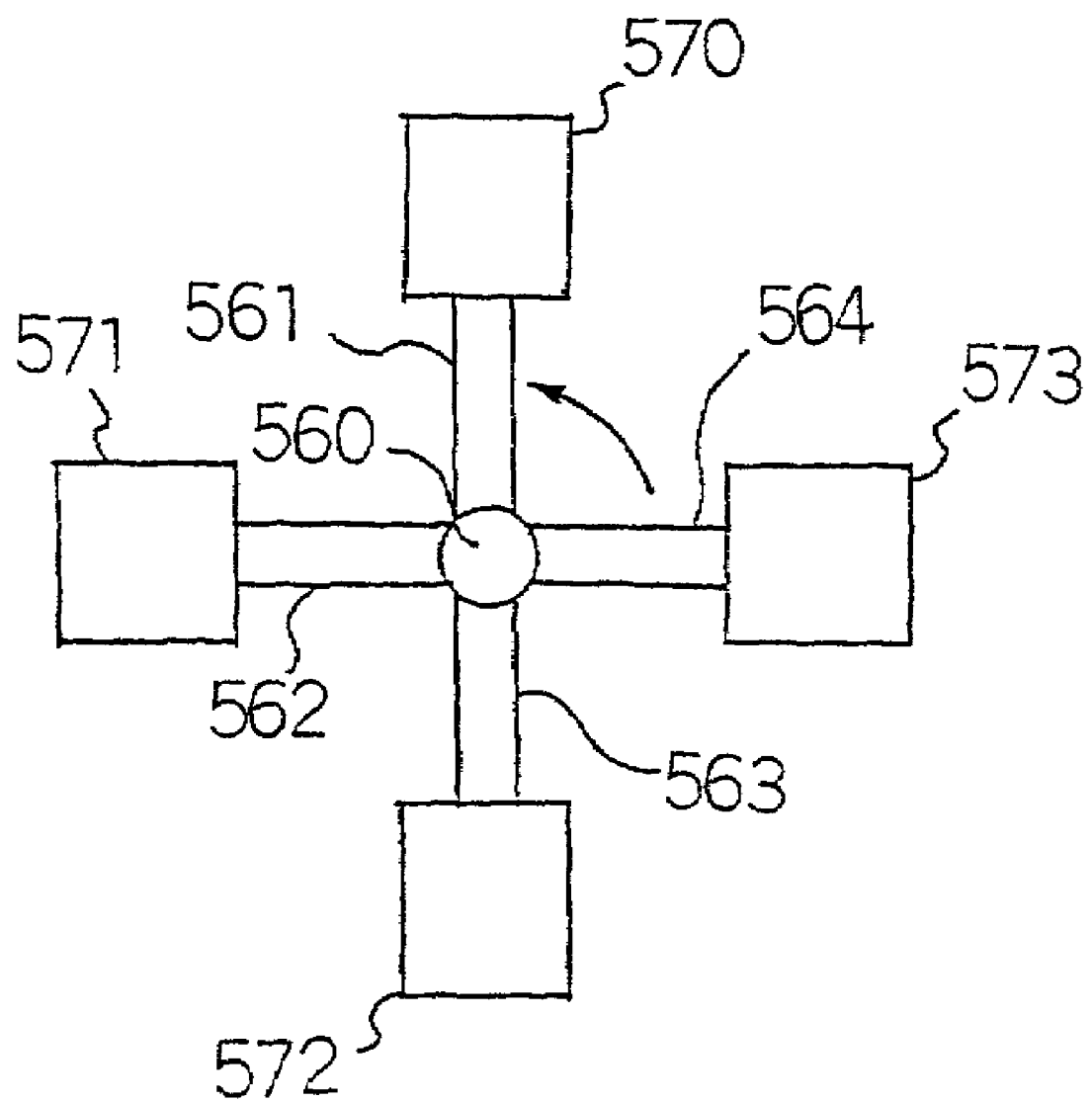
FIG. 39 is a schematic plan view of a microgravitational rotating apparatus in the prior art.

In the present thirteenth embodiment, as shown in FIG. 21(b), an example is illustrated in which eight arms 281 are fitted to the rotating shaft 30 and eight experimental boxes 282 are fitted to the eight arms 281. However, as a matter of course, as shown in FIGS. 35 and 36, a rotating apparatus having four experimental boxes fitted to four arms may be also employed. Further, while the vibration isolating devices 280 are provided so that the casing 10 is supported to the stationary side 100 at four places of each of the upper and lower sides of the casing 10, the vibration isolating devices 280 may be provided in a number of two or three, or more than four, on one side and an appropriate number of them may be set according to the specification of the rotating apparatus.

In the illustration, the casing 10 is elastically supported to the stationary side 100 by the vibration isolating devices 280 at four places of each surface of the upper and lower sides, as mentioned above, that is, eight places in total, of the casing 10. The coil 253 is fixed to the casing 10 and is supported to the supporting frame 252 of the vibration isolating device 280 via the four springs 255. That is, the casing 10 is elastically supported to the stationary side 100 via the springs 255, the supporting frame 252 and the supporting member 251.

In addition to the elastic support of the casing 10 by the springs 255, the casing 10 is further supported elastically by electromagnetic force caused between the coil 253 and the stationary side conductor 254. That is, the coil 253 comprises an excitation coil, as will be described later, and when it is excited, an attractive force or repulsive force is caused by the electromagnetic force to thereby support the stationary side conductor 254. As the stationary side conductor 254 is integrally fixed to the supporting member 251, it results that the casing 10 is supported to the stationary side 100 also by the electromagnetic force of the coil 253.

Figure 22A:
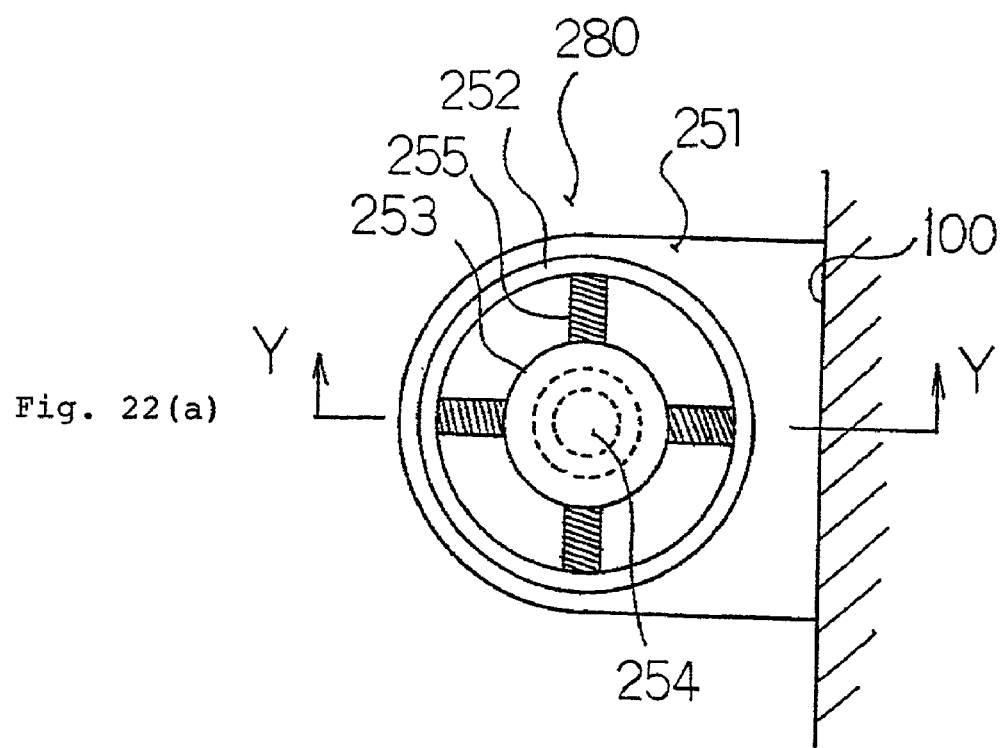
Figure 22B:
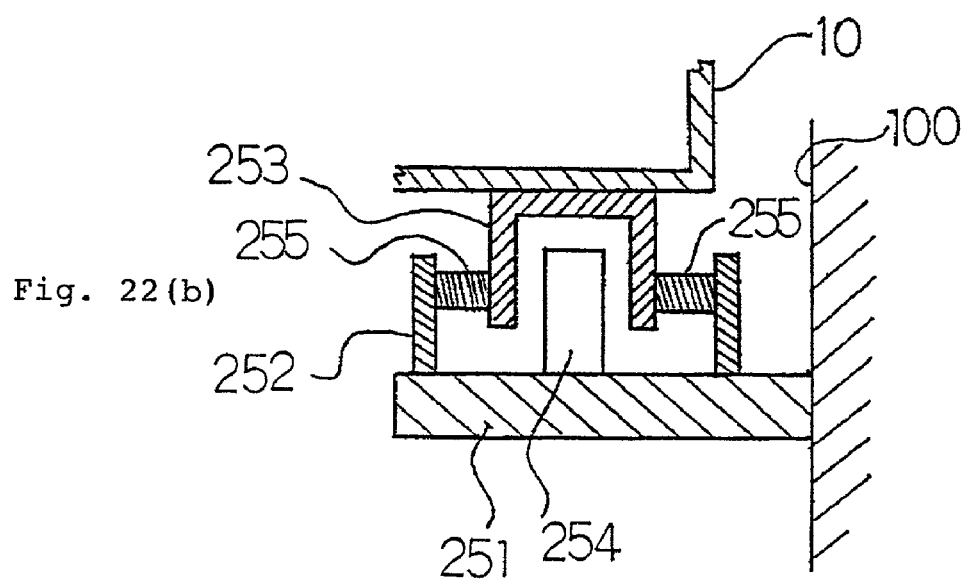

FIGS. 22(a) and (b) show an enlarged view of the vibration isolating device 280 of FIG. 21, wherein FIG. 22(a) is a plan view and FIG. 22(b) is a cross sectional view taken on line Y—Y of FIG. 22(a). As shown there, the casing 10 has the coil 253 fitted thereto and the coil 253 is elastically connected to the supporting frame 252 via the four springs 255. The supporting frame 252 is fixed to the supporting member 251 and the supporting member 251 is fixed to the stationary side 100, so that the casing 10 is elastically supported to the stationary side 100 via the springs 255.

Moreover, the stationary side conductor 254 is inserted into the central portion of the coil 253, fitted to the casing 10, non-contact-wise with a predetermined gap being maintained between the coil 253 and the conductor 254. When the coil 253 is excited, an attractive force or repulsive force caused by the electromagnetic force acts on the stationary side conductor 254. Then, by the principle of an electromagnetic bearing, the coil 253 is supported by the stationary side conductor 254, that is, by the stationary side 100 by the electromagnetic force.

Figure 23:
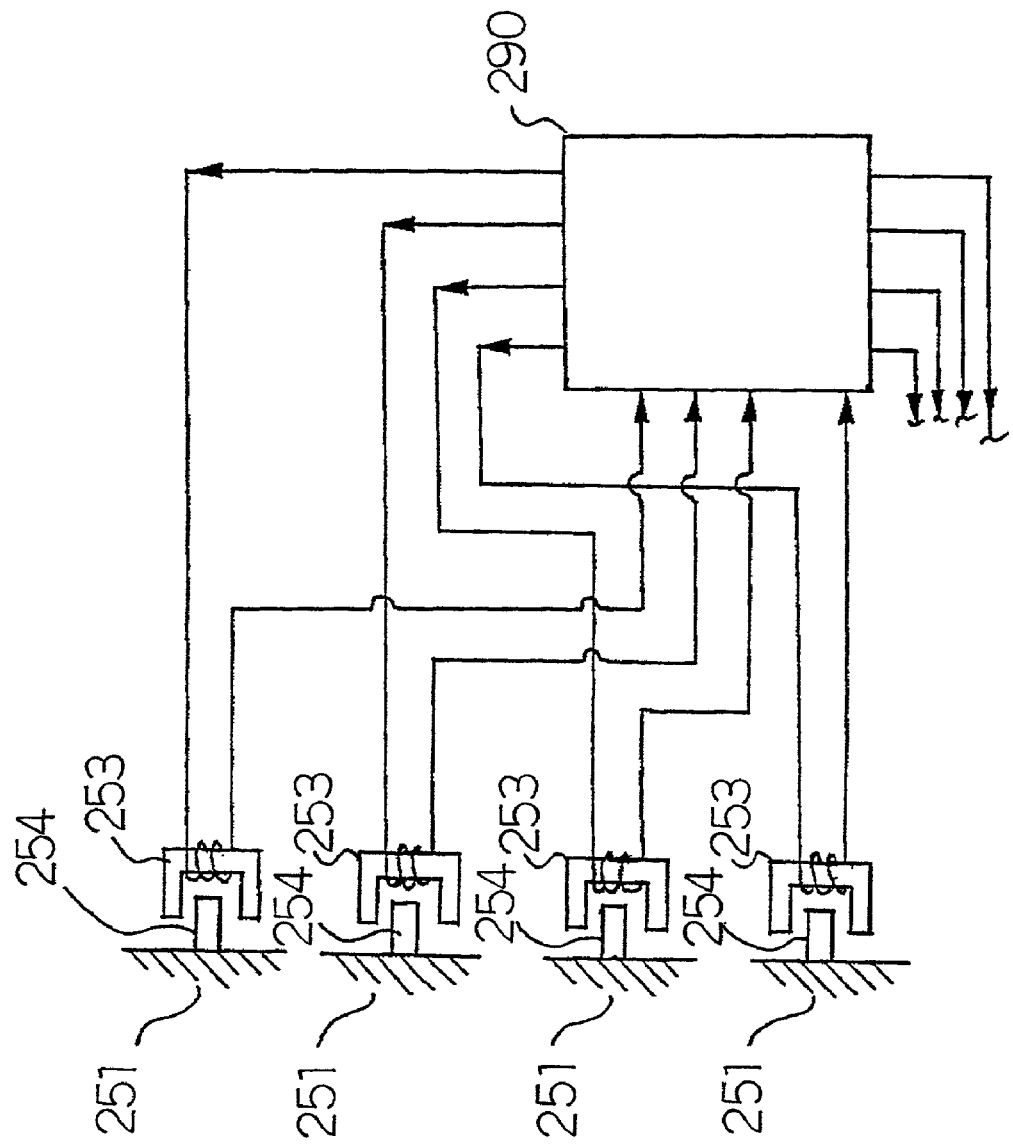
FIG. 23 shows a construction of an excitation circuit of the rotation stabilizing device of the thirteenth embodiment of FIG. 21.

FIG. 23 shows a construction of an excitation circuit of the coil 253 of the present thirteenth embodiment, wherein the excitation circuit is for the four places on one side of the casing 10 and the circuit of the other side is omitted. In this figure, an excitation electric source 290 supplies excitation coils of the coils 253 of the four vibration isolating devices 280 with excitation current to cause electromagnetic force in the coils 253, so that electromagnetic force may act on the stationary side conductors 254, that are inserted into the coils 253 with the predetermined gaps being maintained from the coils 253, to thereby support the coils 253 and thus the casing 10 to which the coils 253 are fitted. It is to be noted that, in the present thirteenth embodiment, the respective coils 253 of the eight places are continuously supplied with a constant level of the excitation current.

According to the thirteenth embodiment as mentioned above, the construction is made such that the casing 10 is supported at eight places of the upper and lower surfaces thereof by the vibration isolating devices 280. The vibration isolating devices 280 support the casing 10 elastically via the springs 255 and, at the same time, the electromagnetic force caused between the coil 253 and the stationary side conductor 254 also supports the casing 10. Hence, by the elastic mechanical support and the electromagnetic support, vibration of the casing 10 is absorbed. Thus, the vibration can be absorbed efficiently by the vibration isolating devices 280 without spreading to the surrounding environment via the supporting portions.

Figure 24:
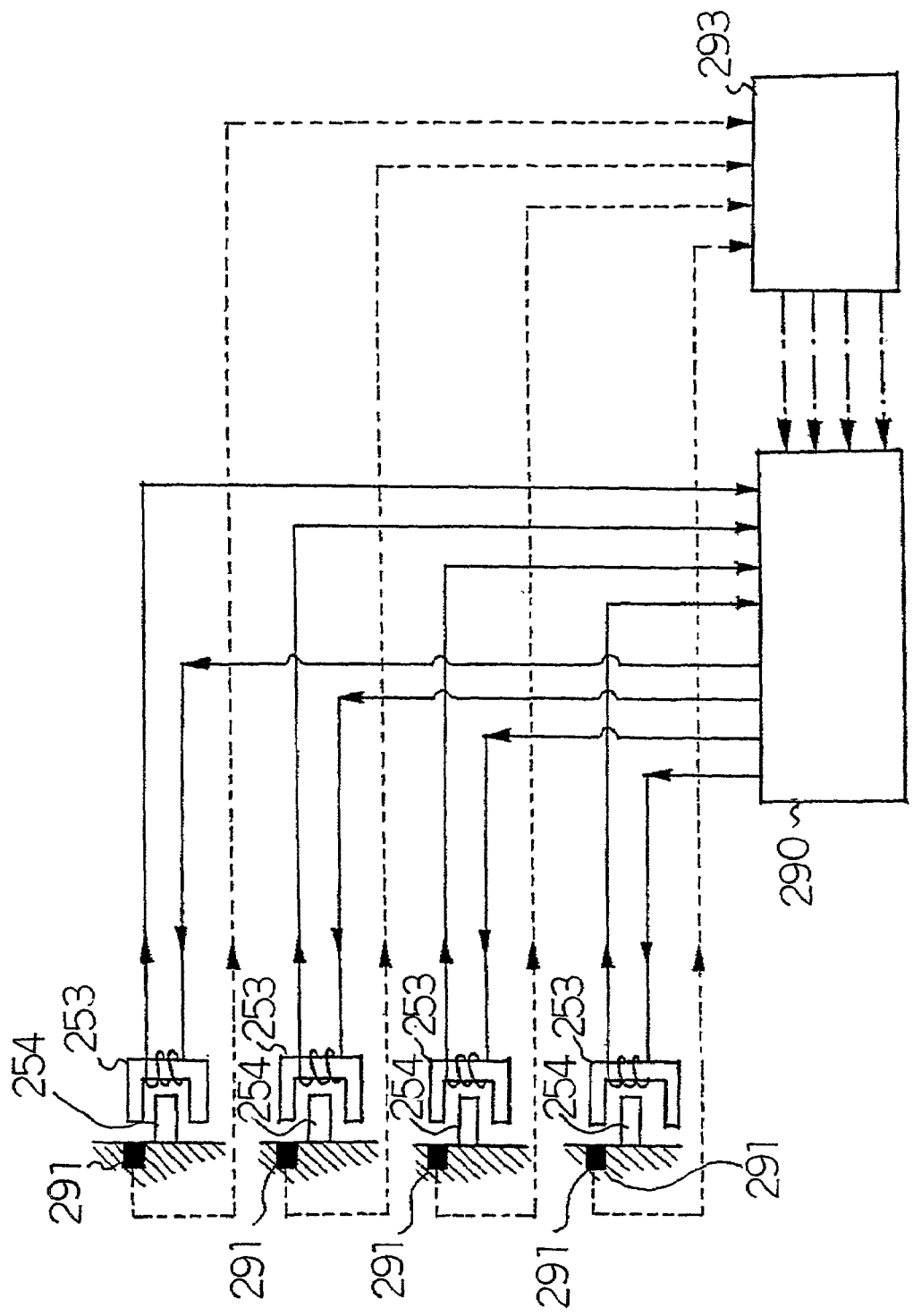
FIG. 24 shows a coil excitation circuit of a rotation stabilizing device in a rotating apparatus of a fourteenth embodiment according to the present invention.

FIG. 24 shows a coil exciting circuit of a rotation stabilizing device in a rotating apparatus of a fourteenth embodiment according to the present invention, wherein the circuit of the four places on one side of the casing 10 is shown and that of the other side is omitted. In the present fourteenth embodiment, the construction is made such that a gap sensor 291 is provided in the vibration isolating device 280. By the gap sensor 291, a gap between the supporting member 251 and the coil 253 is detected and, if the gap becomes larger or smaller than a predetermined one, the excitation current is increased or decreased to thereby control the support by the electromagnetic force so as to absorb the vibration. Construction of other portions of the vibration isolating device 280 is the same as that of the thirteenth embodiment shown in FIGS. 21 and 22.

In FIG. 24, the gap sensor 291 is provided in each of the vibration isolating devices 280 for detecting the gap between the supporting member 251 on the stationary side and the casing 10 or the coil 253; detected signals thereof are inputted into a control unit 293. An excitation coil of each of the coils 253 is supplied with a constant excitation current from an excitation electric source 290. If vibration occurs in the casing 10 and the gap between the casing 10 and the stationary side becomes larger or smaller than the predetermined one, then the control unit 293, which continuously monitors signals from each of the gap sensors 291, detects variations in the gap and controls to increase or decrease the excitation current so that the gap may return to the predetermined one. Thereby, the vibration caused in the casing 10 can be absorbed.

FIGS. 25(a) to (d) explain controls of the excitation current in the fourteenth embodiment as described above, wherein FIG. 25(a) shows wave shapes of the vibration detected by the gap sensor 291 on the time axis t, FIG. 25(b) shows timing of drive pulses given by the control unit 293, FIG. 25(c) shows wave shapes of the excitation current supplied from the excitation electric source 290 and FIG. 25(d) shows wave shapes of the vibration, after being isolated, detected by the gap sensor 291.

In FIG. 25(a), if a detected signal of the gap sensor 291 exceeds a previously set value ±K, then the control unit 293 puts out a drive pulse signal, as shown in FIG. 25(b). This drive pulse signal is sent to the excitation electric source 290. Then, as shown in FIG. 25(c), only during this drive pulse signal of + or −, a constant reference current $I_O$ is increased or decreased by a constant excitation current i. The excitation current so increased or decreased in FIG. 25(c) becomes an excitation current that suppresses the corresponding vibration, which results in reducing the vibration caused in FIG. 25(a) so that the gap may converge within the predetermined reference gap $X_O$, as shown in FIG. 25(d).

Figure 26A:
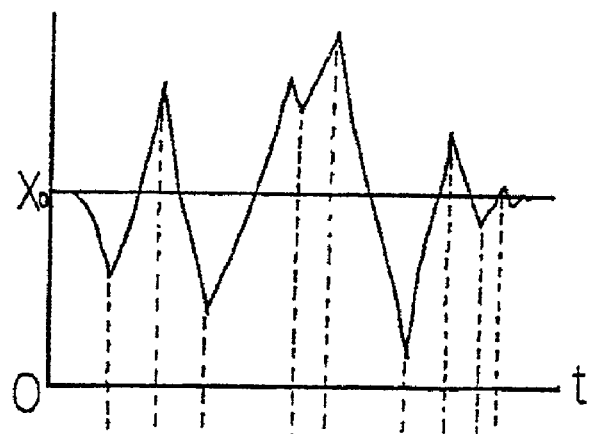
Figure 26B:
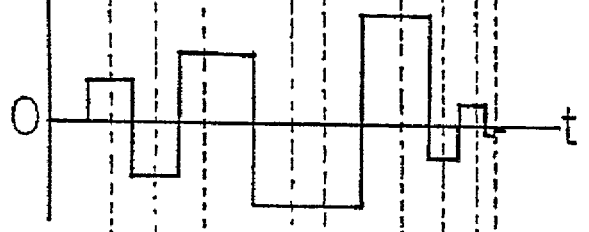
Figure 26C:
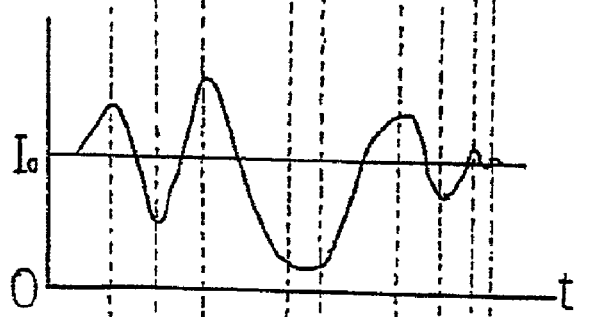
Figure 26D:
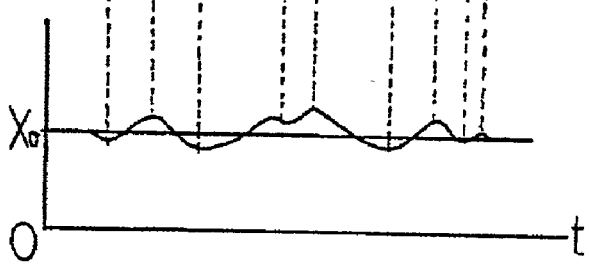

FIGS. 26(a) to (d) explain controls of the excitation current in a fifteenth embodiment according to the present invention, wherein FIG. 26(a) shows wave shapes of the gap sensor detected signals, FIG. 26(b) shows drive pulses given by the control unit 293, FIG. 26(c) shows wave shapes of the excitation current and FIG. 26(d) shows wave shapes of the vibration after being isolated. In the present fifteenth embodiment, construction of the vibration isolating device 280 is the same as that shown in FIG. 24. The control unit 293 takes detected signals of each of the gap sensors 291 and computes drive signals so as to cause such a reverse electromagnetic force as to cancel the detected vibration. Thereby, an active control of the vibration by the exciting current is effected.

Corresponding to the wave shapes of the gap sensor detected signals of FIG. 26(a), the control unit 293 takes signals from the gap sensor 291 and, corresponding to the size of the vibration of the signals, computes drive signals of such large or small rectangular waves as to cancel this vibration. In FIG. 26(c), the excitation electric source 290 receives the drive signals of FIG. 26(b) to cause the excitation current corresponding to the size of the drive signals and puts out the excitation current into each of the coils 253 so as to be added to the predetermined reference current $I_O$. The excitation current of FIG. 26(c) causes electromagnetic force so as to actively cancel the vibration caused in FIG. 26(a), which results in reducing the vibration so that the gap may converge within the predetermined reference gap $X_O$.

Figure 27:
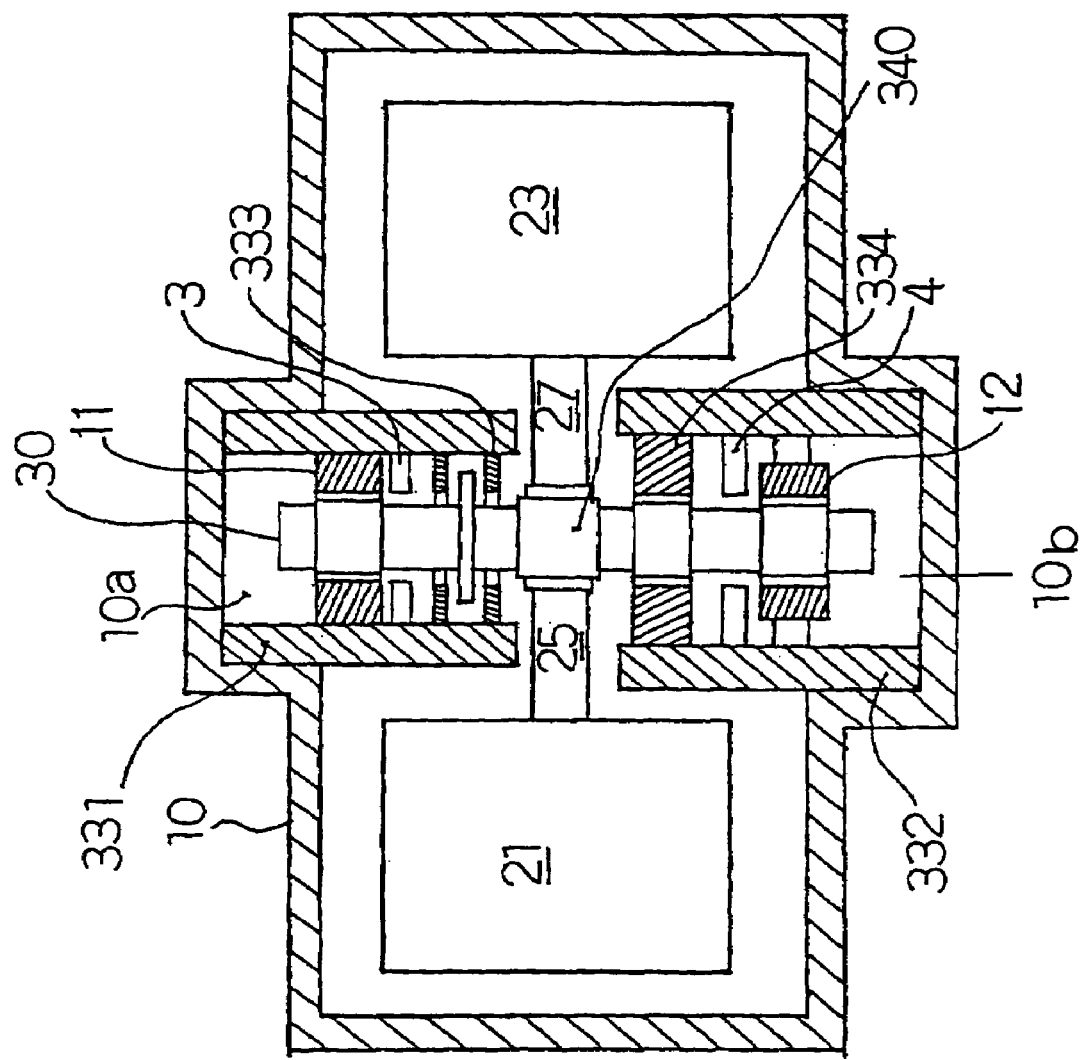
FIG. 27 is a cross sectional side view of a rotation stabilizing device in a rotating apparatus of a sixteenth embodiment according to the present invention.

FIG. 27 is a cross sectional side view of a rotation stabilizing device in a rotating apparatus of a sixteenth embodiment according to the present invention. In FIG. 27, recess portions 10a, 10b are formed in the casing 10 projecting outwardly therefrom. In the recess portion 10a, an upper fixing member 331 of a cylindrical shape is fitted. Inside the upper fixing member 331, so as to be fitted to an inner wall thereof, there are provided a magnetic bearing 11 for supporting a rotary shaft 30 non-contact-wise in the radial direction, a vibration sensor 3 for detecting displacement caused by vibration of the rotary shaft 30 and a magnetic thrust bearing 333 for supporting the rotary shaft 30 in the thrust direction.

In the recess portion 10b also, a lower fixing member 332 of a cylindrical shape is fitted and inside the lower fixing member 332, so as to be fitted to an inner wall thereof, there are provided a motor 334 for rotating the rotary shaft 30, a vibration sensor 4 for detecting vibration or displacement of the rotary shaft 30 and a magnetic bearing 12 for supporting the rotary shaft 30 in the radial direction.

The rotary shaft 30 is supported non-contact-wise relative to the surroundings by the mentioned magnetic bearings 11, 12, 333 so as to be driven rotationally by the motor 334. At a central portion of the rotary shaft 30, a safety device 340 is fitted. As in the example shown in FIG. 37, four arms 24, 25, 26, 27, extending in the radial direction, have their one ends fitted to the safety device 340 so as to be orthogonal to the rotary shaft 30 and the other ends fitted with four experimental boxes 20, 21, 22, 23. All the arms, the experimental boxes and the rotary shaft, being integrally fixed together, are driven rotationally by the motor 334.

FIGS. 28(a) and (b) show details of the safety device 340 of the mentioned sixteenth embodiment, wherein FIG. 28(a) is a side view and FIG. 28(b) is a cross sectional view taken on line AA—AA of FIG. 28(a). At a connecting portion between the rotary shaft 30 and the arms 25, 27, there is interposed a connecting ring 380, wherein the arms 25, 27 are fixed to the connecting ring 380 and the connecting ring 380 and the rotary shaft 30 are rotatable freely with respect to each other. At a place of the rotary shaft 30 corresponding to each of the arms 25, 27, four pin holes 345 are bored passing through a tube wall of the rotary shaft 30. In each of the arms 25, 27 opposite to the pin holes 345, an actuator 341, having a rod 342, is provided. At an end of the rod 342, a pin stand 343 is fixed and four pins 344 project from the pin stand 343.

The diameter of the pin 344 is made slightly smaller than that of the pin hole 345 of the rotary shaft 30 and it is so constructed that the four pins 344 are arranged to be insertable into the four pin holes 345. When the rod 342 elongates, the pins 344 are inserted into the pin holes 345 to engage together and, when the rod 342 retracts, the pins 344 are drawn out of the pin holes 345. It is to be noted that, while the arms 25, 27 only are illustrated, actually the four arms 24 to 27 are connected integrally to the connecting ring 380, as illustrated. FIGS. 29(a) and (b) show an engaging state of the pins 344 and the pin holes 345, as mentioned above, wherein FIG. 29(a) shows a state where the pins 344 and the pin holes 345 engage together and FIG. 29(b) shows a state where the pins 344 and the pin holes 345 disengage from each other. In FIG. 29(a), when the rod 342 of the actuator 341 elongates, the four pins 344 on the pin stand 343 are inserted into the four pin holes 345 of the rotary shaft 30 to engage together. In this case, if the pins 344 are made of a magnetic material, when they are inserted into the pin holes 345, they attract the rotary shaft 30 so that the arms 25, 27 may be firmly fixed to the rotary shaft 30.

In FIG. 29(b), the actuator 341 works to retract the rod 342, so that the four pins 344, via the pin stand 343, are drawn out of the pin holes 345 of the rotary shaft 30. Thus, the arms 25, 27 via the connecting ring 380 and the rotary shaft 30 lose the connection between them and become free from each other. When the four pins 344 magnetically attract the rotary shaft 30, the rod 342 of the actuator 341 must be retracted by a force exceeding this attractive force. The same structure as shown in FIGS. 28 and 29 is applicable also to the arms 24, 26.

In the sixteenth embodiment as mentioned above, before the rotary shaft 30 is driven rotationally, the rod 342 of the actuator 341 of each of the arms is elongated to thereby insert the four pins 344 into the pin holes 345 of the rotary shaft 30 to engage them together. When applicable, the pins 344 of the arms 24 to 27 magnetically attract the rotary shaft 30 so that the connection between the rotary shaft 30 and the arms 24 to 27 may be further ensured.

Then, while the rotary shaft 30 is driven rotationally by the motor 334 to thereby drive the rotating apparatus, if foreign matters encroach between the rotary shaft 30 and the bearing portions during the rotation, there may be a case where the rotary shaft 30 stops suddenly. Upon such sudden stop of the rotary shaft 30, the experimental boxes 20 to 23 also stop suddenly and the shocks are transmitted to the casing 10 via the arms 24 to 27, the rotary shaft 30, the bearings and the motor. Thus, the surrounding environment is badly affected.

Figure 30:
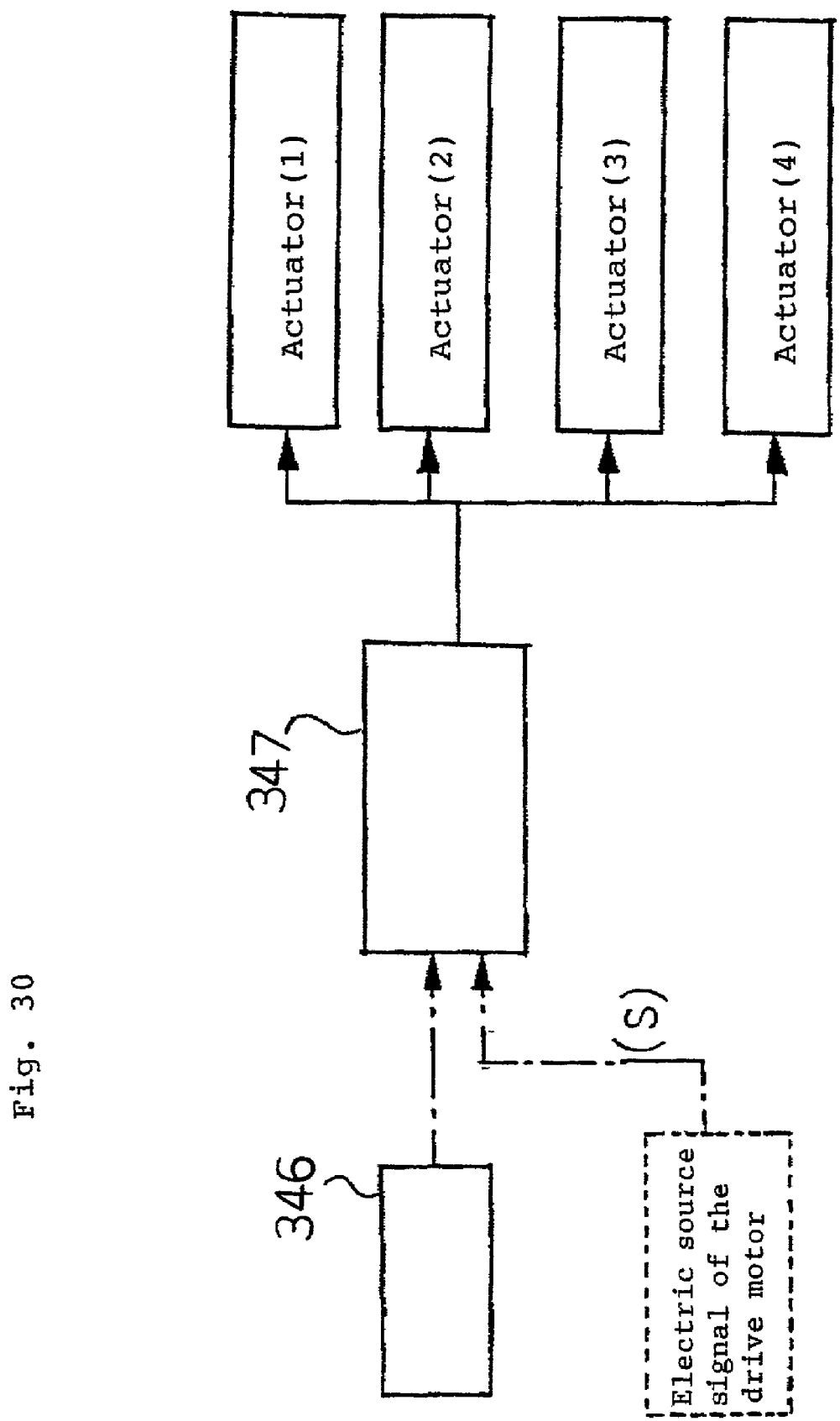
FIG. 30 is a control block diagram with respect to the sixteenth embodiment of FIG. 27.

If the rotary shaft 30 stops suddenly, with the safety device 340 of the present invention, the arms 24 to 27 are thereupon disconnected from the rotary shaft 30 to thereby suppress shocks from the sudden stop. FIG. 30 is a control block diagram of the safety device 340, in which an actuator drive unit 347 is inputted with signals from a sensor 346 detecting rotation of the rotary shaft 30 and with electric source signals (S) of the motor 334. Sudden stop of the rotary shaft 30 is detected by the sensor 346 and a signal is inputted into the actuator drive unit 347. The actuator drive unit 347 puts out a command signal to the actuators (1) to (4) of the four arms 24 to 27 so that the rods 342 may be retracted, as shown in FIG. 29(b), to thereby draw the pins 344 out of the pin holes 345 of the rotary shaft 30 to make the rotary shaft 30 and the arms 24 to 27 free from each other.

Also, the actuator drive unit 347 continuously monitors the electric source of the motor 334 by the electric source signal (S) of the motor 334 and, if the electric source of the motor 334 is closed suddenly, then immediately the same function as mentioned above takes place and the rotary shaft 30 and the arms 24 to 27 are disconnected from each other.

When the rotary shaft 30 stops suddenly as mentioned above, the safety device 340 disconnects the rotary shaft 30 and the arms 24 to 27 from each other to make them free. After the rotary shaft 30 so stops, the arms 24 to 27 freely continue their rotation by the force of inertia and the occurrence of shocks due to the sudden stop can be avoided.

FIGS. 31(a) and (b) show a safety device 350 as a rotation stabilizing device in a rotating apparatus of a seventeenth embodiment according to the present invention, wherein FIG. 31(a) is a side view and FIG. 31(b) is a cross sectional view taken on line AC—AC of FIG. 31(a). In the present seventeenth embodiment, four arms 24 to 27 are integrally fixed to a connecting shaft 349 and the rotary shaft is separated in to an upper rotary shaft 30a and a lower rotary shaft 30b.

In FIG. 31(a), the connecting shaft 349 is interposed between the upper and lower rotary shafts 30a, 30b so as to all be rotatable freely from each other. Within each of the upper and lower rotary shafts 30a, 30b, an actuator 341, having a rod 342, a pin stand 343 and pins 344, is fitted and pin holes 348 are provided in the connecting shaft 349. The structure of this portion is substantially the same as that of the sixteenth embodiment shown in FIGS. 28 and 29. Four pins 344 are provided on the pin stand 343, as shown in FIG. 31(b). When the rod 342 elongates, the pins 344 are inserted into the pin holes 348 of the connecting shaft 349 so that the connecting shaft 349 and the upper and lower rotary shafts 30a, 30b are connected together. It is to be noted that, as in the sixteenth embodiment, if the pins 344 are made of a magnetic material, when they are inserted into the pin holes 348, they attract the rotary shaft and the connection there is more firmly effected.

FIG. 32 shows a state that, when the upper and lower rotary shafts 30a, 30b stop suddenly, the safety device 350 disconnects the connecting shaft 349 from the rotary shafts 30a, 30b to make the connecting shaft 349 freely rotatable. The function to disconnect the pins 344 from the pin holes 348 at this time is the same as that described with respect to FIG. 30 and description thereon will be omitted. Thus, when the rotation of the rotary shafts 30a, 30b stops suddenly, the connecting shaft 349, the four arms 24 to 27 and the four experimental boxes 20 to 23, that are integrally connected to each other, are disconnected from the rotary shafts 30a, 30b to continue rotation by the force of inertia and the occurrence of shocks due to the sudden stop can be avoided.

Figure 33A:
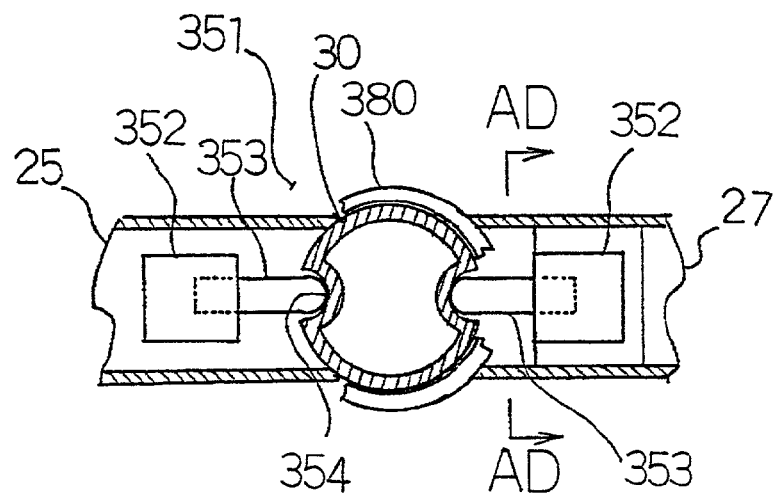
Figure 33B:
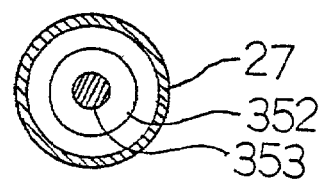
Figure 33C:
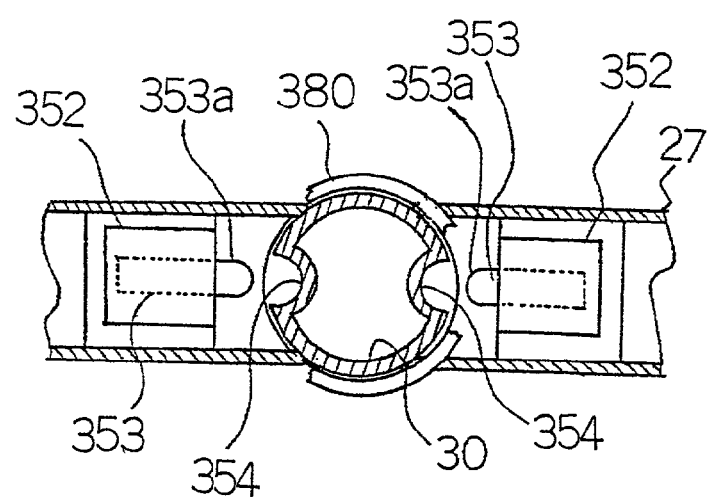

FIGS. 33(a) to (c) show a safety device as a rotation stabilizing device in a rotating apparatus of an eighteenth embodiment according to the present invention, wherein FIG. 33(a) is a cross sectional view showing an engaging state, FIG. 33(b) is a cross sectional view taken on line AD—AD of FIG. 33(a) and FIG. 33(c) is a cross sectional view showing a disengaging state.

In FIGS. 33(a) and (b), an actuator 352 is provided in each of the arms 25, 27 so as to elongate and retract a rod 353. An end of the rod 353 is formed in a semi-spherical shape 353a. A portion of the rotary shaft 30 corresponding to the rod 353 is formed with an abutting portion 354, having a recessed semi-spherical shape that has a curvature slightly larger than that of the semi-spherical shape 353a of the end of the rod 353 so as to be complementary to each other. Thus, the rod 353 at its end abuts on the abutting portion 354, so that the rod 353, or the arms 25, 27, and the rotary shaft 30 are connected together by the friction force.

Function of the actuator 352 is effected in the same way as in the sixteenth embodiment of FIG. 30. That is, while the rotary shaft 30 rotates, the rod 353 of the actuator 352 elongates to thereby make the semi-spherical shape 353a of the rod 353 end abut on the abutting portion 354 of the rotary shaft 30. As the four arms 24 to 27 are connected to each other, while the rod 353 end so abuts on the rotary shaft 30 so as to press it, the four arms 24 to 27 are connected to, and rotated by, the rotary shaft 30.

If the rotary shaft 30 stops suddenly, the actuator 352 works by the same function as described with respect to FIG. 30 and, as shown in FIG. 33(c), the rod 353 retracts to thereby disconnect the rod 353 end from the abutting portion 354 and to thus make the four arms 24 to 27 free from the rotary shaft 30. Hence, the arms 24 to 27 continue rotation by the force of inertia and the occurrence of sudden shocks can be avoided.

It is to be noted that, while the pin 344 and the rod 353 of the mentioned sixteenth to eighteenth embodiments have been described by the example that they are worked by the actuator 341, 352, the pin and the rod may be worked by electromagnetic force, based on a rotation stop signal or acceleration signal from a sensor, so that the pin or the rod may be attracted to release the rotational force or the electromagnetic attractive force may be released to thereby return the pin or the rod for the engagement.

Figure 34A:
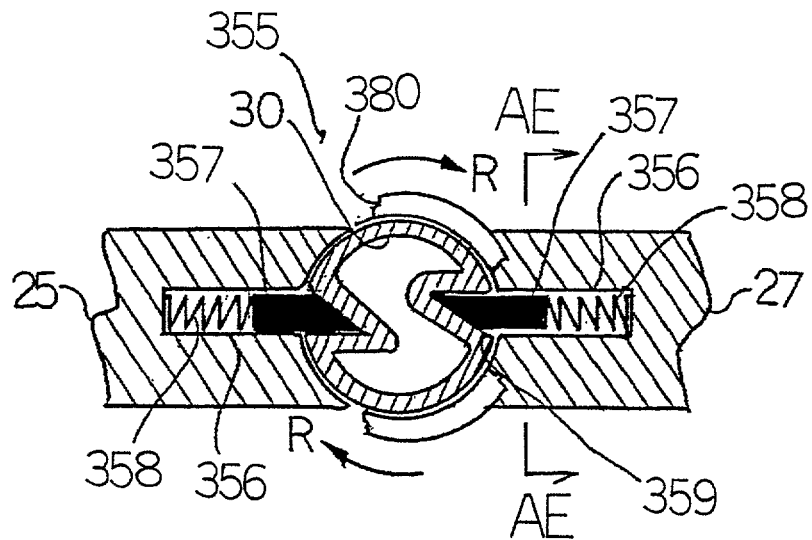
Figure 34B:
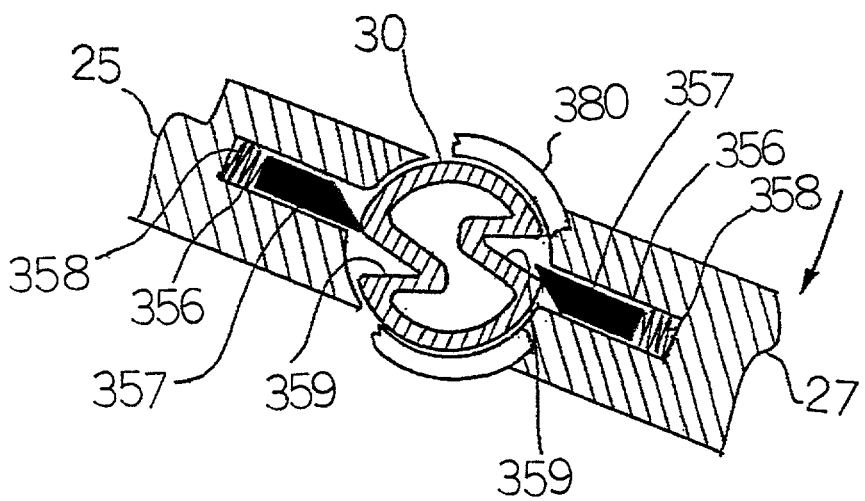
Figure 34C:
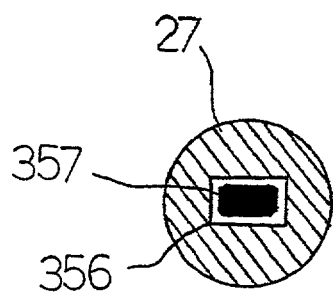

FIGS. 34(a) to (c) show a safety device as a rotation stabilizing device in a rotating apparatus of a nineteenth embodiment according to the present invention, wherein FIG. 34(a) is a cross sectional view showing an engaging state, FIG. 34(b) is a cross sectional view showing a disengaging state and FIG. 34(c) is a cross sectional view taken on line AE—AE of FIG. 34(a).

In FIG. 34(a), a hole 356 is provided in each of the arms 24 to 27 and a spring 358 is inserted at a bottom portion of the hole 356. The spring 358 has its one end fitted to the bottom of the hole 356 and the other end fitted with a claw member 357. The claw member 357 has its one end formed in a tapered shape having an inclined surface. On the other hand, the rotary shaft 30 has an abutting portion 359 formed in a recessed shape having an inclined surface that is complementary to the tapered end shape of the claw member 357. Thus, the claw member 357, activated by the spring 358, is inserted into the abutting portion 359 to engage therewith. The rotary shaft 30 rotates indirection R, as shown in FIG. 34(a), so as to press the claw member 357 at a flat surface opposite to the inclined surface to thereby transmit a rotational force to the arms 24 to 27 with which the claw member 357 engages. The four arms 24 to 27 are integrally fixed to a connecting ring 380 and, when the claw member 357 engages with the rotary shaft 30 at the abutting portion 359, the arms 24 to 27 rotate together with the rotary shaft 30.

If the rotary shaft 30 stops suddenly, the arms 24 to 27 continue to rotate by the inertia force and, as shown in FIG. 34(b), the claw member 357 is pushed back, resisting the spring force of the spring 358, by the sliding force caused at the tapered inclined surface. Thus, the claw member 357 is entirely pushed out of the abutting portion 359 of the rotary shaft 30 so as to be free from the rotary shaft 30 and the arms 24 to 27 continue to rotate by the inertia force. Thereby, a sudden stop of the rotation of the experimental boxes can be avoided without the occurrence of sudden shocks.

It is to be noted that, in the present nineteenth embodiment, the spring 358 is selected to have such a small spring force as is necessary for guiding the claw member 357 to be inserted to abut on the abutting portion 359, prior to the rotation, so that, when the rotary shaft 30 stops suddenly, the claw member 357 is securely pushed back to retract, without returning to the original lock position, to thereby make the arms 24 to 27 sufficiently rotatable by the inertia force freely from the rotary shaft 30.

Also, while the hole 356 and the claw member 357 are formed in a square cross sectional shape, as seen in FIG. 34(c), they may be formed in a round cross sectional shape. But if they are formed with the square cross sectional shape, it will be advantageous because the square cross sectional shape has a restricting effect against rotational displacements of each of the arms.

Also, while the nineteenth embodiment has been described by the example in which the claw member 357 abuts on the abutting portion 359 of the rotary shaft 30 by the spring force of the spring 358, the claw member 357 may be moved by an actuator having a rod, as in the sixteenth to eighteenth embodiments, so that, when the rotary shaft stops suddenly, the rod is retracted to thereby make the arms free from the rotary shaft.

What is claimed is:

1. A rotation stabilizing device in a microgravitational rotating apparatus, wherein:
    said microgravitational rotating apparatus comprises a casing, a rotary shaft provided within said casing and having two ends that are both supported by bearings so as to be rotationally driven by a motor, and a plurality of radially extending arms having first ends fitted and supported to said rotary shaft and other ends fitted with a plurality of boxes for having objects having weight placed therein; and
    said rotation stabilizing device comprises a means for stabilizing rotation provided at a location selected from the group consisting of between said casing and said plurality of boxes, between an outer side of said casing and stationary structure, and between said rotary shaft and said plurality of arms.

2. The rotation stabilizing device of claim 1, wherein said means for stabilizing rotation comprises:
    a fin having a flat plate ring shape;
    wherein said fin is fixed to outer circumferential surfaces of said plurality of boxes so as to extend orthogonally to said rotary shaft;
    a pair of electromagnetic coils, facing each other, fitted to a wall surface of said casing at each of a plurality of places along a circumferential periphery of said fin so that said fin may be interposed between said electromagnetic coils of said pair with a predetermined gap being maintained between said fin and said electromagnetic coils of said pair;
    a gap sensor, operable to detect variations in the gap, fitted to said wall surface of said casing adjacent said electromagnetic coils of said pair; and
    a control unit operable to receive detected signals of said gap sensor, compare the signals with a set value, and control an excitation current of said electromagnetic coils of said pair which said gap sensor is adjacent to when the detected signals are in excess of said set value so that said gap can be adjusted to fall within the set value.

3. The rotation stabilizing device of claim 1, wherein said means for stabilizing rotation comprises:
    a fin having a frustoconical ring shape with a conical surface inclined with a predetermined angle to said rotary shaft;
    wherein said fin is fixed to outer circumferential surfaces of said plurality of boxes;
    a pair of electromagnetic coils, facing each other, fitted to a wall surface of said casing at each of a plurality of places along a circumferential periphery of said fin so that said fin may be interposed between said electromagnetic coils of said pair with a predetermined gap being maintained between said fin and said electromagnetic coils of said pair;
    a gap sensor, operable to detect variations in the gap, fitted to said wall surface of said casing adjacent said electromagnetic coils of said pair; and
    a control unit operable to receive detected signals of said gap sensor, compare the signals with a set value, and control an excitation current of said electromagnetic coils of said pair which said gap sensor is adjacent to when the detected signals are in excess of said set value so that said gap can be adjusted to fall within the set value.

4. The rotation stabilizing device of claim 1, wherein said means for stabilizing rotation comprises:
    a fin having a cylindrical shape fixed to each of upper and lower surfaces of said plurality of boxes so as to extend in the same direction as said rotary shaft;
    a pair of electromagnetic coils, facing each other, fitted to a wall surface of said casing at each of a plurality of places along a circumferential periphery of said fin so that said fin may be interposed between said electromagnetic coils of said pair with a predetermined gap being maintained between said fin and said electromagnetic coils of said pair;
    a gap sensor, operable to detect variations in the gap, fitted to said wall surface of said casing adjacent said electromagnetic coils of said pair; and
    a control unit operable to receive detected signals of said gap sensor, compare the signals with a set value, and control an excitation current of said electromagnetic coils of said pair which said gap sensor is adjacent to when the detected signals are in excess of said set value so that said gap can be adjusted to fall within the set value.

5. The rotation stabilizing device of claim 1, wherein said means for stabilizing rotation comprises:
    a fin having a flat plate ring shape;
    wherein said fin is fixed to outer circumferential surfaces of said plurality of boxes so as to extend orthogonally to said rotary shaft;
    a pair of electromagnetic coils, facing each other, fitted to a wall surface of said casing at each of a plurality of places along a circumferential periphery of said fin so that said fin may be interposed between said electromagnetic coils of said pair with a predetermined gap being maintained between said fin and said electromagnetic coils of said pair;
    a pair of cylinders fixed to said casing and connected to said electromagnetic coils of said pair so that said electromagnetic coils can be moved and the gap changed;
    a gap sensor, operable to detect variations in the gap, fitted to said wall surface of said casing adjacent said electromagnetic coils of said pair; and a control unit operable to receive detected signals of said gap sensor, compare the signals with a set value, and control drive of said pair of cylinders of said pair of electromagnetic coils which said gap sensor is adjacent to when the detected signals are in excess of said set value so that said gap can be adjusted to fall within the set value.

6. The rotation stabilizing device of claim 1, wherein said means for stabilizing rotation comprises:

a fin having a frustoconical ring shape with a conical surface inclined with a predetermined angle to said rotary shaft;

wherein said fin is fixed to outer circumferential surfaces of said plurality of boxes;

a pair of electromagnetic coils, facing each other, fitted to a wall surface of said casing at each of a plurality of places along a circumferential periphery of said fin so that said fin may be interposed between said electromagnetic coils of said pair with a predetermined gap being maintained between said fin and said electromagnetic coils of said pair;

a pair of cylinders fixed to said casing and connected to said electromagnetic coils of said pair so that said electromagnetic coils can be moved and the gap changed;

a gap sensor, operable to detect variations in the gap, fitted to said wall surface of said casing adjacent said electromagnetic coils of said pair; and a control unit operable to receive detected signals of said gap sensor, compare the signals with a set value, and control drive of said pair of cylinders of said pair of electromagnetic coils which said gap sensor is adjacent to when the detected signals are in excess of said set value so that said gap can be adjusted to fall within the set value.

7. The rotation stabilizing device of claim 1, wherein said means for stabilizing rotation comprises:

a fin having a cylindrical shape fixed to each of upper and lower surfaces of said plurality of boxes so as to extend in the same direction as said rotary shaft;

a pair of electromagnetic coils, facing each other, fitted to a wall surface of said casing at each of a plurality of places along a circumferential periphery of said fin so that said fin may be interposed between said electromagnetic coils of said pair with a predetermined gap being maintained between said fin and said electromagnetic coils of said pair;

a pair of cylinders fixed to said casing and connected to said electromagnetic coils of said pair so that said electromagnetic coils can be moved and the gap changed;

a gap sensor, operable to detect variations in the gap, fitted to said wall surface of said casing adjacent said electromagnetic coils of said pair; and a control unit operable to receive detected signals of said gap sensor, compare the signals with a set value, and control drive of said pair of cylinders of said pair of electromagnetic coils which said gap sensor is adjacent to when the detected signals are in excess of said set value so that said gap can be adjusted to fall within the set value.

8. The rotation stabilizing device of claim 1, wherein said means for stabilizing rotation comprises:

a fin having a flat plate ring shape;

wherein said fin is fixed to inner circumferential wall surface of said casing so as to extend orthogonally to said rotary shaft;

a pair of electromagnetic coils, facing each other, fitted to an outer circumferential surface of each of said plurality of boxes so that said fin may be interposed between said electromagnetic coils of said pair with a predetermined gap being maintained between said fin and said electromagnetic coils of said pair;

a gap sensor, operable to detect variations in the gap, fitted to said outer circumferential surface of each of said plurality of boxes adjacent said electromagnetic coils of said pair; and a control unit operable to receive detected signals of said gap sensor, compare the signals with a set value, and control an excitation current of said electromagnetic coils of said pair which said gap sensor is adjacent to when the detected signals are in excess of said set value so that said gap can be adjusted to fall within the set value.

9. The rotation stabilizing device of claim 1, wherein said means for stabilizing rotation comprises:

a fin having a frustoconical ring shape with a conical surface inclined with a predetermined angle to said rotary shaft;

wherein said fin is fixed to inner circumferential wall surface of said casing;

a pair of electromagnetic coils, facing each other, fitted to an outer circumferential surface of each of said plurality of boxes so that said fin may be interposed between said electromagnetic coils of said pair with a predetermined gap being maintained between said fin and said electromagnetic coils of said pair;

a gap sensor, operable to detect variations in the gap, fitted to said outer circumferential surface of each of said plurality of boxes adjacent said electromagnetic coils of said pair; and a control unit operable to receive detected signals of said gap sensor, compare the signals with a set value, and control an excitation current of said electromagnetic coils of said pair which said gap sensor is adjacent to when the detected signals are in excess of said set value so that said gap can be adjusted to fall within the set value.

10. The rotation stabilizing device of claim 1, wherein said means for stabilizing rotation comprises:

a fin having a cylindrical shape fixed to each of upper and lower inner wall surfaces of said casing so as to extend in the same direction as said rotary shaft;

a pair of electromagnetic coils, facing each other, fitted to each of upper and lower surfaces of said plurality of boxes so that said fin may be interposed between said electromagnetic coils of said pair with a predetermined gap being maintained between said fin and said electromagnetic coils of said pair;

a gap sensor, operable to detect variations in the gap, fitted to said upper and lower surfaces of said plurality of boxes adjacent said electromagnetic coils of said pair; and a control unit operable to receive detected signals of said gap sensor, compare the signals with a set value, and control an excitation current of said electromagnetic coils of said pair which said gap sensor is adjacent to when the detected signals are in excess of said set value so that said gap can be adjusted to fall within the set value.

11. The rotation stabilizing device of claim 1, wherein said means for stabilizing rotation comprises:
   a fin having a flat plate ring shape;
   wherein said fin is fixed to inner circumferential wall surface of said casing so as to extend orthogonally to said rotary shaft;
   a pair of cylinders, facing each other, fitted to each of outer circumferential surfaces of said plurality of boxes;
   a pair of electromagnetic coils, facing each other, connected to said cylinders of said pair of cylinders so that said fin may be interposed between said electromagnetic coils of said pair with a predetermined gap being maintained between said fin and said electromagnetic coils of said pair and so that the gap is adjustable;
   a gap sensor, operable to detect variations in the gap, fitted to said outer circumferential surface of each of said plurality of boxes adjacent said electromagnetic coils of said pair; and
   a control unit operable to receive detected signals of said gap sensor, compare the signals with a set value, and control said cylinders of said electromagnetic coils of said pair which said gap sensor is adjacent to when the detected signals are in excess of said set value so that said gap can be adjusted to fall within the set value.

12. The rotation stabilizing device of claim 1, wherein said means for stabilizing rotation comprises:
   a fin having a frustoconical ring shape with a conical surface inclined with a predetermined angle to said rotary shaft;
   wherein said fin is fixed to inner circumferential wall surface of said casing;
   a pair of cylinders, facing each other, fitted to each of outer circumferential surfaces of said plurality of boxes;
   a pair of electromagnetic coils, facing each other, connected to said cylinders of said pair of cylinders so that said fin may be interposed between said electromagnetic coils of said pair with a predetermined gap being maintained between said fin and said electromagnetic coils of said pair and so that the gap is adjustable;
   a gap sensor, operable to detect variations in the gap, fitted to said outer circumferential surface of each of said plurality of boxes adjacent said electromagnetic coils of said pair; and
   a control unit operable to receive detected signals of said gap sensor, compare the signals with a set value, and control said cylinders of said electromagnetic coils of said pair which said gap sensor is adjacent to when the detected signals are in excess of said set value so that said gap can be adjusted to fall within the set value.

13. The rotation stabilizing device of claim 1, wherein said means for stabilizing rotation comprises:
   a fin having a cylindrical shape fixed to each of upper and lower surfaces of said casing so as to extend in the same direction as said rotary shaft;
   a pair of cylinders, facing each other, fitted to each of upper and lower surfaces of said plurality of boxes;
   a pair of electromagnetic coils, facing each other, connected to said cylinders of said pair of cylinders so that said fin may be interposed between said electromagnetic coils of said pair with a predetermined gap being maintained between said fin and said electromagnetic coils of said pair and so that the gap is adjustable;
   a gap sensor, operable to detect variations in the gap, fitted to each of said upper and lower surfaces of said plurality of boxes adjacent said electromagnetic coils of said pair; and
   a control unit operable to receive detected signals of said gap sensor, compare the signals with a set value, and control said cylinders of said electromagnetic coils of said pair which said gap sensor is adjacent to when the detected signals are in excess of said set value so that said gap can be adjusted to fall within the set value.

14. The rotation stabilizing device of claim 1, wherein said means for stabilizing rotation comprises a vibration isolating device that supports said casing at each of a plurality of places on an outer peripheral portion of said casing, said vibration isolating device comprising a spring mechanism elastically supporting said casing on said stationary structure and an electromagnetically supporting mechanism comprising an excitation coil connected to said spring mechanism so as to electromagnetically support said spring mechanism with respect to said stationary structure by excitation of said excitation coil.

15. The rotation stabilizing device of claim 14, wherein said vibration isolating device further comprises a gap sensor operable to detect a gap between said casing and said stationary structure and a control unit operable to received detected signals of said gap sensor and, when the detected signals indicate a gap in excess of a predetermined range, to control an excitation current of said excitation coil so as to reduce vibration.

16. The rotation stabilizing device of claim 14, wherein said vibration isolating device further comprises a gap sensor operable to detect a gap between said casing and said stationary structure and a control unit operable to received detected signals of said gap sensor, to detect signal variations and to output drive signals to cancel the signal variations so that excitation current of said excitation coil is controlled by the drive signals to reduce vibration.

17. The rotation stabilizing device of claim 14, wherein:
   said spring mechanism comprises a casing frame member fitted to said casing, a stationary structure frame member fitted to said stationary structure and a spring connecting said casing frame member and said stationary structure frame member; and
   said electromagnetically supporting mechanism comprises an excitation coil, said casing frame member comprising said excitation coil, and a conductor fitted with said stationary structure frame member;
   wherein said conductor is inserted into said casing frame member with a predetermined gap between said conductor and said casing frame member.

18. The rotation stabilizing device of claim 17, wherein said spring mechanism comprises one or more bar-like rod springs.

19. The rotation stabilizing device of claim 17, wherein said spring mechanism comprises one or more bar-like coil springs.

20. The rotation stabilizing device of claim 17, wherein said spring mechanism comprises one or more members made of rubber, plastics, etc. having a predetermined elasticity.

21. The rotation stabilizing device of claim 14, wherein said spring mechanism comprises one or more bar-like rod springs.

22. The rotation stabilizing device of claim 14, wherein said spring mechanism comprises one or more bar-like coil springs.

23. The rotation stabilizing device of claim 14, wherein said spring mechanism comprises one or more members made of rubber, plastics, etc. having a predetermined elasticity.

24. The rotation stabilizing device of claim 1, wherein said means for stabilizing rotation comprises a safety device interposed between said rotary shaft and said plurality of arms operable to disconnect said rotary shaft and said plurality of arms from each other if said rotary shaft stops suddenly so that said plurality of arms can rotate freely with respect to said rotary shaft.

25. The rotation stabilizing device of claim 24, wherein said safety device comprises:
   an actuator fitted within each of said plurality of arms;
   a pin, fitted to an end of a rod of each said actuator, which can engage with a pin hole in said rotary shaft; and
   a sensor operable to detect rotation of said rotary shaft and provide a rotation signal;
   wherein said rod can be extended to cause said pin at said end of said rod to engage with said pin hole so that said plurality of arms are rotatable together with said rotary shaft and said rod can be retracted if said rotary shaft stops suddenly based on the rotation signal from said sensor so as to disengage said pin from said pin hole.

26. The rotation stabilizing device of claim 24, wherein:
   said plurality of arms are radially fixed to a connecting shaft;
   said rotary shaft comprises a separate upper rotary shaft and a lower rotary shaft with said connecting shaft interposed there between;
   an actuator is fitted within each of said upper and lower rotary shafts;
   a pin is fitted to an end of a rod of each said actuator such that said pin can engage with a corresponding pin hole in said connecting shaft;
   a sensor is operable to detect rotation of said rotary shaft and to provide a rotation signal; and
   said rod can be extended to cause said pin at said end of said rod to engage with said pin hole so that said connecting shaft is rotatable together with said rotary shaft and said rod can be retracted if said rotary shaft stops suddenly based on the rotation signal from said sensor so as to disengage said pin from said pin hole.

27. The rotation stabilizing device of claim 24, wherein said safety device comprises:
   an actuator, having a rod with an end formed in a round shape, fitted within each of said plurality of arms;
   a sensor operable to detect rotation of said rotary shaft; and
   an abutting portion, having a recessed round shape complementary to the round shape of said end of said rod of said actuator, provided in said rotary shaft so that said end of said rod of said actuator can be moved to abut on said abutting portion;
   wherein said rod can be extended to cause said end of said rod to abut on said abutting portion of said rotary shaft so that said plurality of arms become rotatable together with said rotary shaft and can be retracted if said rotary shaft stops suddenly, based on a signal from said sensor, to disengage said end of said rod from said abutting portion.

28. The rotation stabilizing device of claim 24, wherein said safety device comprises:
   a hole in each of said plurality of arms opening at an end face thereof;
   a spring provided at a bottom of said hole;
   a claw member having one end activated by said spring and an other end projecting outside of said hole; and
   an abutting portion having a recessed shape complementary to a shape of said other end of said claw member, said abutting portion being provided in said rotary shaft so that said other end of said claw member, activated by said spring, can abut on said abutting portion of said rotary shaft so that said plurality of arms are rotatable together with said rotary shaft and so that if said rotary shaft stops suddenly, said plurality of arms, together with said claw member, continue to rotate by force of inertia so as to make said claw member disengage from said abutting portion of said rotary shaft and so that said plurality of arms are rotatable freely with respect to said rotary shaft.

29. A rotation stabilizing device in a microgravitational rotating apparatus, wherein:
   said microgravitational rotating apparatus comprises a casing, a rotary shaft provided within said casing and having two ends that are both supported by bearings so as to be rotationally driven by a motor, and a plurality of radially extending arms having first ends fitted and supported to said rotary shaft and other ends fitted with a plurality of boxes for having objects having weight placed therein; and
   a vibration isolating device for stabilizing rotation provided between an outer side of said casing and stationary structure, said vibration isolating device supporting said casing at each of a plurality of places on an outer peripheral portion of said casing and comprising:
      a spring mechanism elastically supporting said casing on said stationary structure, and
      an electromagnetically supporting mechanism comprising an excitation coil connected to said spring mechanism so as to electromagnetically support said spring mechanism with respect to said stationary structure by excitation of said excitation coil;
   wherein said spring mechanism comprises one or more selected from the group consisting of bar-like rod springs, bar-like coil springs, and members made of rubber, plastics, etc. having a predetermined elasticity.

30. A rotation stabilizing device in a microgravitational rotating apparatus, wherein:
   said microgravitational rotating apparatus comprises a casing, a rotary shaft provided within said casing and having two ends that are both supported by bearings so as to be rotationally driven by a motor, and a plurality of radially extending arms having first ends fitted and supported to said rotary shaft and other ends fitted with a plurality of boxes for having objects having weight placed therein; and
   a vibration isolating device for stabilizing rotation provided between an outer side of said casing and stationary structure, said vibration isolating device supporting said casing at each of a plurality of places on an outer peripheral portion of said casing and comprising:
      a spring mechanism elastically supporting said casing on said stationary structure, and
      an electromagnetically supporting mechanism comprising an excitation coil connected to said spring mechanism so as to electromagnetically support said spring mechanism with respect to said stationary structure by excitation of said excitation coil.

* * * * *